United States Patent [19]

Taylor et al.

[11] Patent Number: 5,769,527
[45] Date of Patent: Jun. 23, 1998

[54] COMPUTER CONTROLLED LIGHTING SYSTEM WITH DISTRIBUTED CONTROL RESOURCES

[75] Inventors: Brooks W. Taylor; Thomas E. Walsh; Mikell D. Nelson, all of Dallas; Charles H. Reese, Grapevine, all of Tex.

[73] Assignee: Vari-Lite, Inc., Dallas, Tex.

[21] Appl. No.: 473,150

[22] Filed: Jun. 7, 1995

Related U.S. Application Data

[63] Continuation-in-part of Ser. No. 273,262, Jul. 11, 1994, abandoned, which is a continuation of Ser. No. 122,355, Sep. 14, 1993, Pat. No. 5,329,431, which is a continuation-in-part of Ser. No. 988,821, Dec. 10, 1992, abandoned, which is a continuation-in-part of Ser. No. 898,385, Jun. 9, 1992, Pat. No. 5,209,560, which is a continuation of Ser. No. 766,029, Sep. 26, 1991, abandoned, which is a continuation-in-part of Ser. No. 555,946, Jul. 19, 1990, abandoned, which is a continuation of Ser. No. 249,225, Sep. 22, 1988, Pat. No. 4,980,806, which is a continuation of Ser. No. 120,743, Nov. 12, 1987, abandoned, which is a continuation of Ser. No. 887,178, Jul. 17, 1986, abandoned.

[51] Int. Cl.$^6$ .................................................. F21V 33/00
[52] U.S. Cl. ........................... 362/85; 362/233; 315/316; 364/132
[58] Field of Search ............................ 362/85, 233, 234, 362/286, 293, 319, 339, 386, 419; 315/316, 292, 293, 299, 315, 317, 318, 319, 320; 364/132, 188, 189

[56] References Cited

U.S. PATENT DOCUMENTS

| 4,947,302 | 8/1990 | Callahan | 362/233 |
|---|---|---|---|
| 5,329,431 | 7/1994 | Taylor et al. | 362/233 |
| 5,406,176 | 4/1995 | Sugden | 362/233 |

OTHER PUBLICATIONS

Obsession User Manual Supplement 2.0, pp. 23–29, Jan. 1994, Electronic Theatre Controls.
ETCNet Planning & Installation Guide, pp. 3–13, Apr. 1994, Electronic Theatre Controls, Inc.

*Primary Examiner*—Thomas M. Sember
*Attorney, Agent, or Firm*—Morgan & Finnegan LLP

[57] ABSTRACT

A stage lighting system is comprised of a plurality of lamp units which may have diverse communication protocols, functions and data parameters. The stage lighting system is controlled by a modular control system comprised of a modular controller mainframe interconnected with a plurality of control devices which may have diverse communications protocols and data formats. The modular controller mainframe consists of a plurality of input and output modules, mass storage devices and a main processor kernel, all interconnected by a number of data buses. The input modules serve as an interface between the modular controller mainframe and the diverse protocols of the various control devices. Similarly, the output modules serve as an interface between the modular controller mainframe and the diverse protocols of the various types of lamp units. The modular controller mainframe serves as an interface system by providing one or more of said input or output modules with the capability of translating parameter commands, where necessary, to accommodate control devices having diverse communications protocols and output devices having diverse communications protocols, functions and data formats. The system may also include a distributed control system for a lighting system in which two or more fully-functional control devices are online simultaneously to control any function of any of a plurality of luminaries from the control devices. Various methods for arbitrating and resolving conflicts between or among plural control consoles are also used.

7 Claims, 29 Drawing Sheets

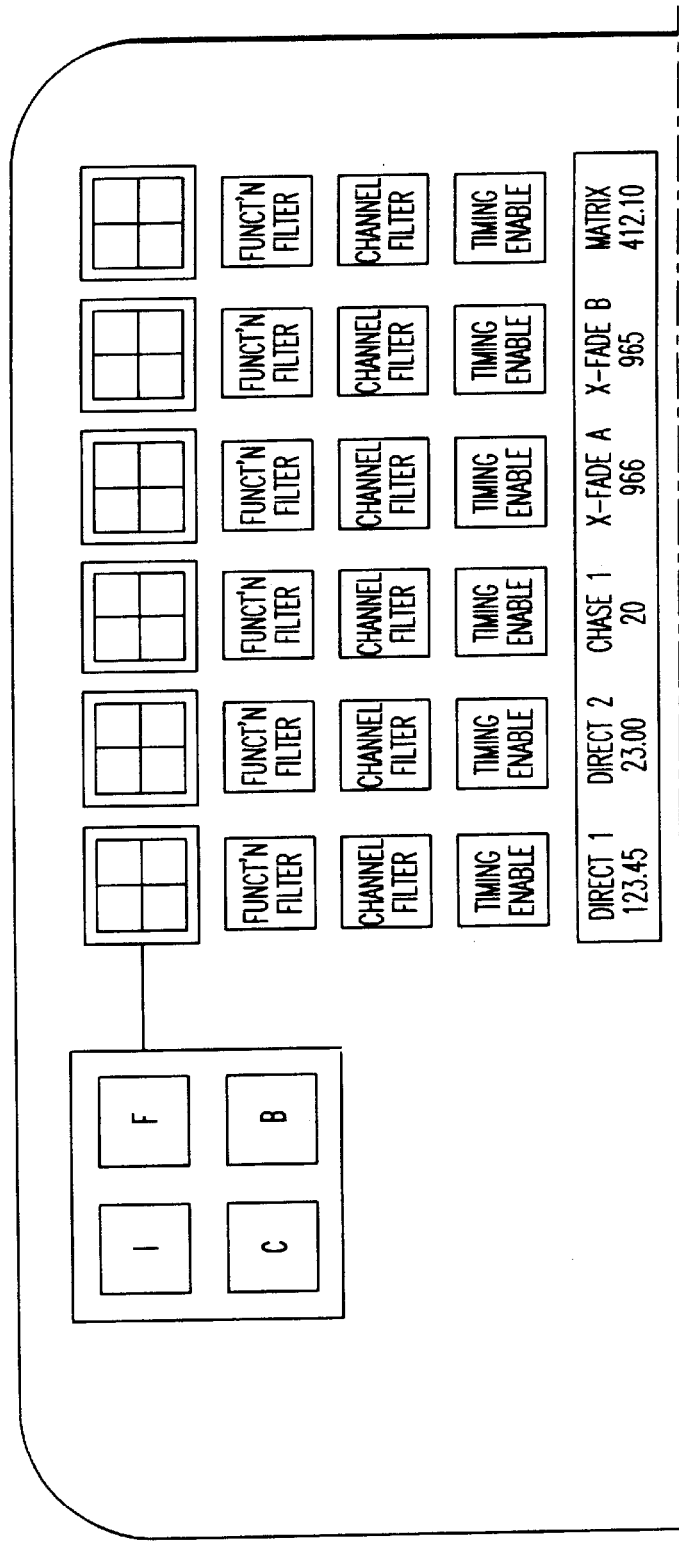

COMPUTER CONTROLLED LIGHTING SYSTEM WITH DISTRIBUTED CONTROL RESOURCES

This application is a continuation-in-part of patent application Ser. No. 08/273,262, filed Jul. 11, 1994, now abandoned, which is a continuation of patent application Ser. No. 08/122,355, filed Sep. 14, 1993, now U.S. Pat. No. 5,329,431, which is a continuation-in-part of patent application Ser. No. 07/988,821, filed Dec. 10, 1992, now abandoned, which is a continuation-in-part of patent application Ser. No. 07/898,385, filed Jun. 9, 1992 now U.S. Pat. No. 5,209,560, which is a continuation of patent application Ser. No. 07/766,029, filed Sep. 26, 1991, now abandoned which is a continuation-in-part of patent application Ser. No. 07/555,946, filed Jul. 19, 1990, now abandoned which is a continuation of patent application Ser. No. 07/249,225, filed Sep. 22, 1988, now U.S. Pat. No. 4,980,806, which is a continuation of patent application Ser. No. 07/120,743, filed Nov. 12, 1987, now abandoned which is a continuation of patent application Ser. No. 06/887,178, filed Jul. 17, 1986, now abandoned.

BACKGROUND FIELD OF THE INVENTION

The present invention pertains in general to stage lighting systems having intelligent remote lighting fixtures and intelligent data distribution networks, and in particular, to the modular control of such remote lighting fixtures and data distribution networks.

BACKGROUND AND DISCUSSION OF PRIOR ART

High performance computer-controlled lighting systems, such as disclosed in U.S. Pat. No. 4,980,806 to Taylor et al., can readily handle the tasks associated with the remote control of multiple-parameter lighting instruments, including the communication of large amounts of data for simultaneously executing multiple parameters in hundreds of lamp units.

However, there exists a demand for increased flexibility in such systems so that individual system components can be upgraded or replaced in an efficient manner, without affecting the operation of the entire system.

In addition, increased flexibility is desired in such systems so that various aspects of the lighting systems can be reconfigured, as necessary, to accommodate the varying requirements of different performances.

Controllers for modern lighting systems often must be capable of simultaneously supporting diverse lamp units having different data requirements. Increasingly, lighting designers are demanding to utilize a variety of control devices and lamp units in their lighting systems in order to achieve desired lighting effects, often including lighting equipment produced by different manufacturers, each having their own unique communications protocols and data formats.

Unfortunately, however, limited space and manpower often makes it impractical to utilize separate lighting controllers to control the different types of lighting equipment used in a single performance. In addition, many operators of lighting consoles demand a standard interface for controlling the different types of lighting equipment used in a single performance in the same manner.

Unfortunately, the development of a standard lighting controller, capable of controlling the varying types of lighting equipment provided by different manufacturers, has been impeded by the diverse communications protocols and data parameters associated with the lamp units provided by the various manufacturers of lighting equipment.

Accordingly, it is an object of the invention to provide a lighting controller constructed of independent, replaceable and reconfigurable modules.

A further object of the invention is to provide an interface system for coordinating communications between one or more control devices and a plurality of lamp units having diverse communications protocols, functions and data formats.

Yet another object of the invention is to provide an improved means for controlling a number of different types of lamp units.

An additional object of the invention is to provide a lighting controller that facilitates the designation of parameters for diverse lamp units.

A further object of the invention is to provide a lighting controller having a standard user interface for accessing diverse lamps units in the same way for each type of lamp unit.

SUMMARY OF THE INVENTION

In one implementation of the invention, a controller is provided for a lighting system adapted to control a plurality of multiple parameter lamp units. The controller comprises: (1) a primary control system having source interface processors for receiving parameter-controlling inputs and a central processing system cooperating with the source interface processors for encoding the inputs into system control commands for exercising control over the lighting system; (2) a plurality of supplementary control units coupled to one or more of the source interface processors of the primary control system for entering parameter-controlling inputs; and (3) one or more of the source interface processors further comprising translating means for translating the parameter controlling inputs to meet requirements of the primary control system.

According to another embodiment of the invention, a lighting system is provided, comprising:
(1) a control system having a central processing system for processing parameter-controlling inputs, the central processing system responding to the inputs and generating system control commands for exercising control over the lighting system;
(2) a plurality of multiple parameter lamp units each having means for producing a light beam having a plurality of adjustable parameters relating to beam characteristics and drive means for controlling a plurality of the parameters, the plurality of lamp units being comprised of:
    (A) a first set of multiple parameter lamp units having memory for storing cues, and processors for executing cues upon receipt of the system control commands identifying cues; and
    (B) a second set of multiple parameter lamp units having a controller for receiving and processing absolute parameter values; and
(3) a communication system for connecting the control system to each lamp unit, the communication system includes a first load interface processor for connecting the control system to the first set of lamps and a second load interface processor for connecting the control system to the second set of lamps, the second load interface processor includes a processor for translating the system control commands into absolute parameter values for the second set of lamp units.

According to a further embodiment of the invention, a modular controller is provided for a lighting system, comprising a central control system having a central processing system for processing parameter-controlling inputs, the central processing system translating the inputs into system control commands for exercising control over the lighting system; a plurality of supplementary control devices for entering parameter-controlling inputs according to a specified format, the parameter-controlling inputs directing the operation of the lighting system; at least one source interface module for connecting the central control system to one or more of the supplementary control devices, the source interface module supporting an independent data network that conforms transmissions to each of the connected supplementary control devices according to the specified input format associated with the supplementary control device; a plurality of multiple-parameter lamp units each having means for producing a light beam having a plurality of adjustable parameters relating to beam characteristics and drive means for controlling a plurality of the parameters in response to the parameter-controlling commands; and at least one load interface module for connecting the central control system to one or more of the multiple-parameter lamp units, the load interface module supporting an independent data network that conforms transmissions to each of the connected lamp units according to the specific communications protocol associated with the lamp units.

From the process point of view, the invention can be summarized as a method for controlling a lighting system having a primary control system from any one or all of a set of supplementary control units having diverse signal formats, the primary control system having a central processing system, the control method comprising the steps of generating supplementary control commands at one or more of the supplementary control units; coupling the supplementary control commands to the primary control system; translating the supplementary control commands generated by one or more of the supplementary control units into a format compatible with the primary control system; and processing the translated supplementary control commands in the central processing system into system control commands for exercising control over the lighting system.

According to another embodiment of the invention from the process point of view, the invention can be summarized as a method for controlling a lighting system having a control system and a plurality of multiple parameter lamp units, the method comprising the steps of generating parameter controlling inputs; processing the parameter-controlling inputs for directing the operation of the lighting system; generating system control commands for exercising control over the lamp units; transmitting the system control commands to a first load interface processor and a second load interface processor each connected to the control system and one or more of the multiple parameter lamp units; transmitting the system control commands from the first load interface processor to the connected lamp units; translating the system control commands in the second load interface processor into absolute parameter values; and transmitting the absolute parameter values from the second load interface processor to the connected lamp units.

Other advantages of the present invention will become apparent in the following Detailed Description taken with the accompanying Drawings.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF PREFERRED EMBODIMENTS

Figure 1:
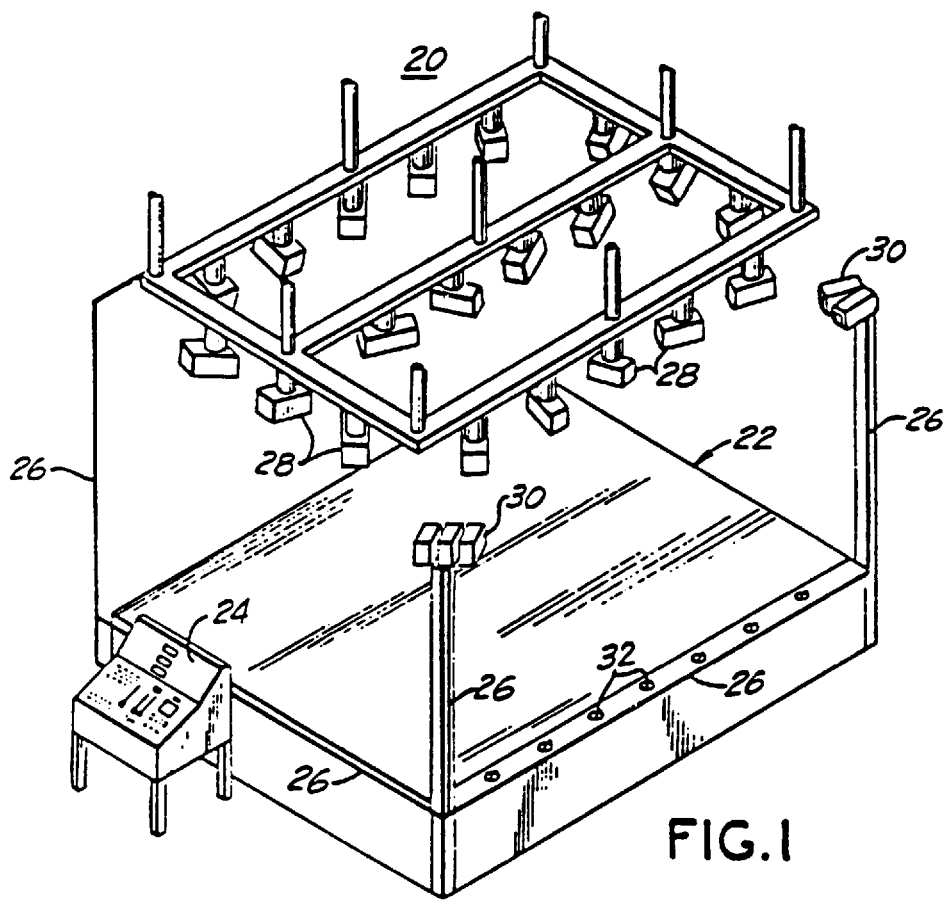
FIG. 1 is a perspective view of a computercontrolled lighting system of the type which may embody the present invention as set up for illuminating a stage.

The present invention is an automated lighting system for providing illumination to a stage performance. Such automated lighting can provide a wide variety of illumination effects which are not possible with fixed lighting instruments. A typical installation for a computer controlled lighting system in accordance with the present invention is illustrated in FIG. 1. The system 20 is shown as it would be installed for illuminating a performance on a stage 22. The operation of the system 20 is directed by a control console 24 which serves to manually set the lighting effects of the system 20 or to automatically command the system 20 to produce a desired lighting effect determined by stored lighting cues. The console 24 is connected via a data link 26 to each lamp unit within a group of lamp units, one lamp unit being shown by the reference numeral 28.

Each of the lamp units, such as 28, have a unique address such that there can be individual communication between the console 24 and each of the lamp units. The data link 26 is further connected to pedestal lamps, such as 30 and floor lamps, such as 32. The lamps 30 and 32 are fixed but the intensity of these lamps can be controlled by commands generated by the console 24. In operation, the system 20 causes the movable lamps, such as 28, to be adjusted individually for pan, tilt, color, intensity and beam size while the pedestal lamps 30 and floor lamps 32 are adjusted for intensity. With the addition of color-changer mechanisms 34, pedestal lamps 30 can also be adjusted for color. The system 20 is operated to provide a sequence of "cues" for illuminating the stage 22. Each lamp unit in the system 20 can have an individual response required for each of the cues. A complete performance may require the setting of several hundred cues to provide desired lighting effects.

The system 20 illustrated in FIG. 1 shows a small number of lamp units, such as unit 28.

However, an actual stage performance may require several hundred of such lamp units. In fact, a large outdoor rock concert could require the use of up to 1000 lamp units. It can readily been seen that many thousands of commands must be generated for driving each parameter of each lamp for each of the cues within a performance. It is very possible to require ten of thousands of commands during a single performance.

The lighting effects provided by the system 20 must be properly synchronized with the stage performance to produce the programmed entertainment effect. Should any one of the lamps respond incorrectly or fail to respond, the visual effect may be destroyed. It is therefore vitally important that the lamps properly respond to the cues which are initiated by the console 24.

In previous automated lighting systems, it has been necessary for a control processor to generate each command required for setting each parameter for every light in the system. As noted above, this can require that the control processor generate tens of thousands of commands and that each of these commands be accurately conveyed via a data link to the lamps. Should there be any error in the data transmission, the lamp may respond erroneously and harm the visual effect. The electrical environment in the region of a performing stage includes many types of interference due to the heavy consumption of electrical power, for both audio and lighting equipment, in a very limited area. This electrical interference can interfere with the data transmission from the console to the lamps and can cause the lamps to improperly respond. The system 20 of the present invention is designed to overcome many of these problems while providing the capability for almost unlimited expansion in the number of lamps which can be utilized at any one time for a performance.

Figure 2:
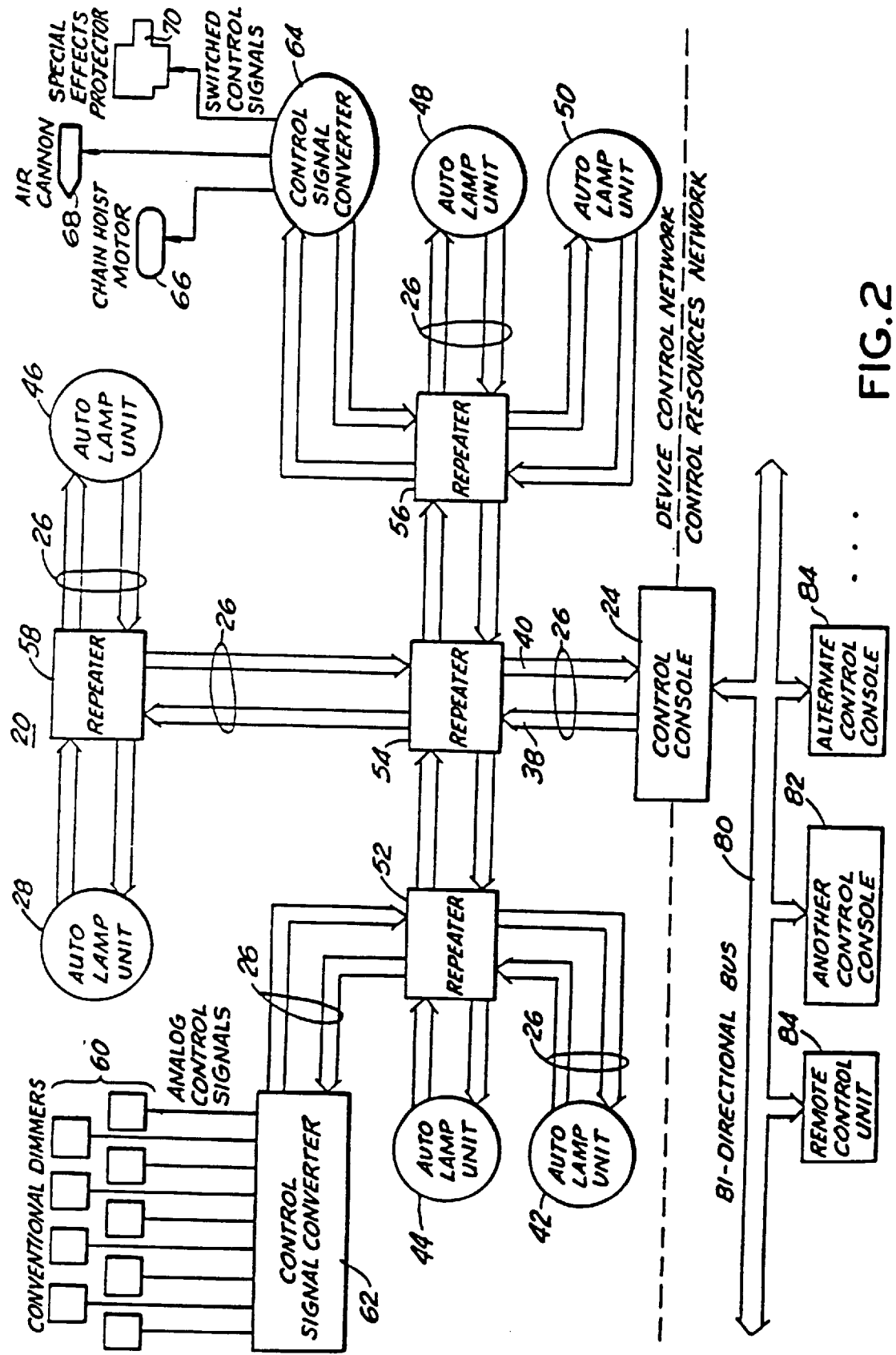
FIG. 2 is a block diagram of the lighting system of the type which may embody the present invention, which illustrates the communication between the control console and the various lamp units as well as other items of stage equipment.

A functional block diagram of the system 20 as it is utilized to control a plurality of items of stage equipment is shown in FIG. 2. The control console 24 is connected to operate through the data link 26 for controlling a plurality of items of stage equipment . The data link 26 includes bidirectional paths 38 and 40. Path 38 of data link 26 provides data communications between the control console 24 and each of the lamp units and other units within the system 20. The path 40 provides data communication from each of the lamp units in the system 20 back to the control console 24.

In addition to the lamp unit 28, additional lamp units 42–50 are shown in FIG. 2.

The data link 26 extends to cover a considerable area in the region of the stage 22. To maintain the integrity of the electrical commands that are transmitted through link 26, there are provided a group of repeaters 52, 54, 56 and 58. The repeaters 52–58, which are further described in detail below, provide amplification and isolation for the data transmit ted through the data link 26.

The control console 24 serves not only to control the automatic lamps, such as 28, but can also be used to control a plurality of co nventional dimmers such as set 60. The data link 26 is connected to a control signal converter 62 which transforms the digital signals received through the link 26 into analog control signals for directing the operation of the dimmers with in set 60.

The control console 24 can also be used to control a plurality of conventional color changer mechanisms 34, such as gel scrollers, affixed to conventional lamps 30. The data link 26 is connected to a control signal converter 63 which, like converter 62, transforms the digital signals received through the link 26 into analog control signals for directing the operation of color changers 34. Converter 63, however, is programmed to store intensity and color parameters for each control channel, and is further programmed to produce at least two analog control voltage outputs for each logical control channel, one such output being applied to one of the conventional dimmers 60 and another output being applied to a corresponding one of color changers 34.

This arrangement simplifies programming of the lighting system, since an operator can specify intensity and color parameters of a suitably equipped lamp unit by selecting a single control channel. Also, by logically separating color controlling outputs from intensity controlling outputs of the control signal converter 63, the converter can be programmed to maintain the position of the color changer mechanism while fading-out the intensity of the conventional lamp units. This eliminates the annoying effect of colors changing while fading-out the system with the Grand Master fader.

The repeaters 52–58 serve to expand the connections to the data link 26. This is termed "fan out".

Other stage action effects may additionally be controlled by the console 24. For example, the data link 26 can be connected to a control signal converter 64 from the repeater 56. Converter 64 can produce control signals for directing the operation of a chain hoist motor 66, an air cannon 68 and a special effects projector 70.

The control console 24 serves as an interface to the collection of stage devices which are subject to control. These stage devices and the associated control are termed a "Device Control Network". The control function is provided by a plurality of units which include the console 24. This group of control units is termed the "Control Resources Network". This network includes a bidirectional bus 80 which provides data communication between the control console 24 as well as additional or alternate control consoles such as 82 and 84. The direction of the system 20 can further be effected at a remote location by operation through a remote control unit 84 which is also connected to the bidirectional bus 80.

Figure 3:
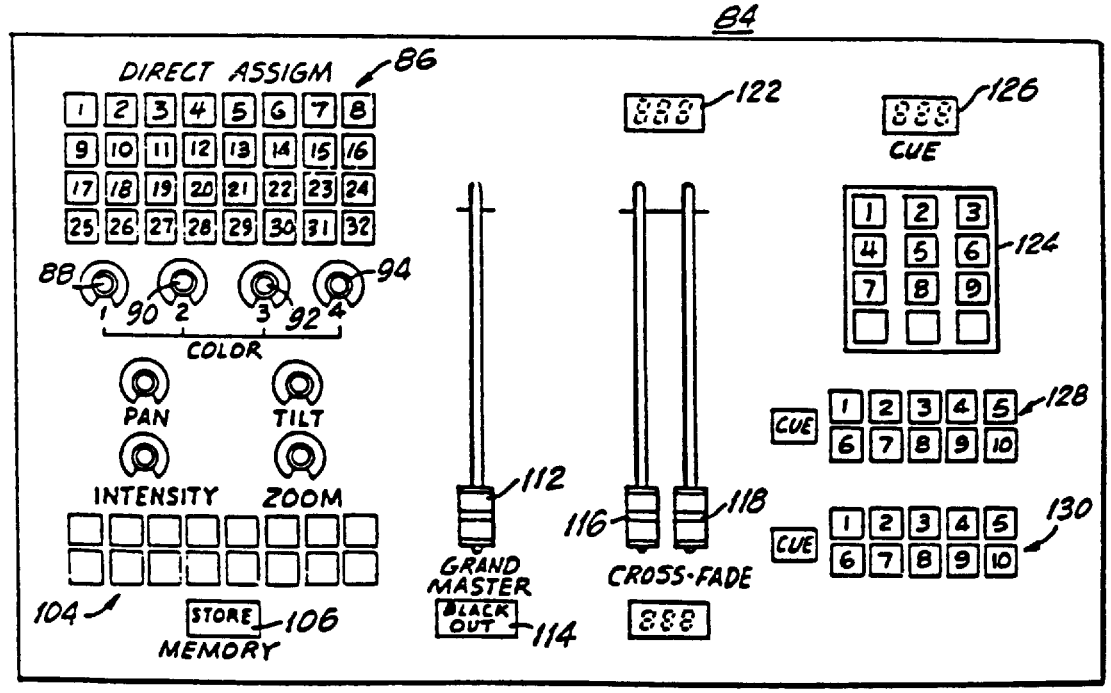
FIG. 3 is an illustration of the front panel for a control console for a lighting system of the type which may embody the present invention.

A front panel 84 for the control console 24 is illustrated in FIG. 3. The panel 84 serves to directly control each of the automated lamps, such as lamp unit 28, or to provide automatic control for all of the lamp units. The panel 84 includes a group of key switches 86 which provides direct assignment of cue numbers for particular lighting setups. A group of rotary controls 88, 90, 92 and 94 provide color selection for a particular lamp unit or group of lamp units. Rotary controls 96, 98, 100 and 102 provide respective control of pan, tilt, intensity and zoom for each of the lamps. A group of key switches 104 provide function of preset color selection. A particular lighting cue is entered into a console memory by operation of a store switch 106.

A grand master fade control 112 provides overall fading effects for all of the system 20 lights at one time. A black-out switch 114 turns off all lamps at one time. Cross faders 116 and 118 provide relative intensity control during a transfer from one cue to the next. The numbers of the cues involved in such a transfer are shown by indicators 120 and 122. Cue numbers are entered at the console 24 through a key pad 124. An "S" key is provided for storing a cue while an "E" key is provided for entry of a new cue. The current cue, which has been entered at the key pad, is shown by an indicator 126. A group of key switches 128 provide for the entry of cue numbers for a first cue. A group of key switches 130 provide entry of a cue number for a second cue.

The control panel 84 can take many forms provided that it allows for direct manual control of the lamp units as well as for storing and recalling of cues for the system 20.

Figure 4:
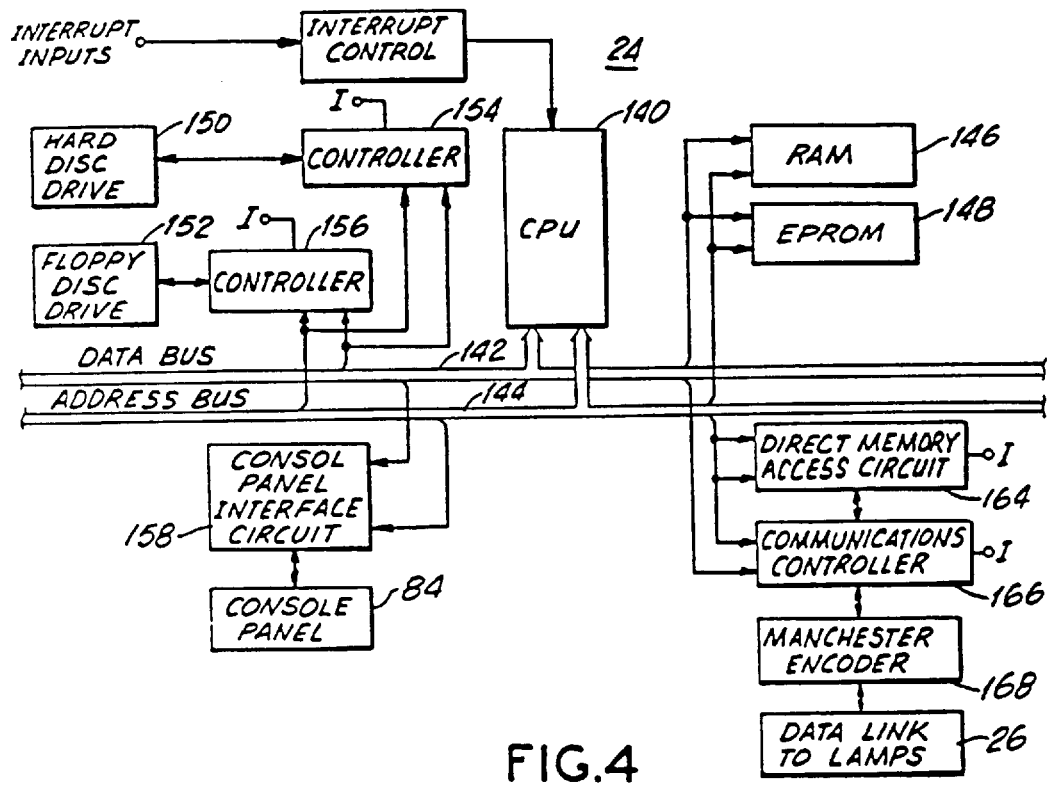
FIG. 4 is a block diagram for the electronic subsystems which are of the type which may be a part of the control console.

An electrical block diagram for the console 24 is illustrated in FIG. 4. The overall control of the console 24 is carried out by a central processing unit (CPU) 140. A representative microprocessor for use as the CPU 140 is a model 68000 manufactured by Motorola. The CPU 140 is connected to a data bus 142 and an address bus 144. The control console 24 is provided with random access memory (RAM) 146 and electronically programmable read only memory (EPROM) 148. Both of the memories 146 and 148 are connected to the data bus 142 and the address bus 144. The CPU 140, as well as other elements of the console 24, can both write to and read from the memories 146 and 148.

A hard disk drive 150 is provided in the console 24 for bulk storage of programs and data. There is further provided a floppy disk drive 152 for reading and writing conventional floppy diskettes. A controller 154 is connected to operate the hard disk drive 150 and is connected to the remainder of the circuit of console 24 through the data bus 142 and address bus 144. Likewise a floppy disk drive controller 156 is connected to operate the floppy disk drive 152 and is further connected to the data bus 142 and the address bus 144. The console panel 84, that is, the switches, lights, optical encoders, potentiometers and alphanumeric displays thereon, is accessed through a console panel interface circuitry 158 which is connected both to the console panel 84 and to the data bus 142 and address bus 144.

Communication with the automated lamp units is carried out by use of a direct memory access circuit 164, a communications controller 166 and a Manchester encoder 168. The data bus 142 and address bus 144 are both connected to the direct memory access circuit 164 and the communications controller 166. Communication is also provided between circuit 164 and controller 166. The Manchester encoder 164 bi-directionally communicates with the communications controller 166 and also transmits and receives data to and from the data link 26.

Figure 6:
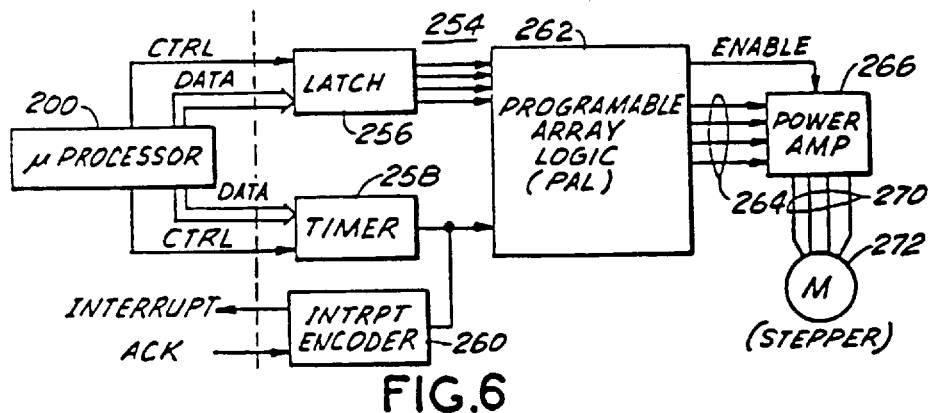
FIG. 6 is a block diagram illustrating a lamp unit stepper control system.
Figure 7:
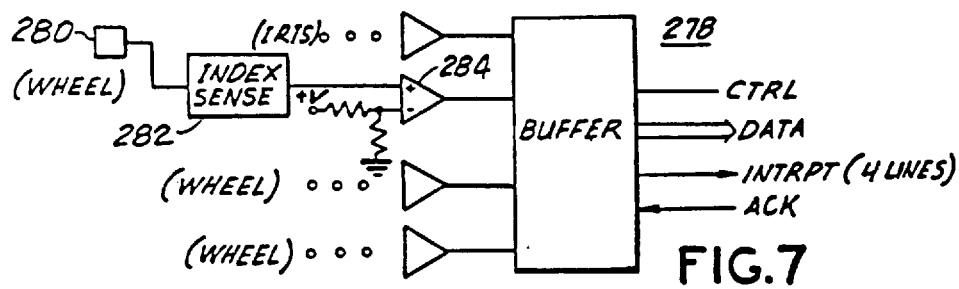
FIG. 7 is a block diagram illustrating an index sensor system for use with the stepper motors in a lamp unit.
Figure 5:
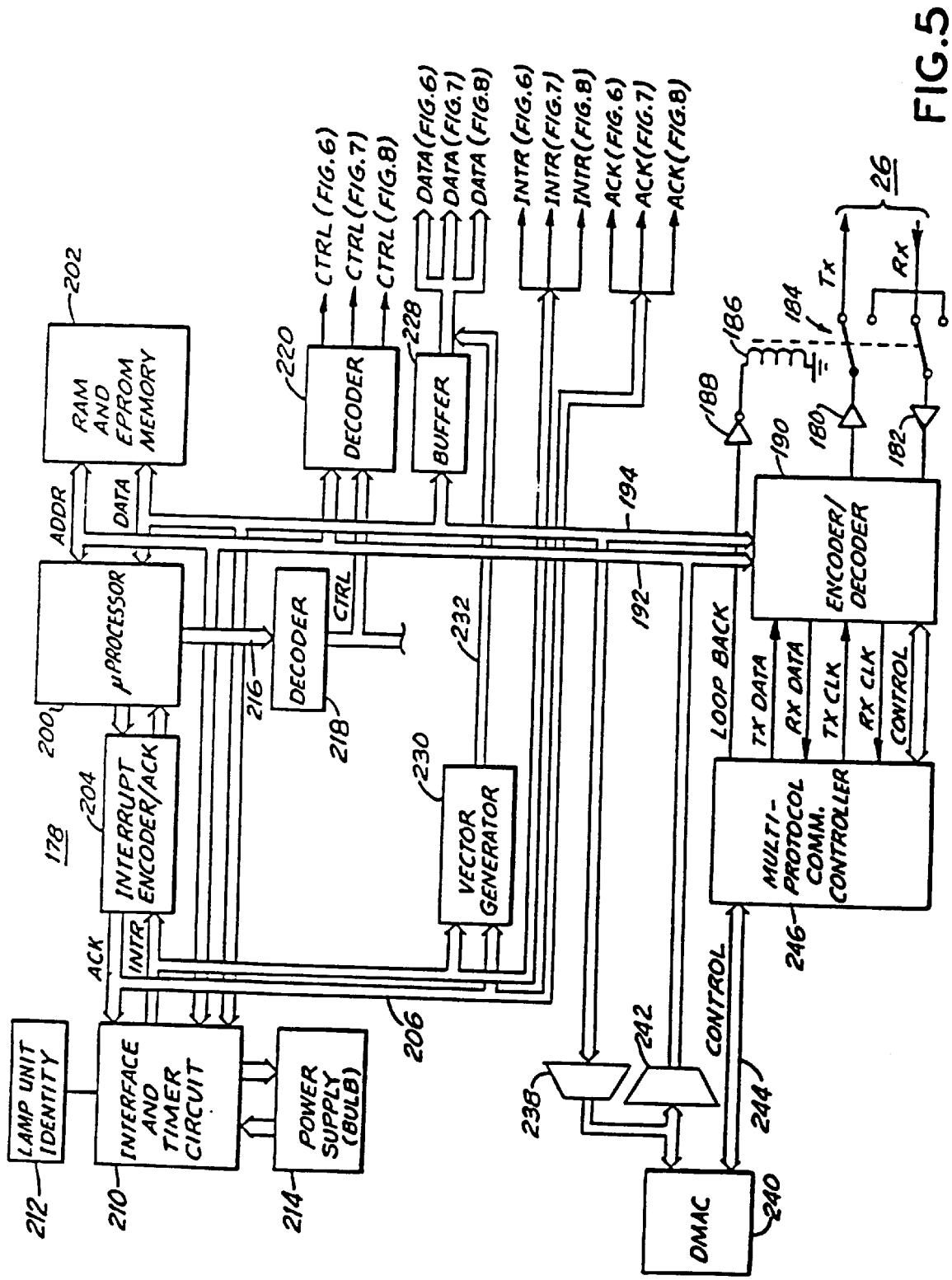
FIG. 5 is an electronic block diagram of the lamp processor system portion of a lamp unit.
Figure 8:
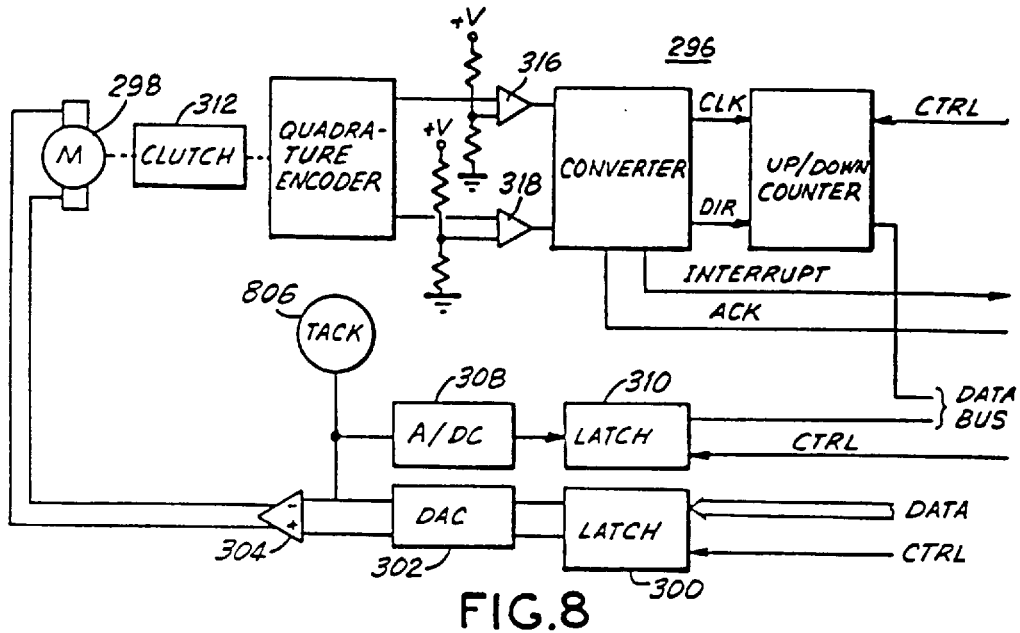
FIG. 8 is a block diagram illustrating servo feedback control of a motor within a lamp unit including rate of movement control and position monitoring.

FIGS. 5, 6, 7 and 8 are block diagrams illustrating the electronics in a lamp unit of the type which may embody the present invention. FIG. 5 specifically shows the lamp processor, memory and associated components. FIGS. 6, 7 and 8 are block diagrams showing circuitry that specifically drives particular parameters of the light beam in a light unit.

Referring now to FIG. 5, there is shown a lamp processor system 178. The data link 26 has the transmit and receive lines thereof connected through respective amplifiers 180 and 182. The transmit and receive lines of the data link 26 are connected through a switch 184 which is operated by a solenoid 186 that is driven by an amplifier 188. The switch 184 provides a "loop back" capability for making a direct connection between the transmit and receive lines in the data link 26 such that the lamp unit processor can perform self-testing without the use of the data link 26. The transmit and receive lines of the data link 26 are input into an encoder/decoder 190. (Harris Semiconductor Products Division Model HD-6409). The encoder/decoder 190 is connected to a lamp unit address bus 192 and a lamp unit data bus 194.

The lamp processor system 178 includes a microprocessor 200 which directs the overall functioning within the lamp unit and specifically generates the commands which drive the mechanisms for controlling the parameters of the light unit. Microprocessor 200 is preferably a Motorola Model 68000. These parameters include pan, tilt, intensity, color and beam size. The microprocessor 200 is connected to the address bus 192 and the data bus 194. The lamp processor system 178 further includes a RAM and EPROM memory 202. The programs for driving the various parameters to the desired states and the cues for determining what these states shall be are stored in this memory. The microprocessor 200 is further connected to receive interrupts and send acknowledgements through an interrupt encoder/acknowledge circuit 204 (Motorola Model 68230) by use of an acknowledge bus 206 and an interrupt bus 208.

Interface and timing of the various circuit elements within the lamp processor system 178 is provided by an interface and timing circuit 210 (Advanced Monolithics Model 9513). The identity of a particular lamp unit is determined by a thumb wheel setting which is included in a lamp unit identity circuit 212. This identity is input to the interface and timer circuit 210. A bulb power supply 214 has various interrupt and acknowledge states which are also transmitted to the interface and timer circuit 210. The microprocessor 200 generates a series of control signals which are transmitted through a bus 216 to a decoder 218. The output from the decoder 218 comprises a group of control signals which are directed to a decoder 220 and further distributed as control commands throughout many of the circuits in the lamp processor system 178. A group of control signals are produced by the decoder 220 and transferred as control signals to the specific control circuits shown in FIGS. 6, 7 and 8.

The data transmitted through the data bus 194 is provided to a buffer 228 which in turn transfers the data to the various parameters control circuits shown in FIGS. 6, 7 and 8.

The interrupt and acknowledge signals on lines 206, 208 are provided to a vector generator 230 which generates corresponding vector states that are transmitted through a bus 232 for transmission through data lines to the parameter control circuits shown in FIGS. 6, 7 and 8.

The interrupt signals produced on line 208 are further provided as interrupt signals to the parameter control circuits in FIGS. 6, 7 and 8. Likewise, the acknowledge signals produced by the parameter control circuits in FIGS. 6, 7 and 8 are transmitted through bus 206 to the interrupt encoder/acknowledge circuit 204.

The data bus 194 is further connected to a buffer 238 which transmits the data to both a direct memory access circuit 240 (Motorola Model 68440) and to the input of a buffer 242. The output of the buffer 242 is provided to the address bus 192. Handshake control signals are passed between the DMA controller 240 and the multiprotocol controller 246 to synchronize the high speed communication of data to and from the microprocessor 200.

A control bus 244 serves as a bidirectional connection between the direct memory access circuit 240 and a multiprotocol communication controller 246. (Rockwell International Corp. Model 68561). The encoder/decoder 190 provides received data and received clock to the controller 246. Transmit data and transmit clock are passed from the controller 246 to the encoder/decoder 190. Various control signals are exchanged between the controller 246 and the encoder/decoder 190.

In the event an interrupt generating event occurs, the multiprotocol controller 246 asserts an interrupt output directed to the microprocessor 200. In response to an interrupt acknowledgement from the microprocessor 200, the controller 246 places interrupt vectors on the data bus 194. In a conventional manner, the microprocessor 200 temporarily interrupts processing to service the interrupt.

The multiprotocol controller 246 has serial data transmit and receive inputs in addition to a parallel system data input. The multiprotocol controller 246 of the type identified is capable of DMA data transfers up to a rate of 2 megabits per second. The high speed data stream of this nature permits the downloading of the substantial light unit cue information in a very short period of time.

The encoder/decoder 190 operates in conjunction with the communications controller 166, shown in FIG. 4, to convert the format or protocol of the data transmitted serially through the control processor 24 into a format acceptable by the lamp processor circuit 178.

Lamp processor system 178 includes a network of clock, control and power lines (not shown) which are routinely required for the operation of a microprocessor circuit.

The lamp processor system 178 serves to initialize the entire lamp unit, command the operation of the parameter control circuits in response to manual input commands from the console or from stored cues, transfer stored cues from the memory 202 back to the control console for storage, and respond to broadcast commands received through the data link 26 for recalling cues from the memory 202 for commanding the operation of the parameter control circuits, which are shown in FIGS. 6, 7 and 8.

Referring now to FIG. 6 there is shown a parameter drive circuit 254 which serves to operate stepper motors that are used within a lamp unit. Such a stepper motor is used, for example, for selecting color, determining iris size and selecting a gobo pattern. The microprocessor 200 has control and data paths, which are described in FIG. 5 that are connected to a latch 256 and a timer 258. The interrupt and acknowledge lines noted in FIG. 5 are further provided to an interrupt encoder circuit 260. The data captured by the latch 256 is transferred through a plurality of lines to a programmable array logic (PAL) 262. The PAL 262 produces a combination of control commands that are sent through a cable 264 and an enable line to a power amplifier 266. The amplifier 266 generates a series of power signals which are transmitted through a group of lines 270 to a stepper motor 272. The power signals on lines 270 cause the motor 272 to move, in a sequence of steps to a desired angular position.

The timer 258 produces timing signals required for the operation of the stepper motor. These timing signals are provided to both the interrupt encoder circuit 260 and the PAL 262. Thus, when it is required that a stepper motor change position, the microprocessor 200 produces a control command that is sent as data to the latch 254. The latched data is then transferred into the PAL 262 which converts it into control signals that are amplified by the amplifier 266 and provided to the stepper motor 272. When each operation required of the stepper motor has been carried out, an appropriate interrupt or acknowledge command is transmitted through the circuit 260 back to the microprocessor 200.

A further parameter control circuit 278 is shown in FIG. 7. The circuit 278 is used with mechanical control parameter units which require position sensing. For the present embodiment the circuit 278 is used to control three wheels and one iris. Each of the wheels and iris has a sensor. An example is presented for operation of a wheel, such as a color wheel, by a stepper motor. The wheel includes a mark, or magnet which is detected by a sensor 280 which is operated by an index sense circuit 282. The detected index is provided to the noninverting input of an amplifier 284. A fixed reference voltage is provided to the inverting input by operation of resistors 286 and 288. The output from the amplifier 284 is provided to a buffer 290. The output of the buffer provides address control, data, and interrupts for each of the parameter circuits to the microprocessor 200. An acknowledgement of each interrupt is provided to the buffer 290.

Referring now to FIG. 8 there is shown a parameter control circuit 296 which provides drive and feedback control for parameters such as pan and tilt. The data bus from the microprocessor 200, as shown in FIG. 4, provides both position and rate of change feedback and rate of change command data for a servo motor 298. The speed control data is input to a latch 300 which outputs the data to a digital to analog converter 302 which produces an analog signal that is input to the noninverting terminal of a driver amplifier 304. The driving terminals of amplifier 304 are connected to the terminals of motor 298. A tachometer 306 monitors the speed of motor 298 and provides a corresponding analog signal to the inverting input of amplifier 304. Thus, there is provided a feedback loop for determining the rate of rotation of the motor 298. The angular speed information is further transmitted to an analog to digital converter 308 which provides the digital form of the speed information to a latch 310. The output from latch 310 is provided as a data signal back to the microprocessor 200.

The motor 298 is physically connected through a clutch 312 to a quadrature encoder 314. The two outputs from the encoder 314 are provided respectively to first inputs of amplifiers 316 and 318. The second inputs of these amplifiers are set to reference values by operation of resistors connected between the power supply and ground. The outputs from the amplifiers 316 and 318 are provided to a converter 320 which transforms the analog position signals into digital signals which are transmitted through a clock line and a direction of rotation line to an up/down counter 322. The output from the counter 322 is an indication of the position of the motor 298 and is transmitted through the data bus back to the microprocessor 200. The converter 320 further serves to produce an interrupt signal and to receive an acknowledge signal which are exchanged with the microprocessor 200.

Figure 9:
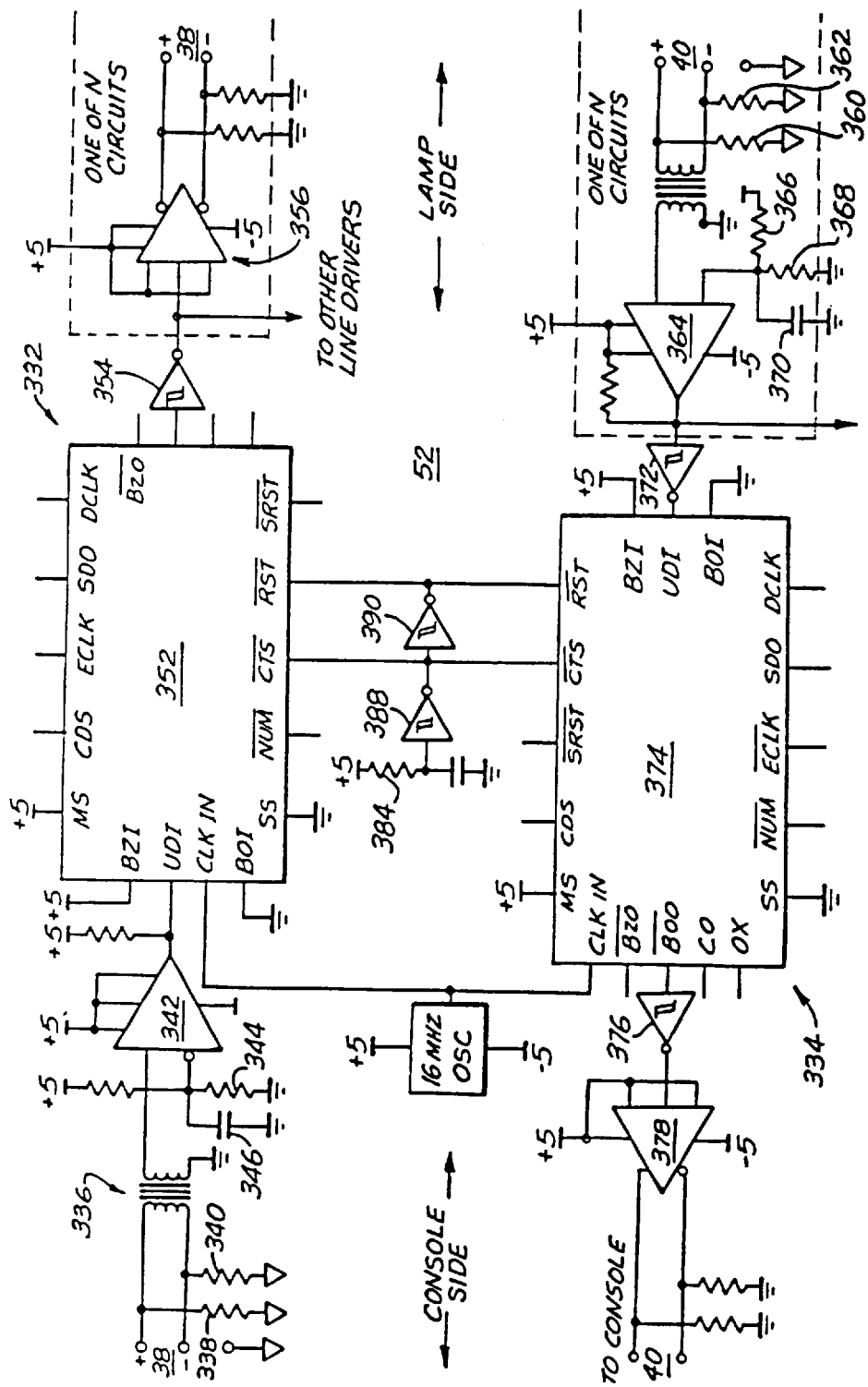
FIG. 9 is a detailed schematic diagram for a repeater as shown in FIG. 2.

The repeater 52, which is similar to each of the repeaters shown in FIG. 2, is described in further detail in FIG. 9. The purpose of the repeater 52 is to provide high speed data transmission between the lamp units, as well as other controlled stage devices, and the control console 24. The repeater 52 is connected serially with the data link 26. The repeater 52 provides bidirectional communication for the paths 38 and 40. The lamp units and the consoles can each be considered to be both a source and a destination. The description of the repeater 52 is made in reference to the control console being a source and the lamp units being destinations.

The repeater 52 is designed to handle high speed data transmission through the paths 38 and 40 which are preferably 50 ohm transmission lines. Repeater 52 has a transmitter section 332, the upper portion shown in FIG. 9, and a receiver section 334 which is shown in the lower portion of FIG. 9.

The data link path 38 is connected to the input terminals of a transformer 336. Resistors 338 and 340 are connected respectively between the two conductors of path 38 and ground. Further, the data link path 38 is provided with a shield which is also grounded. The secondary of transformer 336 is connected to the noninverting input of an amplifier 342. The inverting input is connected between biasing resistors 342 and 344. A capacitor 346 is further connected between the inverting input of amplifier 342 and ground.

The output of amplifier 342 is connected to the input of a Manchester encoder circuit 352. The output from the Manchester encoder circuit 352 is passed through an invertor 354 to one or more differential current line drivers. The output of invertor 354 is connected to one such line driver 356. The output from the line driver 356 is further connected into the path 38 for transmission to another repeater, such as 52, or to an ultimate destination such as a lamp unit.

In the receiver section 334, the path 40 is connected to the primary terminals of a transformer 358. Resistors 360 and 362 are connected between the conductor lines of path 40 to ground. Again, the shield of link 40 is grounded. The secondary of transformer 358 is connected to one input of an amplifier 364. The second input of amplifier 364 is connected to the junction of resistors 366 and 368. A capacitor 370 is connected between the junction of resistors 366 and 368 and ground.

The output signal from the amplifier 364 is passed through an invertor 372 to the input of a Manchester encoder 374. The output from encoder 374 is further passed through an invertor 376 to the input of a differential line driver 378. The outputs from line driver 378 are connected to drive the differential terminals of path 40 of data link 26. The path 40 is directed to the control console 24 or to the receiver section of a further repeater, such as repeater 52. The Manchester encoders 352 and 374 are driven by an oscillator 382 which provides inputs at a clock rate of 16 mHz. The repeater 52 further includes a startup circuit which comprises a series combination of a resistor 384 and a capacitor 386. These series components are connected between the positive voltage supply and ground. An invertor 388 has the input thereof connected to the junction of resistor 384 and capacitor 386. The output of invertor 388 is connected to the CTS inputs of encoders 352 and 374. The output of invertor 388 is further connected to the input of an invertor 390 which has the output thereof connected to the reset inputs of the encoders 352 and 374. At power-up, the reset signals to the encoders 352 and 374 are at an initial low logic level for a short period of time. When the capacitor 386 is charged, the reset logic state changes and goes to a high logic level for normal operation. Thus, the digital circuits the Manchester encoders are set to predefined states when power is initially applied.

In a selected embodiment of the present invention, the Manchester encoder/decoders, such as 352 and 374 as well as encoder 168 shown in FIG. 4, comprise an integrated circuit model HD-6409 manufactured by Harris Semiconductors Products Division. The Manchester encoders 352 and 374 have the mode select input connected to a logic high level thereby selecting the repeater mode. The Manchester circuit operates by receiving the high speed data stream for conversion into the nonreturn to zero (NRZ) form. The clock signal is recovered from the data stream in a conventional manner. The data stream is then retimed and reconstructed before being output to the invertor. In this manner any distortion in the nature of pulse width, delay or otherwise is not compounded through the transmission in the data link. The reconstruction and retiming of the high speed data stream at each repeater serves to significantly reduce the data error rate through the data link 26.

In accordance with a primary feature of an embodiment of the invention, there is provided a decentralized control over the operation of each lamp unit. By this it is meant that high level commands are dispatched by the console processor to the lamp units. This is termed a "broadcast command." Each lamp processor responds in an appropriate manner defined by the program and previous condition at that particular lamp processor. This is in contrast with prior art systems wherein the console processor stores all of the current information and data concerning the status of each lamp unit and each parameter within each lamp unit. In these prior art systems, all the cue storage of data information has been handled completely by the console processor itself, and the only data that was transmitted to the pertinent lamp units were the very detailed instructions, such as the number of pulses necessary to rotate a particular stepper motor a desired number of degrees. This is to be distinguished from the system according to an embodiment of the present invention which is configured such that the console reads its control inputs, and upon sensing a change does minimal processing of the changed input (such as providing the ordinal number of a switch or the identifier of a fader) and transmits this change signal to all lamps units simultaneously, in a single high level message. Each lamp unit then recognizes the intended effect of this change and calculates the desired response within its own processor. In processing a high level command, each lamp unit processor requires no interaction with the other lamp units, or with the console. For example, a single message that a fader on a console has been moved is transmitted to all the lamp units simultaneously. Each lamp unit processor recalculates the balance of the recalled cue information based on the individual involvement with the cue. Various lamp units may have different actions for one cue, some lamp units may not be active at all. With this new configuration, all cue memory for instantaneous recall is maintained in each individual lamp unit memory. Each lamp unit thus has available all cue information within the unit itself. However, for backup and long-term or secondary storage, the console processor maintains a copy of the cue data for each lamp unit. This backup is maintained on a disk storage and is read into the memories of the lamp unit upon system initialization at lamp replacement or for a complete memory change over.

It can be seen from the foregoing that the efficiency and reliability of the system has improved since the large body of cue data is transmitted through the narrow band-width communications link only once, namely, at system initialization. Thereafter, the cue data is available within each lamp unit, where the reading and writing thereof is performed in the environment of the high band-width local memory. It is seen from the foregoing that the efficiency of the system is optimized, especially in situations where there is a concurrency of activity of each lamp unit in response to a newly generated command. The command from the console is simply transmitted to each of the lamp units in a system- wide manner as a broadcast command in one transmission. The activity required in each lamp unit is carried out independently of the activity in other lamp units, and without further data transmissions from the console. This results in a considerable saving of time and enhancement of reliability. This is due to the parallelism in the data link transmission. Moreover, the addition of more lamp units to the system does not significantly burden the console processor nor the data link. The system is always maintained in an optimum manner upon the addition of lamp units since each lamp unit adds the necessary processing power and memory required for carrying out its function. Very little additional load is added to the work of the console processor when a lamp unit is added to the system.

Figure 10:
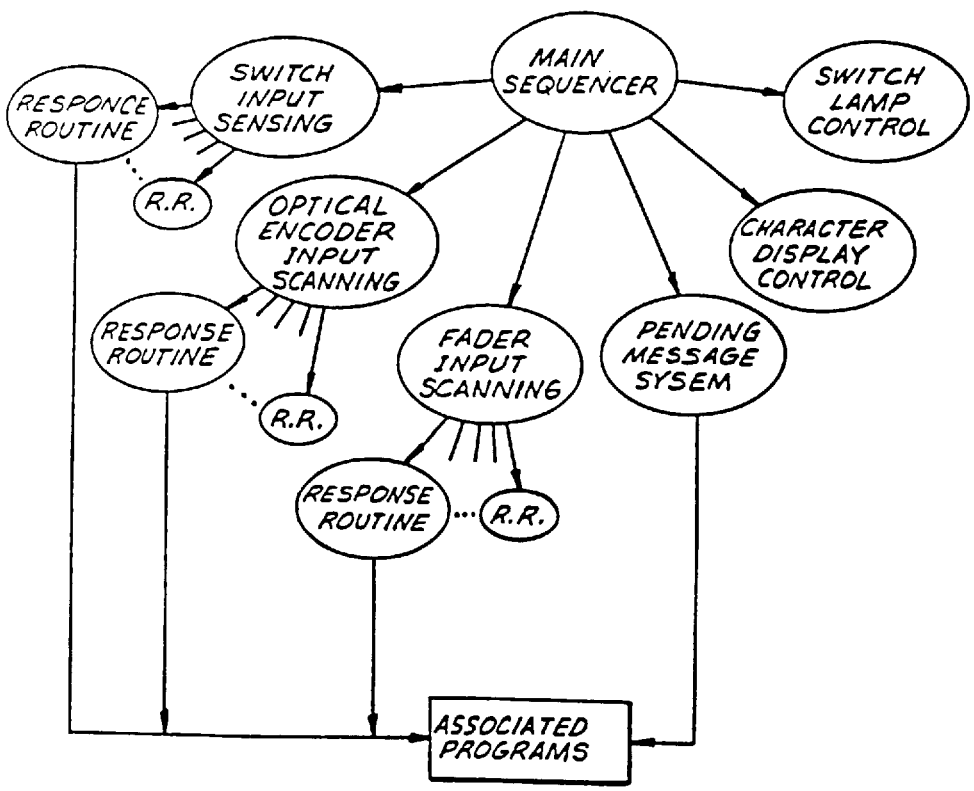
FIG. 10 is a flow diagram illustrating the operation of programs in the control console which includes a main sequencer that steps through a number of sensing, communication and other operational control programs.

With the foregoing in mind, the console will be described next in connection with the functions of the processor system. FIG. 10 depicts the primary functions of the console processor complex in flow chart form. On initial power up of the console, the console circuitry is initialized with predetermined internal variables, whereupon the processor enters the main sequencer program. This program is in the nature of an endless loop which branches out to other subsidiary programs in a predefined and unvarying sequence. When each subsidiary program is entered in the sequence, it performs a specific function before returning to the main sequencer loop.

One of the subsidiary programs of the console is the switch input sensing program. This program performs a complete scan of all the console switches appearing on the front panel thereof. The depression or release of any switch is sensed by the processor complex, whereupon the appropriate response routine is activated for each switch in which a depression or release was sensed. The status of each newly activated switch is transferred to the response routine.

The switch input sensing response routines are individual scripts which specify actions to be taken when a certain switch is pressed or released. Some switches are functionally grouped together and therefore employ the same response routine. In this event, the number of the switch within the common group is identified during the response routine, in which the number is used as a switch identifier in the script which is common to all switches in the group. Examples will be described below.

A second subsidiary program which the console processor enters in the sequence, is the optical encoder input scanning program. As noted above, the rotary location of various console devices are determined, and acted upon accordingly. The rotary input devices on the console front panel comprise optical encoder/hardware counter circuits of conventional design. The optical encoder input scanning program is operable to read the counter values for each encoder, and compare the new value to the value which was stored in accordance with the previous scan. If the comparison indicates a change in the position of the rotary device, the identifier for that encoder is combined with the amount by which the value has changed, the result being sent as a command message via the network to all lamp units. The lamp units individually determine whether the change in the rotary status of the console device requires a response in the particular lamp unit.

A fader input scanning subsidiary routine appears as the third routine encountered by the main sequencer. This routine responds to the change of position of the slider fader control devices appearing on the console panel. The faders are essentially resistive potentiometers, and the sensing of the linear motion thereof is accomplished by analog to digital converters. In this manner, when the fader position is changed, a new digital encoded number will be provided at the output of the sensing circuit. It is understood that other sensing circuits can be used with equal effectiveness. The fader input scanning program reads the current input value of each fader sensor circuit, and responds only if the value has changed from the value previously stored. As with the optical encoder input scanning program, if the sensing of the fader shows a new position, the fader identifier is combined with the actual value read from the fader, and the information is sent via the network to all lamp units as part of a command message. The lamp units each determine the applicability of the new fader value based upon the fader identifier and the lamp unit's internal state.

A pending message manager subsidiary program comprises an additional program entered in the sequence by the main sequencer. In certain circumstances, the console switches can be activated by the operator faster than the corresponding messages can be transmitted in accordance with their respective response routines. Therefore, if a response routine finds that a previous message has not been transmitted to the network by the console processor complex, a pending message packet will be generated by the respective response routine. This packet is sent when the previous message has been completed and transmitted. The pending message manager subsidiary program scans the various subsidiary programs for the existence of any pending message packets, and also scans if associated previous messages have been transmitted. A command message corresponding to a pending message packet is then dispatched by the pending message manager, when a scan finds that a previous message has been completed.

A character display control subsidiary program is entered by the main sequencer for servicing alpha- numeric display devices on the console front panel. Several of the switch input response routines control the displays. The character display control program provides a common control interface for the response routines. In addition, the character display control program translates display data from the format used by the console system into a sequence of commands for the alpha-numeric display devices.

Lastly, there is provided a switch lamp control subsidiary program. This program controls the lamps in the various switches to indicate to the operator whether the switch is in a depressed state or a released state. In this manner, and in contrast to prior console switch systems, electrical switch contacts for carrying lamp power are not required. This has a substantial effect on increasing the reliability of the many console switches. The lamp on and off data sent by the switch lamp control program is placed into the console processor complex memory by the response routines. Retrieval of the data by the switch lamp control program is also necessary for comparing with the newest scan to determine if the lamps associated with newly depressed switches should be illuminated or extinguished.

Also shown in FIG. 10 with the subsidiary programs is a block indicating associated programs. These associated programs are enterable by various routines of the subsidiary programs. More particularly, these associated programs are entered on the occurrence of certain hardware interrupts generated by the console electrical apparatus. Each associated program is a consolidated set of routines which provides control of various hardware functions, data structure or aspect of the console's logic state. One such associated program comprises the communications manager program. The primary function of the communications manager program is to control the transmission network between the console and the plural lamp units. The coordinated transmission of data to the network demanded by the various response routines is important to assure an orderly flow of information in accordance with the urgency of demands imposed by the respective response routines. The parallel nature of the transmission network is highly desirable insofar as a failure of one lamp unit does not affect the transmission capability of the other lamp units. This is in contrast with the "daisychained" or serially connected networks typically employed. As noted above, the communication path between the console and the lamp units are full duplex paths, i.e. a transmit and receive path on which independent and simultaneous data transmissions may occur. The communications manager program has control of the lamp units and the data transmitters located therein, thus can insure that only one lamp unit, at any one time, is using the network transmission path. In accordance with the communications manager program, there are provided two types of message addresses; namely, individual lamp addresses and the broadcast address. Each lamp unit of the system is individually accessible by the console processor complex by transmitting the unique address associated with the particular lamp unit. As noted above, each lamp unit connected to the network will receive the lamp address; however, only the address transmitted will respond. On the other hand, the broadcast address includes a lamp address field with a special value to which all lamp units in the network respond. Moreover, each lamp unit responds to the broadcast address irrespective of their individual lamp addresses.

The console utilizes broadcast messages and individual lamp unit messages for two different categories of command messages. Messages to individual lamp units are used solely for maintaining cue data on the storage disk, for reporting the status of each lamp unit and for responding to lamp units newly connected to the network. All other functions of the system are carried out by the broadcast messages. Broadcast messages, for example, are transmitted to the lamp units for placing them or removing them from manual control. Manual control of the lamp units is established by broadcasting the change command message and allowing the lamp units to respond. In addition, cue information data is recalled by the console processor complex from the units by broadcasting the cue number and allowing each lamp unit to determine whether the cue is applicable. Once the entire system has been initialized, all functions needed of the lamp units during the course of the performance are in the nature of broadcast messages. With the architecture, the performance of a show is not impaired by the failure of one lamp unit which would cause it to continually transmit data, thereby tying up one half of the duplex network directed from the units to the console. The other half of the duplex transmission line of the network, that portion extending from the console to the lamp units, thus remains operative for transmission of console information to the units. As a result, each unit can react to the change of status of the console switches, dimmers, rotary encoders, etc. The receipt by a lamp unit of a message transmitted specifically thereto, is acknowledged by a transmission from the lamp unit to the console. In the event a response is not received from the lamp unit, the communications manager will retransmit the command message. This retransmission negates the effect of any faulty transmission by the lamp unit because of noise or other problems. However, the lack of a response from the lamp unit after several retransmissions by the console processor complex is taken as an indication that the lamp unit is no longer operational. Selected messages transmitted by the lamp units will involve the transmission of data to the console. In a comparable manner, this transmission may be retransmitted by the communications manager of the lamp unit processor complex, should a simple reply by the console processor in response to the first transmission not be received. In the event of a more severe network transmission line problem, the console transmits broadcast message at most three times to ensure the reception over a noisy communications line of at least one such message. Transmitted along with the broadcast message are sequence numbers which correspond to the number of times a message has been transmitted. The communications manager programs of the various lamp units disregard subsequent repetitious console transmissions by the use of the sequence numbers. The communications manager program within the control complex receives console message in accordance with the various console programs, and enqueues such messages for transmission to the lamp units. If a particular message requires a reply from a lamp unit, the console processor will wait for the reply and, when received, pass it back to the program initiating the message before transmitting subsequent messages.

Figure 11:
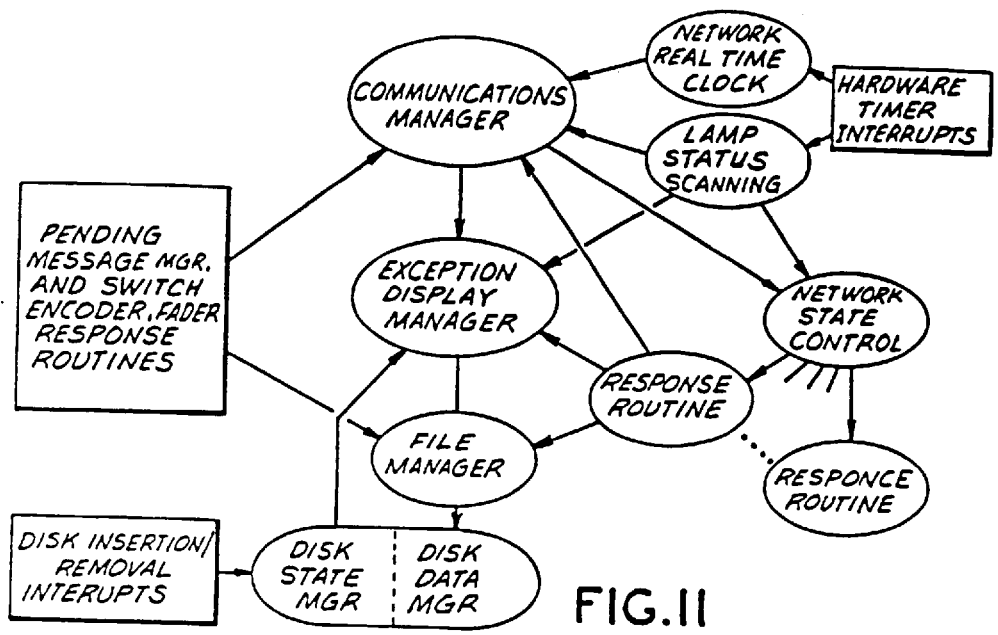
FIG. 11 is a flow diagram of additional programs utilized in the control console for carrying out the operation of the lighting system of the type which may embody the present invention.

Shown in FIG. 11, which illustrates the associated programs, is a file manager program. The file manager program oversees the disk file system, and provides sequential, relative record and key indexed files for the lamp unit cue data. The cue data associated with each unit lamp is identified by a file identifier which includes the console control channel to which the unit is assigned. Programmed console data is also stored on the disk by files, one for each programmable console function. In all other respects, the file manager operates in a conventional manner. The associated programs in the figure also include a disk data manager program. In a conventional manner, the disk data manager provides the functions of managing the list of free sectors in the disk, allocating the sectors to various files, and locating a desired sector of a file and issuing the disk hardware signals necessary to execute appropriate actions. This program requires modification to control the different disk drives employed in various implementations of the invention. Another associated program is shown in the figure as the exception display manager program. The exception display program usurps command of one of the alpha-numeric display devices located on the front panel of the console for drawing attention thereto of the operator. These situations generally arise during operation of the console where the operators acknowledgement or assistance is required to resolve a problem. A script of display data for display on the alpha-numeric devices is provided to assist the operator. The displayed data may include expected switch input responses which require activation. Once the problem has been resolved, control of the alpha-numeric display device is returned to the character display program.

The network state control program maintains management over the connection or disconnection of lamp units to the network. When a lamp unit connection is first detected by the communications manager program, the network state control program is signaled, in which event a sequence of checks is instituted on various status bits reported from the newly connected lamp unit. These bits represent certain conditions and actions which are prerequisites of the console to recognize a fully operational lamp unit. Response routines are provided for each of these status bits. The response routines specify actions for the console to take, based upon appearance of the respective bits. Examples of some of the functions performed by the network state control program are the downloading of additional lamp unit program code, the downloading of cue data for the lamp unit and the transmission of packets of data describing the current state of various console front panel controls.

The disk state manager program monitors the insertion or removal of disks from the disk drives. A console processor interrupt is generated on the insertion or removal of disks. Because of the importance of maintaining updated cue information on the disk, it is of paramount importance to the operators of the console that notification is given of situations which prohibit copies of the lamp cue data from being updated on the disk. Notification of such malfunction is brought to the attention of the console operator through the exception display manager program. Such situations may occur when the proper combination of disks is not present in the disk drives.

In accordance with the invention, there is provided a network real-time clock program which is operative to broadcast, on a regular basis, a real-time clock information to the lamp units. The real-time clock information comprises date and time data information. This data originates from a battery powered integrated circuit in the console circuitry, and is sent to the lamp units by way of the communications manager program. The network real-time clock program is activated by a hardware interrupt.

During the ordinary sequence of a production or show, the console regularly requests lamp status data from each lamp located on the console. Certain status bits, such as the cue-data-download request bit, cause activation of the network state control program. Other bits, such as the bulb failure bit, result in operator notification by way of the exception display manager as noted above. Still other bits are simply stored for later examination by the console operator. The lamp status scanning program is also activated by a hardware interrupt. In response to an interrupt, the status of a lamp is requested, and retrieved. Since the hardware timer producing the interrupts operates continuously, the console processor complex has available the most recent status information from all lamp units connected to the communications network.

The operations of the multiple controller network can be illustrated by referring again to FIG. 2 and FIG. 11. The bidirectional bus 80 provides data communication between and among the control console 24 and an alternate control console 84, another control console 82 and remote control units 84. In one implementation, bus 80 is electrically configured in the same way as the data link 26, and the control console 24 is provided with a communications manager program as described in the associated programs of FIG. 11. This program serves the same function of controlling activity over bus 80 that the communications manager serves in controlling activity over the data link 26.

Two types of message addresses are provided, individual console addresses and a system address, giving the same functionality as described in the descriptions for FIG. 11, e.g., individual console is individually accessible by the main console processor complex by transmitting the unique address associated with the particular console unit. In the system address command, all consoles connected to the network can respond.

Messages sent by the control console 24 to the system address contain information including the status data messages received from the lamp units, the state of the controls on the main control console and system status data processed and formatted by the main control console. These messages allow the additional and alternate consoles and remote control unit to produce the same displays as the main control console or to display different information.

Messages sent from the additional and alternate consoles and remote control unit to the main console are of two types. One type of message is of the same format as the messages sent by the main control console to the lamp units. These messages contain data identifying the console which originated the message. As previously described, some messages to the lamp units produce a response from the lamp unit. This response also contains the data identifying the originating console; this data permits the main control console to route the response to that originating console.

The second type of message sent from the additional and alternate consoles and remote control unit to the main console is a message to the main console itself. Some of these messages duplicate an action or sequence of actions performed by an operator manipulating the front-panel controls of the main console. These messages result in the main console sending to the lamp units the same messages that would have been sent had the controls physically been manipulated. Other messages cause the main console to modify the cue data and programmed console data which are stored in the lamp units and in the memory and on the disks of the main console.

An example of remote control unit 84 is a hand-held device which the lighting designer carries onto the stage to use for fine adjustments to the azimuth and elevation of the lamp units, ensuring that the light beam does (or does not) fall on a certain set piece or area of the stage. Another control console 82 could be a director's console, used by the lighting director during rehearsals to display data for cues other than the one currently being performed by the lamp units or to recall cues in the lamp units when the operator is away from the control console 24.

Another control 84 is a controller as disclosed in U.S. patent application Ser. No. 641,031, entitled "Creating and Controlling Lighting Designs". This controller provides controls which includes prerecorded commands and hands-free execution of a performance. The disclosure in application Ser. No. 641,031 is incorporated by reference herein.

Another controller 84 is a control device as disclosed in U.S. patent application Ser. No. 693,366, entitled "Improvements In High Intensity Light Projectors". Provisions from this controller includes commands in video format. The disclosure of application Ser. No. 693,366 is also incorporated by reference herein.

The alternate control console 84 could be located at a position which gives a more appropriate view of the stage for certain types of performances. The provision of this alternate console would prevent the necessity of moving the main control console 24 and its connection to data link 26.

Another member of the control resources network in communication with bus 80 and its connected controllers is a unit having storage and playback facilities to store, for example, the state of the settings of the master console 24 and to recall or "play" those settings or modifications thereof, during certain modes of operation.

Other implementations of bidirectional bus 80 are possible, including a Local Area Network and a point-to-point data link between the control console 24 and a single alternate control console. Additionally, the additional or alternative control consoles or remote control unit could be implemented on a general-purpose computer, rather than the purpose-built console.

The foregoing is illustrative of the various programs available to the console processor. The following is an example of the execution of various above-described programs in response to the depression of a certain "channel select" console button by the operator. The depression of this button is operative to bring a certain lamp unit under manual control, whereupon the rotation of yet another console knob is effective to rotate the lamp about one of its axes. In the following illustration it should be realized the effect of the decentralized control of removing console functions into the lamp units. Also it will be seen that with the provision of the present invention, there is a significant reduction in the processing required of the console, compared to conventional processor controlled light systems. The sharing of tasks between the console and lamp units also results in an increase in the speed to change a system parameter. In addition, in the disclosed embodiment, the console is no longer required to sequentially process a large amount of data for every lamp unit in the system. Instead, each lamp unit processor accomplishes the action required to achieve a change for that unit. Moreover, with the present system, the entire system can be changed in the time required by a single lamp unit. Also, because of the simultaneous transmission of messages to all lamp units, lamp units added to the system do not result in proportionately slower rate of transmission as was typical with prior systems. In accordance with the example for changing the position of a stage lamp under manual control, it is assumed that the console has performed the usual initialization routines. It is also assumed that the console processor has established communications with the lamp units, and has provided each lamp unit with all the data required for the respective initializations, and the system is operating in the endless loop of the main sequencer. In this loop, the main sequencer awaits input from the operator by way of the console devices. During its sequencing routine, the main sequencer calls the switch input sensing program which scans the switch input hardware of the console to produce a map of the switches appearing on the console front panel. In this map, set bits represent push buttons being pressed, and clear bits represent push buttons which are not depressed. This map is compared to a copy of a similar map in the memory which include the status of the switches as read on the previous scan. In comparing the present and previous maps, a third map is produced which indicates switches which have changed states between the generation of the first and second maps. If no changes are found, the program is returned to the main sequencer. Assuming that a change has occurred, the program scans the third map, bit by bit, to identify the changed switch and to activate the corresponding response routine. The identifier and new state of the newly activated switch is passed to the associated response routine. The newly operated switch is identified as a member of the "channel select" switch group, all of which are serviced by the same response routine. The switch identifier indicates the number of the switch within the "channel select" group which along with an additional group selector specifies the control channel to which the switch corresponds. All one thousand of the console control channels are each represented by a single bit in a console memory map, and indicates whether the channel is or is not selected for manual control. Because of the pressed switch, the value of the bit for its channel is inverted, thereby selecting the lamp for manual control. In the event the lamp is already under manual control, the depression of the switch would have the effect of removing the lamp of unit from manual control. Although only one bit in the noted map has been changed, the entire map is now broadcast to all lamps simultaneously. Each lamp examines the map and determines whether its control has been changed based upon the broadcast message. After transmission of this map throughout the network, no further processing is required of the console in response to the depression of the switch.

The response routine entered in response to the depression of the switch, calls the communications manager program with a command to send a broadcast type message. The broadcast message includes a pointer to the block of memory that holds the message data. The communications manager program either initiates the transmission of the data by programmable integrated circuits which implement the communications function, or in the alternative, if a communication is already in progress, the communications manager enqueues the command and memory pointer for subsequent transmission after the current message transmission is concluded. Any additional processing required by the communications process is performed as a response to console processor interrupts from the various programmable integrated circuits. No further processing is required of the communications manager program in connection with the switch activation.

When the communications manager program has accomplished the transmission of the message, or has enqueued the message for future transmission, it returns by way of the response routine program and switch input sensing program to the main sequencer. As a result, the main sequencer is entered in the endless loop at the position previously exited when the newly pressed switch was sensed. The main sequencer continues until the lamp button pressed for manual control is released. The switch input sensing program is again entered, whereupon a comparison of the scanning maps indicates a change in the switch state. The switch is again identified, as noted above, and the associated response routine is activated.

The response routine takes no action on the release of the switch. This is in contrast to other types of switches which cause activation of the response routine upon being pressed or released. In any event, return is made from the response routine through the switch input sensing program to the main sequencer. Again, the main sequencer resumes scanning within its endless loop. Departure is taken from the loop to the optical encoder input scanning program. The rotation of the appropriate console device by the operator is effective to cause a corresponding rotation of the appropriate stage lamp. Encoder/counter circuitry, as described above, provides a numerical input to the optical encoder input scanning program. The value produced by each encoder/counter circuit changes when the encoder shaft is turned by the operator. In a similar manner to the switch input sensing program, the optical encoder input scanning program compares the value read on each scan to the value stored in connection with the previous scan. In the event a difference is found during the comparison, an appropriate lamp command is generated. The message block includes the manual change lamp command, the amount of change, and the identifier for the particular encoder. The lamp command is then dispatched to the communications manager program as a broadcast message. All lamp units will receive the broadcast message and determine the applicability of the message to the particular lamp unit.

As noted previously, the communications manager program processes this message by immediate transmission, or by enqueueing the message for subsequent transmission when the communications channel is clear. The console program then returns to the endless loop of the main sequencer. The foregoing constitutes the participation by the console processor in effecting the change in the lamp position as specified by the operator. All additional and subsequent processing is accomplished by the individual lamp units, as required.

The next example for illustrating the principles of the invention relate to the storing of cue data information in a particular lamp unit processor memory. This function is initiated by the console operator by depressing the "store cue" switch. As with the previously described example, the main sequencer exits the endless loop, and enters the switch input sensing program. The switch input sensing program reads a new input map and compares it against the status of the system as stored in a previous map. Accordingly, the state of the "store cue" switch is found to have been pressed. The switch is then identified and the respective response routine is called.

The response routine appropriate to the "store cue" switch checks for two necessary conditions; that "store enable" switch is also currently being pressed, and that a cue number appears in the display window above the "store cue" switch. If these two conditions are met, then the console sends a store cue command broadcast message through the network to the lamp units. In addition, the cue number appearing in the window above the "store cue" button is also broadcast in the same message.

The communications manager program effects a data transmission through the network of the broadcast message, which message is received simultaneously by all lamp units. After the message is either transmitted, or enqueued for subsequent transmission, the communications manager program returns through the response routine and switch input sensing programs to the endless loop of the main sequencer. The main sequencer routinely services other operator commands as the need requires. However, in the services of this example, as well as many other that may be interspersed therebetween, the main sequencer is periodically preempted by regularly timed interrupts which require somewhat immediate attention. The regularly timed interrupts may be in the nature of the activation of the lamp status scanning program by the periodic interruption of the hardware timer integrated circuit which produces an interrupt to the console processor. On each interrupt generated by the hardware timer, the program commands a different lamp unit to send a message to the console containing data describing the lamp unit's current status. The type of data appearing in this message is described in more detail below in connection with the lamp processor system.

Because of the store cue command broadcast, as above described, some lamp units of the system will begin reporting the occurrence of new cue data to send to the console for storage on the disk. The lamp status scanning program handles all the lamps in the system in turn, and all lamps involved in the newly stored cue will eventually be able to send their cue data to the console. The lamp status scanning program obtains the status data for an individual lamp unit by sending a status read command message to the lamp unit through the communications manager program.

The status read command message is individually addressed by the communications manager in much the same way as described above in connection with the broadcast messages. However, since the status read message command requires a response from the particular lamp unit, the communications manager program holds the communications network channel open after transmitting the lamp command message. The communications network channel is held open until the lamp replies, or until a certain time period has elapsed with no reply. In this event, a lamp failure is assumed to have occurred. Further processing in the lamp status program is held in abeyance until a reply is received from the lamp unit.

Once the particular lamp unit has replied to the status read message, the communications manager returns to the lamp status scanning program with the message received. In this example, one of the bits in the receive message will indicate that the lamp has stored cue data in the lamp unit processor memory, which cue data has not yet been transferred to the console for disk storage. In a manner like many of the input scanning programs of the console, the lamp status program reacts only to changes in input values. The appearance of a set bit in the lamp status data causes the activation of the network state control program. A response to the change in the lamp status is thereby produced. The network state control program is provided with a group of response routines which handle the status bits received from the lamp unit. Some of these response routines provide to the console operator notice of lamp problems, such as bulb failures. Other response routines of the network state control program download program code to the lamp units, on request. The response routine associated with the data bit received in this example uploads cue data from the lamp unit, and stores the data in the proper file of the disk file system. The network state control program first checks a flag located in the console program disk state manager to insure that new cue data from the lamp unit can actually be stored. If indeed the disk is available for cue storage, the response routine then calls the communications manager program with a cue buffer upload message, as well as a pointer to an unused section of memory in which the data is to be stored. In the event the disk is not available for storage of cue data, the new data is not uploaded from the lamp unit. Instead, the front console panel indicator is illuminated, whereupon the operator is reminded that cue memory is required to be uploaded from the lamp unit to the console. This can be accomplished later by an operator command.

The cue upload command, much like the status read message described above, is sent to the particular lamp unit. The cue upload command also causes the communications manager to wait for the lamp unit reply. In one form of the invention, the programmable communications circuits are set up to store the lamp unit reply in the memory space specified by the network state response routine. When the transfer of the data from the lamp unit to the console is completed, the communications circuitry interrupts the console processor. The communications manager program is reactivated. The communications manager program thus determines that the communication transmissions is complete, commences the transmission of another message, if such a message is pending, and returns to the network state control response routine.

By the involvement of the network state control response routine, the data received from the lamp unit is subdivided into file records. The same format employed to subdivide the file into records is used both in the lamp cue storage as well as in the disk file system. In certain situations, the data received may be that of several cues, since the rate of scanning the lamp status can be temporarily slower than the rate at which the operator is storing cues. In this example, it is assumed that only the data from the cue store command is the data being operated upon. The disk file already contains the lamps cue data as it existed before the cue data to be stored. Therefore, all that is required is to add or rewrite the appropriate record in the disk file. The response routine accomplishes this by calling the file manager program to open the file with the particular lamp control channel number in the cue data file directory. The foregoing is accomplished by the response routine in calling the file manager program to open the file with the lamps control channel number in the cue data file directory. The response routine then issues a write command to the file manger program, using the record data received from the lamp unit. Once the writing of this data is accomplished, the response routine calls the file manager program, and the file is thereby closed.

The file manager program performs the three functions for the cue upload response routine, as described above. The command to open the cue data file results in a search for the file descriptor in the directory of cue data file descriptors. When found, the descriptor is used to find the first fragment of the file and load it from the disk. The file record to be written comprises two parts; the cue number, and the lamp function data. The cue number is utilized as a unique index to the record. When the command is issued to write the newly received record into the file, the file manager program searches the fragment already appearing in memory to find the index of the record being written. If the index is not found in the first fragment, the other fragments of the file are examined in turn. If an existing record already contains the cue number of the record being written to the file, it is overwritten with the lamp function data of the new record. If the index is not found in the file, the record is added to the file. The command from the network state control response routine to close the file causes the file manager program to release the pointers to the data in memory relating to the file. In this manner, the network state control response routine can reuse those memory spaces whenever needed. No further access to the file can be made without issuing the file open command.

Whenever it is necessary for the file manager program to access the data stored on the disk, as opposed to the copy in the console processor memory, the disk data manager program is activated. This program provides control of the disk drive controller circuits which actually issue disk commands and reads the data from the disk. The disk data manager maintains an account of those parts of the disk currently being used, and determines the actions needed to access specific file fragments requested by the file manager. Finally, the response routine is terminated, and is returned through the network state control program to the lamp status scanning program, which is also terminated until the next timer interrupt. The foregoing describes the operation of the system, assuming the initialization of the lamp units has taken place. The detailed initialization of the lamp units are described in detail below. Each lamp unit is initialized during system power up and initialization, or when added to a functioning production light system. As described above in connection with the circuitry of each lamp unit, there is provided a processor and sufficient memory for storing various programs, which, when carried out, allow any unit device to be moved, readjusted or changed in accordance with a cue or switch actuation originating at the console.

Figure 12A:
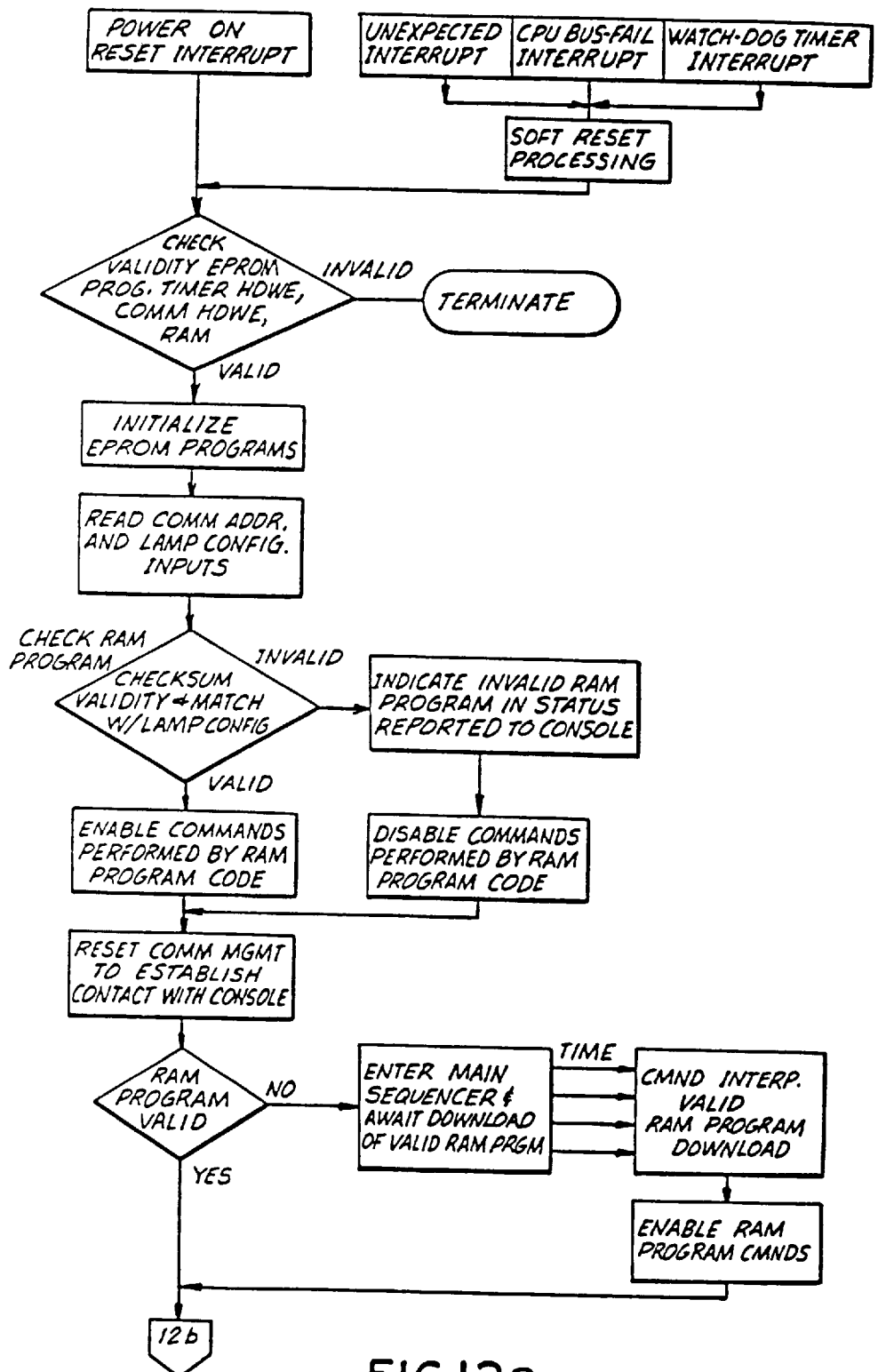
FIG. 12 (a–b) is a flow diagram illustrating the individual steps carried out in a lamp unit for initializing the lamp unit to begin operation.
Figure 12B:
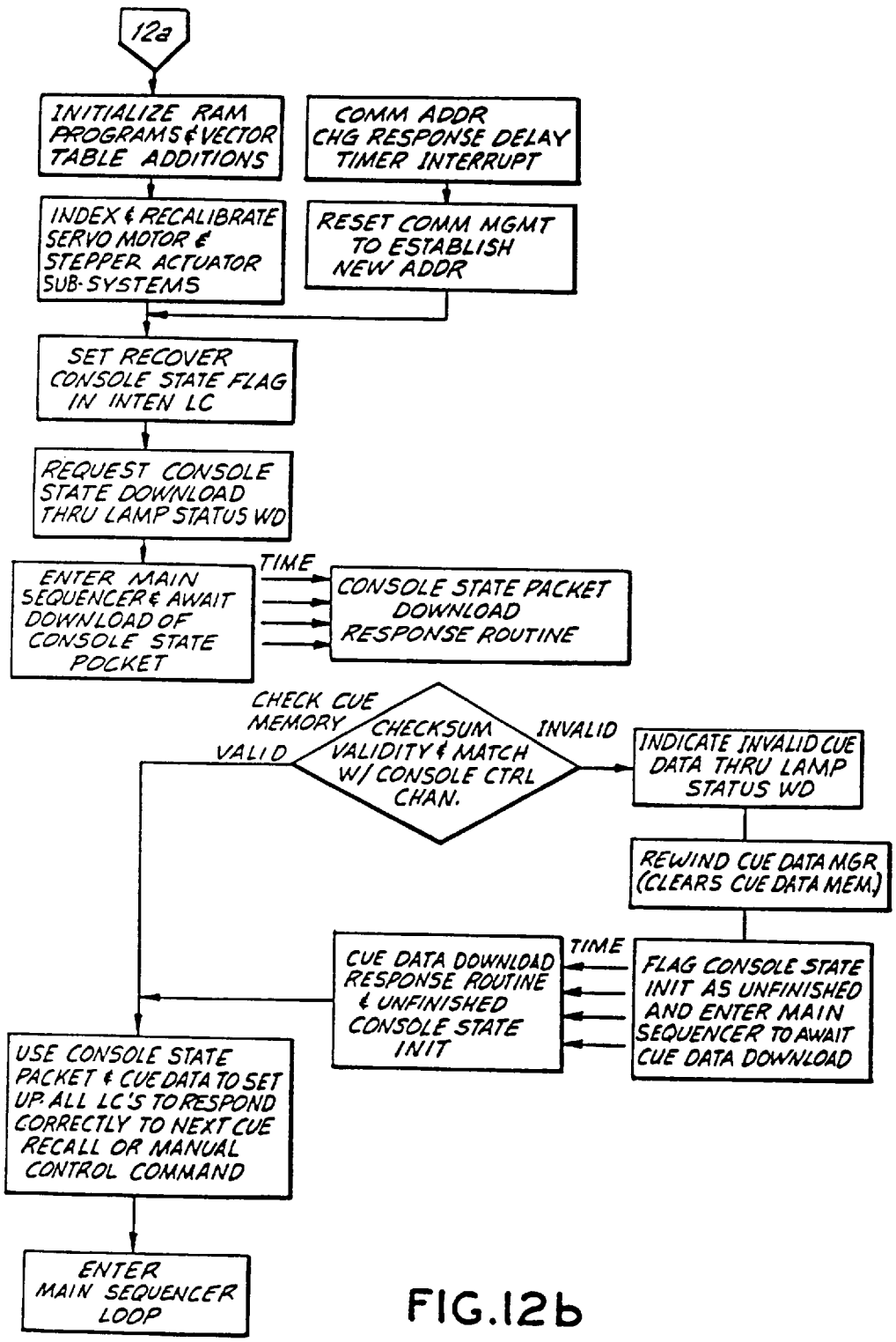

Referring now to FIG. 12(a–b), when power is applied to the system as a whole, or to a lamp unit, the lamp state initialization program is activated. This program may also be activated during normal lamp computer operation when certain interrupts occur indicating a major malfunction of the lamp system. In addition, part of the lamp state initialization program is re-entered if the communications address of the particular lamp unit is changed.

Each lamp unit includes a ROM-based program which performs various functions. For example, the ROM-based program tests certain hardware necessary for the proper operation of the lamp system, the program presets various programmable circuits in the unit to predetermined known states. In addition, the program proceeds through a script calling for checks to be made on certain parts of the unit, and prescribing actions to be taken depending upon the results of the tests. At the end of the script, the lamp unit is in complete synchronization with the console, whereupon the processor enters an endless loop consisting of self tests, physical state monitoring and response to console command transmissions.

The first task performed by the initialization program is a checksum test of the validity of the programs from the EPROM memory. A test of the hardware timers against pretimed software loops is also performed. A loop back test of the communication hardware and a read/write test of part of the RAM memory is also conducted. If any of the lamp units'circuitry tested is found to be faulty, execution is halted. Once the operation of the lamp unit hardware has been tested, various program subroutines are executed to initialize program variables, and set up programmable circuits used for communications. The identity of each lamp unit is a communication address read from an appropriate input device. In one form of the invention, the identity of each lamp unit is established by the setting of a three-digit thumb wheel switch. Thus, as many as one thousand lamp units can be connected to the system, and retain an independent identity. An input to the lamp complex processor represents the configuration of servo and stepper motors associated with the lamp hardware. Since the same computer hardware and basic programs are utilized to control different combinations of actuators of the lamp complex, a portion of the lamp system programs will differ between the lamp complexes. If needed, the proper system programs for particular lamp complexes can be downloaded from the console. However, the downloading of these additional programs into the lamp units may not be necessary, as the programs are maintained in writable, nonvolatile memory in each lamp unit. As noted above, the nonvolatility of the memory is provided by battery RAM memory backup. A check is conducted next on the programs already present in the lamp unit RAM memory to determine the validity thereof. A checksum test is performed and identifiers in the programs are matched with the actuator configuration input noted above. If the programs are found to be valid, an internal flag is cleared, thereby allowing the execution of the additional programs. If additional programs are found to be invalid, a flag is set in the memory status word and the console performs a download of the program for replacement of the lamp system program memory. The flag which disables the execution of these additional programs is also set.

At this time, a communications manager program is activated to establish contact with the console processor complex. Thereafter, when the console interrogates the communication address of the lamp unit, the communication manager program will respond. The particular configuration of the lamp unit, and the results of the above-noted validity checks are reported in response to the console command. This constitutes one of the initial communications between the console processor complex and that of the lamp unit.

In the event additional programs in the lamp unit RAM memory are found invalid as a result of the above checks, further execution of the initialization is postponed until the programs are downloaded from the console. The lamp unit processor enters an endless loop of self tests and console command responses. At the end of the command response routine program associated with the program download, the flag which was previously set to disable execution of the additional programs in RAM memory, is cleared. The lamp state initialization script is then reentered. Eventually, a valid set of these additional programs will exist in the RAM memory of each lamp unit. Subroutines associated with the additional programs are then run to initialize additional program variables and the programmable circuits used for control of physical actuators. A table of address which guide the lamp unit processor to interrupt is also modified to reflect the presence of interrupt response routines in the additional programs. More subroutines are then called to perform calibration and indexing functions of the physical actuators and feedback sensors. The subroutines cause the various actuators to be moved through their full range of motion, noting the location of any sensors and checking for proper operation of the various actuators and feedback sensors.

In the event the communications address for a lamp unit is changed during operation of the lamp, communications are reestablished with the console in accordance with the new address. The lamp state initialization script is reentered to allow resynchronization of the lamp unit with the console for the new address.

A flag in the lamp status word is set at this time to prompt the console processor complex to transmit a packet of data containing information concerning the state of the console. This packet of data is necessary to the lamp unit to allow it to respond properly to subsequent console commands. The nature of the data in the packet comprises information relating to the position of controls in certain subsections of the console, and the console control channel number assigned to the particular lamp unit. A flag is set in the intensity logical controller to prevent the light of the particular lamp from being turned on, until adequate data has been received from the console. The initialization program then reenters the self tests/command response loop until the receipt of the console state packet.

On completion of the console state packet, command response routine, the lamp state initialization script is reactivated. The data associated with the state packet received from the console is stored temporarily while additional validity checks are performed on the cue data memory. A checksum test is conducted, and a test for a match between the control channel identifier in the cue data, with the control channel identifier received from the console. If the cue data is found to be valid during the checksum/channel-number test, a notation of the time of the last update to lamp unit cue data is compared with that of the data stored on disk in the console. If these update times match, processing continues. In the event that more recent data is found to be stored in the lamp unit memory, console operator arbitration is invoked to determine which cue data should be used. If it is decided that more recent data is present on the disk, than in the lamp unit memory, or if the cue data is found to be invalid, a flag is set in the lamp status word. This flag prompts the console processor to download the proper cue data into the lamp unit memory. A rewind command is then sent to the cue data manager program to erase the data in memory and the self-test/command-response loop is reentered.

In the alternative, when valid cue data found to be present in the lamp unit memory, the initialization script is reentered, whereupon the cue data and the console state packet are utilized to set up all function logical controllers to respond to the next manual control or cue recall command from the console. When the cue recall command is received, a flag in the intensity logical controller program is cleared. As will be recalled, this flag suppresses the illumination of lights not fully synchronized. Normal operation of the lamp unit is then allowed to commence. After this final program setup, the initialization script is terminated, and processing continues within the main sequencer loop until the occurrence of one of the activation criteria, described above.

Figure 13:
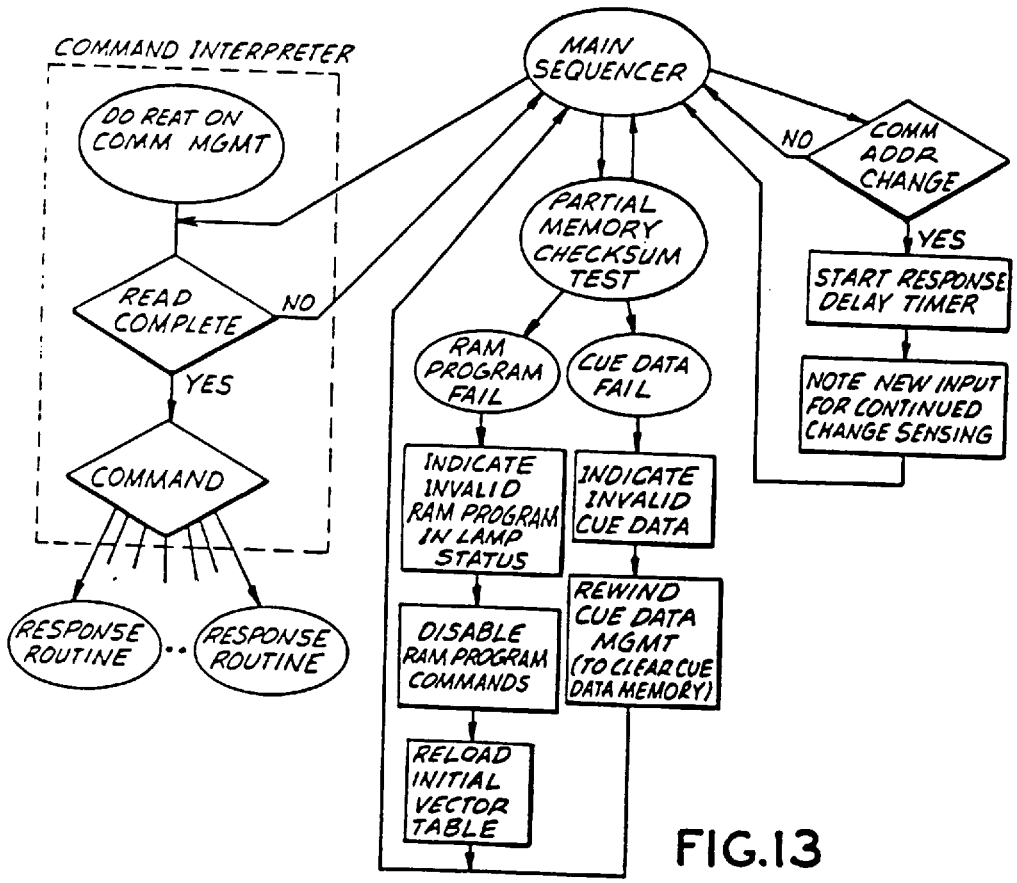
FIG. 13 is a flow diagram illustrating the basic operation of programs in the processor of the lamp unit including a main sequencer program which steps through a command reception unit and a series of test programs.

The foregoing describes in general the console and lamp unit processor interchange for accomplishing the proper initialization of the lamp units. After initialization, the primary background activity performed by each lamp unit is through each respective main sequencer loop program. Refer now to FIG. 13. Generally, the activities of the lamp unit processor in the main sequencer loop include scanning input buffers for communications received from the console processor, the performance of checksum integrity checks on both cue data and program code in the RAM memory. Also, the lamp unit processor scans changes in the communication address associated with the unit. The main sequencer loop is the program which is continuously executed in each unit, until a console command communication is received or checksum failure or address change in which event the main sequencer loop is temporarily exited. In addition, processing within the main sequencer loop is temporarily halted when interrupt-based actuator control programs are activated, or on the occurrence of physical feedback interrupts The main sequencer loop program itself is an endlessly repeating preset cycle for activation of a variety of subprograms. The subprograms are discussed in detail below, and include the command interpreter, the memory checksum test and the communications address scanning subprogram. In each case, when the main sequencer loop enters the subprogram, a test is conducted, in which event the main sequencer loop is re-entered, or a response is performed based upon the result of the test conducted.

With regard to the command interpreter subprogram, an endless loop type of program is activated, in which event a sequence of instructions are performed. The first instruction or action performed in the command interpreter subprogram is the issuance of a read command to the communications management program. After the read command, a return to the main sequencer loop is executed. On subsequent activations of the command interpreter subprogram, checks are conducted with the communications manager program on the status of the previously issued read command. Return is made to the main sequencer loop on an indication of the uncompleted processing of the read command. On an indication of the completed processing of the read command, i.e., when the check status reveals a completed communication from the console processor, the command interpreter subprogram examines the first word of the newly received data issued by the console command message, and to be executed by the lamp unit processor. If the console command is of the type which requires no further data transmission from the console, the received data is temporarily stored, and another read command is issued to retrieve the next command sent by the console. Those console commands which are received and which have associated response routines stored in the lamp unit ROM memory are performed immediately. The validity of additional programs located in RAM memory is verified before performance of other console commands. In any event, processing continues in the command response routine until the command is complete, or until all further processing of the command is interrupt-based. In this event, control is returned to the main sequencer loop. Particular types of console commands, and their associated response routines will be described below. When activated, the memory checksum subprogram verifies the integrity of memory sections having stored therein program code and cue data. Tests are performed only on those sections of memory believed to be valid. If a checksum test of the program code fails, an appropriate flag is set in the lamp status word to prompt the console to download the program code. Furthermore, operation of the command interpreter program is limited until the program code is replaced, and thus again validated. When the console responds with the necessary download of the program code, the lamp state initialization script is reentered, as described above. In the event that the cue data is found to be invalid, the appropriate flag is set in the lamp status word, wherein the console processor is prompted to download cue data. A rewind command is dispatched to the cue data manager program to clear the invalid cue data. No further processing is required after the download of valid cue data. In both situations, once the appropriate actions have been accomplished, control is returned to the main sequencer loop.

The subprogram identified as the communication address scanning program reads the identification code of the lamp unit. As noted above, the identification code is established by a digit switch initially set to provide a unique address for the lamp unit within the communication network. This subprogram compares the value read from the switch with a copy in the memory. If the comparison shows that the identification address has changed, a timer is started. This timer will produce an interrupt of the lamp unit processor after a certain period of time. The new identification address read during the scan is stored in the memory for comparing with subsequent identification changes. In each instance in which a new identification address has been detected, the timer is restarted. No other response is necessary when the communication address is altered, until the timer interrupt occurs. A time period of five seconds, for example, is preferable to assure that an address change has been completed on the switch device. When the timer interrupt occurs, the lamp state initialization script is reentered. Processing of the address change occurs in accordance with the noted script, and as described above.

Figure 14:
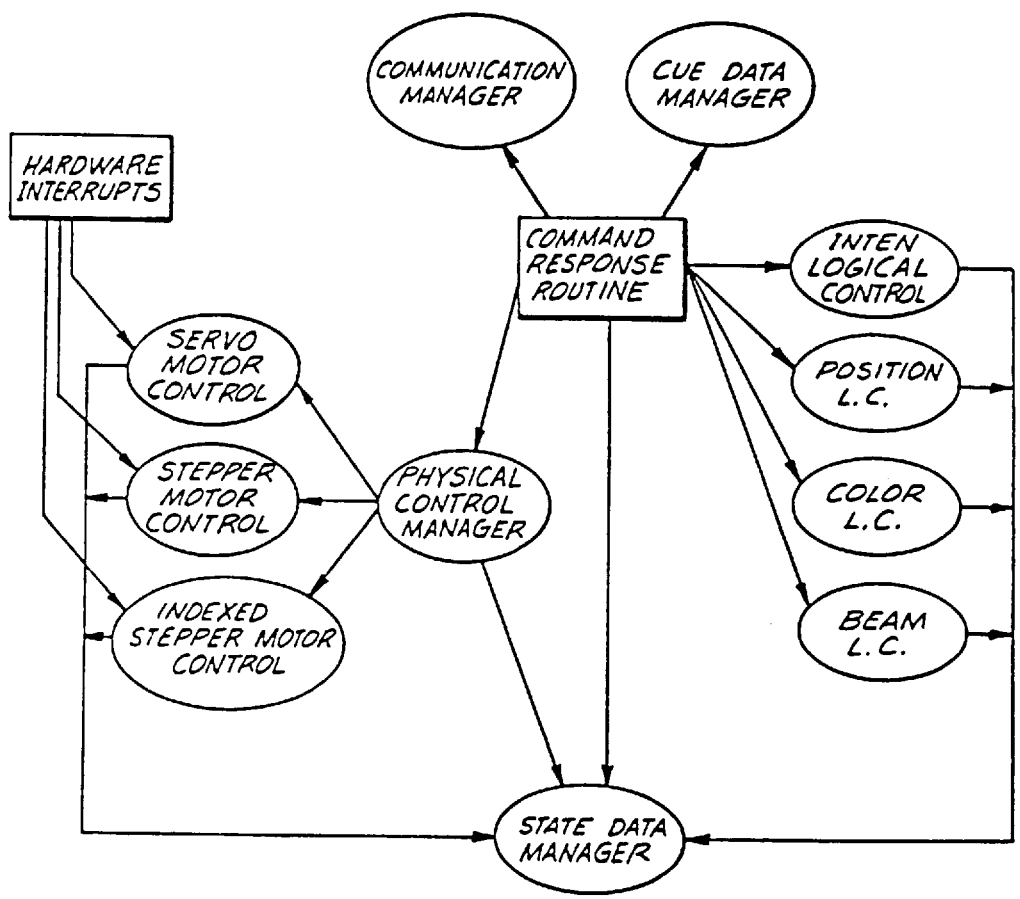
FIG. 14 is a flow diagram illustrating the operations carried out within the lamp processor for receiving parameter control commands, processing these commands and directing the physical operations that are carried out by mechanisms within the lamp unit for causing the light beam to have a selected set of parameters.

As noted above, the command interpreter is activated in connection with communications between the console processor and the lamp unit processor. Command response routines may activate one or more other program associated with this level of lamp unit processing. These other associated programs include the state data manager, the cue data manager, the communications manager, the function logical controllers and the physical control manager. Many of these programs report data directly to the state data manager program. The physical control manager oversees the activation of additional programs which control the physical actuators of the lamp unit, such as motors, dimmers, etc. The command response routines are individual scripts of the actions required to carry out a command issued from the console processor. This program flow is illustrated in FIG. 14. Some routines manipulate internal data, while others transmit specified data to the console, and yet other programs perform a specific action needed to move or otherwise control the physical actuators of the lamp unit. Some of the noted routines call for a combination of the above-specified actions. In describing the following command response routines, it is important to note that a response routine is selected based on value found in the first word of the message transmitted from the console processor to the lamp unit processor. Each of the command messages includes a unique value, known as a command identifier.

The first associated program, the state data manager routine, provides a common source and repository of status data from both the console processor and the lamp processor. Data which is received from the console processor, and which is used infrequently, is maintained accessible to the command response routine, and is retrieved upon demand. More frequently used data is passed to the function logical controllers after receipt from the console processor. Certain data, termed state data, is transmitted from the console processor in a form which includes data packed together for every lamp unit in the system. The state data is transmitted in a single simultaneous transmission to all lamp units. The state data manager extracts from the transmission, state data applicable to the particular lamp unit. The control channel assignment made by the console during the initialization script identifies the data applicable to each lamp unit. The logical and physical controllers report the various states of the unit apparatus directly to the state data manager. The state data manager combines this data from multiple sources within the unit into a single block of status data. In response to periodic console commands, each lamp unit transmits this status block to the console.

The communications manager is an associated program which has been described previously in connection with the operation of the command interpreter program. Command response routines performing the download of bulk data from the console, (RAM-based programs or cue data) issue read commands to the communications manager routine. These read commands are effective to store data sent from the console into the proper memory of the lamp unit memory. The command response routines issue write commands to the communication manager when the lamp command requires a lamp unit transmission of data back to the console. The write commands provide the proper location for access of the data within the lamp unit memory.

The communications manager routine also is responsible for the retransmission of data in the event initial transmissions were not received by the console processor. In doing so, the communications manager routine handles the fragmentation of large blocks of data, to overcome the affects of noise in communications network channels.

The cue data manager associated program comprises a conventional key-indexed file system in RAM memory. A unique, operator-assigned cue number is kept in the first four bytes of each record of the cue data file, and is used as an indexer for identifying that record. On cue recall, various indices are searched for a cue number matching that of the cue being recalled. If a match is found between the cue number searched, and those stored, the cue data record is retrieved and returned to the command response routine. The failure to find a match between indices is likewise reported to the command response routine.

Because of the many operational features of the lamp units, there is provided a logical control program for each of the physical functions of the lamp unit. While not exclusive, the various lamp unit functions may include intensity, position, color and beam logical controllers. Depending upon the manner in which the physical hardware of each lamp unit is provided with these functions, a corresponding variety of logical control programs will be implemented. The logical control program each perform a similar function of the lamp unit, by providing a single control point for each function of the physical apparatus. The services provided by all the logical control programs include receiving cue data recalled at various front panel sources, herein referred to as submasters. The services also include the integration of new cue data with previously recalled data from other submasters, changing of the current function data according to manual control command received from the console, and reporting the current function data values. Some of the logical control programs also store current function data as preset function values, and also operate in recalling and reporting these preset values on command of the console. Some logical control programs also use fader values sent from the console processor for proportional scaling of recalled cue data. The physical control manager associated program oversees activation of the subprograms which effect the changes in current function data, as computed by the logical controllers. The noted subprograms fall into two main categories. The subprograms controlling, for example, stepper motors, implement conventional algorithms which output a timed sequence of step commands to the motors. Some of the stepper motor subsystems will include switch closure indexing feedback for use in assuring that the stepper motors are following the stepping commands transmitted by the lamp unit processor. Other functions of the lamp unit involve the driving of dc servomotors to provide pan and tilt lamp movement. Lamp velocity information output by a dc servomotor tachometer, and position feedback information from an optical encoder/counter circuit are transmitted on the system data bus as feedback information to the lamp unit processor. The subprogram controlling these components utilizes a conventional velocity-feedback servo control algorithm. This subprogram is also activated upon an unexpected motion of the servo-controlled lamp function by way of hardware interrupts generated by changes in the position feedback signal. The unexpected motion of the servo-controlled lamp function notifies the lamp unit processor of movement occurring in the lamp, which movements were not commanded by the lamp unit processor. It is understood that these subprograms could be replaced by analog or digital circuitry.

Certain status data concerning the lamp unit will originate in the physical controllers. For example, the integrity of the bulb in the lamp unit light will be derived from the behavior of the power supply which supplies power to the light. The impeded motion of a lamp unit within its range of movement will be deduced when the motor motion fails to produce a corresponding movement of the lamp. Also, the failure of a stepper motor subsystem can be deduced from the failure of a search for an expected index input. This status information is reported directly to the state data manager.

In accordance with the two examples set forth above showing the console processor operations in response to the selection of the lamp for manual control, and for storing cue data, the two examples are repeated below for showing the actions taken by the lamp unit processors. The two examples exemplify the processing which occurs in the lamp units, and include the activation and interaction of the various programs within each lamp unit, and the distribution of tasks between the console and lamp units according to the invention.

The first lamp unit example concerns the sequence of actions occurring when the console operator selects a single lamp in the system for manual control, and the manipulation of a console device for changing the spatial orientation of the lamp unit. Both examples assume that all necessary RAM-based programs, together with the cue data, are in full synchronization with the console.

As part of the main sequencer loop, the lamp unit processor jumps to the command interpreter program to check the status of the outstanding read command in the communications manager program. The command interpreter program employs a block of memory space to service the communications manager program. This block of memory contains a byte of data which is used to signal the status of the execution of the read command. In servicing the read command, the command interpreter program checks the status byte of data in the command block being executed by the communications manager program. When a flag shows that the outstanding read command has been completed, i.e., that a block of data has been received from the console processor, the command interpreter program examines the first byte of this data. The value of the first byte of data represents the specific command to be performed by the lamp unit.

According to the example, the command received from the console is found to be a manual-controlled channel-selector-map command. Since this command does not require additional data from the console, the command interpreter program establishes another read command block, and reactivates the communication manager program. The communication manager program then prepares the lamp unit to receive another console command transmission and returns to the command interpreter. The command interpreter program then jumps to the associated command response routine. The noted console command represents a message transmitted to the network and received simultaneously by all the lamp units connected to the network. Noteworthy, the processing described in connection with a particular lamp unit, will also be occurring concurrently in other lamp units of the system.

Because the performance lighting system of the invention can accommodate upwardly of one thousand stage lights, bytes of data must be transmitted throughout the network, one bit position being representative of each lamp unit. The location of a bit, corresponding to a particular lamp unit, is derived from the console-control-channel number assigned to the lamp unit by the console, during the lamp state initialization script. The other lamp units of the system are assigned different console- control-channel numbers, and each unit will independently extract its own bit-data from the one hundred twenty-five byte block. The console-control- channel number is stored in the state data manager program.

The action required of the command response routine, as a result of decoding the console transmission, is to jump to the state data manager program with the location in memory of the 125-byte block. Also, the command response routine provides an identifier indicating that the manual-control status bit is to be manipulated.

The state data manager is provided with a subprogram which utilizes the console-control-channel number as an index to extract the value to be assigned to the boolean flag concerning the lamp unit selection/deselection for manual control. This boolean flag is referenced when manual-control commands are received, and either allows or disallows a reaction by the lamp unit. Control from the state data manager program is then returned to the endless loop of the main sequencer.

The lamp unit processor executing the instructions of the main sequencer program periodically enters the command interpreter program to ascertain whether a new transmission has been received from the console. It is assumed here that commands are received from the console indicating that the console operator is manipulating the lamp position controls. As a result, the next lamp unit commands received by the command interpreter are encoder-change commands. This information is determined from a first byte of the encoder-change command, whereupon a jump is made to the appropriate command response routine. Again, this command is received simultaneously by all lamp units in the network, and all such lamps will be executing the appropriate actions concurrently.

The command response routine concerning the foregoing command, first checks with the state data manager whether the boolean flag currently indicates the selection or deselection of the particular lamp unit for manual control. If the flag is not set, the command response routine terminates, and thus the encoder-change command is ignored as the lamp is not selected for manual control. However, in the current example, processing continues as the flag is assumed to be set as part of the preceding manual-control channel-selector-map command.

The encoder-change command byte transmitted by the console in response to the change of position of a console control, is accompanied by a byte of data identifying the particular console encoder. This is essential as there are several encoders on the console panel. Each encoder provides control of a different lamp function. In addition, the encoder- change command byte contains data representative of the amount of change in the encoder input value. Because each encoder is associated with a different function of the lamp unit, the command response routine executes a jump to the function logical controller associated with the encoder that has a changed input value. The command response routine also passes along the data corresponding to the amount by which the position of the lamp unit is to be changed.

With regard to the present example, the position logical controller is activated. The position logical controller reads the data representing the current command position of the lamp unit, and modifies this data by an amount linearly proportional to the received encoder change input value. This new value is now stored as the new position of the lamp unit, whereupon the position logical controller returns to the command interpreter.

Next, the command interpreter program activates the physical control manager which compares the command data presently stored in memory with all the logical controllers with the actual positional states of the lamp unit physical devices. The actual states of the physical devices are brought into conformance with the commanded states. In those situations where more than one function data has changed, the physical control manager will activate the physical actuator programs in preprogrammed combinations in order to ensure that all such actuators perform properly.

In the present example, only the servomotor control program is activated. This program calculates the direction of change called for by the new command data, as well as the appropriate magnitude of the voltage to be applied to the servomotor. An associated timer is also triggered to provide periodic hardware interrupts. At each interrupt, the servomotor control program will recalculate the appropriate voltage to be applied to the motor, until the actual state of the servomotor subsystem matches the command data established by the position logical controller.

The foregoing institute the motion of the desired servomotor to effect a corresponding change, for example, in the pan or tilt position of the lamp unit. Once servomotor motion is initiated, the lamp unit returns from the servomotor control program and the physical control manager program to the command response routine and the command interpreter. Control is returned from the latter two programs to the main sequencer where the scanning for received commands, memory checksum failures and communications address changes processing resumes. Until such time as the new lamp unit position is reached, the hardware interrupts and servomotor control recalculations are interspersed with the actions of the main sesquencer's endless loop. The high level commands transmitted by the console through the network and to each lamp unit, the commands undergo additional processing in each unit to determine the effect of the command on the unit, and to accomplish the desired result, if applicable.

The next example involves the processing in the lamp unit as a result of the console operator having actuated the "store cue" switch on the console panel. The lamp unit processor exits the endless loop of the main sequencer and jumps to the command interpreter to check the status of an outstanding read command in the communications manager program. In this example, the command interpreter program discovers a newly received message from the console, having a store-cue opcode in the first byte of the command message. The command interpreter restarts the read command on the communications manager, and calls the store-cue command response routine. This command is received simultaneously at all lamp units in the network, and all such units execute the following sequence of actions concurrently.

In command response routine, each logical controller is queried concerning the current commanded function data. This data is packed into ten bytes of memory storage area. Moreover, this block of data is combined with four bytes of data representing the operator assigned number for the cue. It should be understood that the cue number was received as part of the cue-store command transmission from the console. The command response routine then calls the cue data manager program, bringing with it the fourteen-byte block of data resulting from the above-noted processing. The cue data manager scans its list of record indices, i.e., cue numbers, for an index matching that of the record cue number passed by the command response routine. If a match is found, the accompanying data record is overwritten with the data record received from the command response routine. If no match in the index is found during the search, the new record is written into a blank record area in the index and data file. This data memory of the lamp unit is of the type which has not yet been transmitted to the console disk copy to update the present lamp units cue data. Sufficient room should provided for several cue records should there exist a delay in transmitting the data records to the consolke disk storage. The cue data manager then returns to the command response routine.

The command response routine immediately calls the state data manager to set a flag in the lamp status word indicating that the lamp unit has cue data ready for transmission to the console disk storage. The programs are then returned in seriatim through each other, until the lamp unit has threated its way back to the main sequencer. Processing within the endless loop of the main sequencer then resumes.

At some point, in the processing of the cue store command, the command interpreter senses that a message has been received having a lamp-status-report opcode. A preparatory read command is reissued to the communications manager program, and the lamp- status-report command response routine is called. These lamp-status-report commands are dispatched individually to each lamp unit in the network, wherein only one unit will respond to the console at a time.

The command response routine calls the state data manager program to obtain the current value in the lamp status words. This block of memory is utilized as the message data in a write command issued to the communications manager program. This write command has no interaction with the read command just performed in preparation for the next console command transmission. Return is had through the various programs to the main sequencer, where the endless loop is resumed.

The flag set in the lamp status data, which flag was reported to the console in the previous command, prompts the console to issue a read-cue-data-change- buffer command. This command is received by the communication manager program of the lamp unit, and is sensed by the command interpreter program. In addition, this command is addressed to a particular lamp, and only that lamp will transmit a response. A read-cue-data-change-buffer command response routine is provided for retrieving the list of new cue data from the cue data manager program. In addition, the noted command response routine sends the list as message data in a write command to the communications manager program, and calls the state data manager to clear the flag indicating data is present in the cue data change buffer. As a result, the lamp unit processor returns to the endless loop of the main sequencer, and waits further console commands.

The foregoing illustrates the lamp unit processor actions required to carry out a change in the position of a stage light, as well as the storing of cue data within the lamp unit memory. The flexibility of the system, however, is not limited to the foregoing. While an exhaustive description of each command is not necessary, and would only encumber the description of the invention, the other lamp commands used in connection with the lamp units of the invention are listed below.

The overall function of the programs to carry out the operation of the present invention have been described in detail in reference to FIGS. 10–14. A detailed code listing for a representative portion of the overall program is presented below. This is the code required for implementing the color logic control which was described in reference to FIG. 14. This code is written for execution on a Motorola microprocessor Model 68000. The color logic control program is quite similar to the logic control programs for intensity, position and beam diameter.

It can be seen from the foregoing that the lighting system disclosed provides accurate, efficient, and flexible control of several hundreds of automated lamp units. Provisions are included for the reporting of status data from the lamp units to the control console. This status data may include real-time display of parameter data including the present intensity, color, beam shape, and beam direction of the lamp units as well as any timing parameters associated with the present cue which has been recalled. Provisions are also included for the renewal of operating system programs in any lamp units which experience serious logical errors in their associated memory. Provisions are also included for the storage of parameter data associated with the various cues, which enables an operator to save the data used to execute a show and to load the data into a lighting system similarly configured but composed of discretely different lamp units which may be disposed in a different physical location from that at which the show was previously performed, for example on a different continent.

Figure 15:
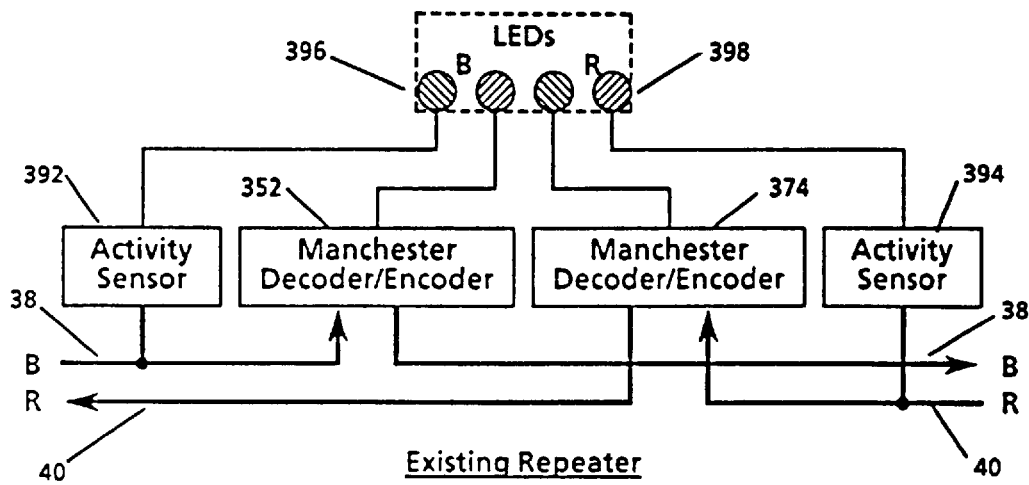
FIG. 15 is a block diagram of a repeater as shown in FIG. 9.

Referring now to FIG. 15, a simple data repeater circuit (shown in greater detail in FIG. 9), includes an activity sensor 392 coupled to the broadcast network 38 and an activity sensor 394 coupled to the replay network 40. Each activity sensor drives a red LED 396 (via pulse stretcher circuits which make the flickering of the LED visible to the human eye), which LED's are mounted on the exterior of a repeater box and flash whenever there is any electrical activity on the branch of the corresponding network to which the repeater is connected.

The simple data repeater also includes a Manchester decoder/encoder 352 coupled to the broadcast network 38 and a Manchester decoder/encoder 374 coupled to the reply network 40. As described earlier, the Manchester encoder/decoder integrated circuit can be connected in a "repeater" mode in which messages received at its input are decoded and then reencoded for further transmission. Each decoder/encoder drives a green LED 398 (via pulse stretchers), which LED's are also mounted on the exterior of a repeater box and flash whenever there is valid Manchester-encoded data passing through the repeater. In normal operation, red and green LED's will flash simultaneously. Any other condition, for example red LED flashing with no green LED flashing, indicates an error in data transmission. Howeverd, this arrangement can not detect subtle errors in the messages transmitted through the network.

Figure 16:
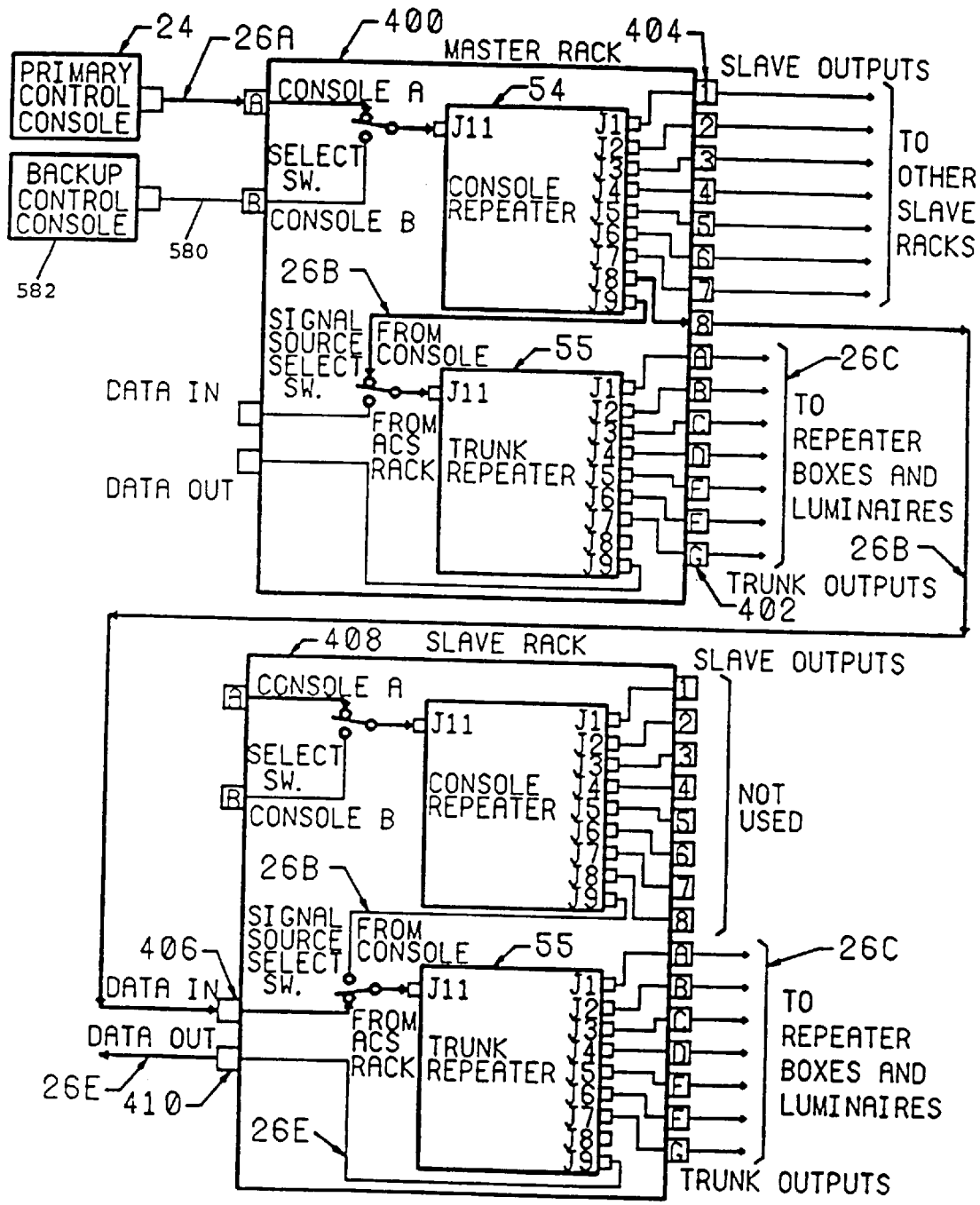
FIG. 16 is a block diagram showing the interconnection of two signal distribution racks in master/slave relationship.
Figure 17:
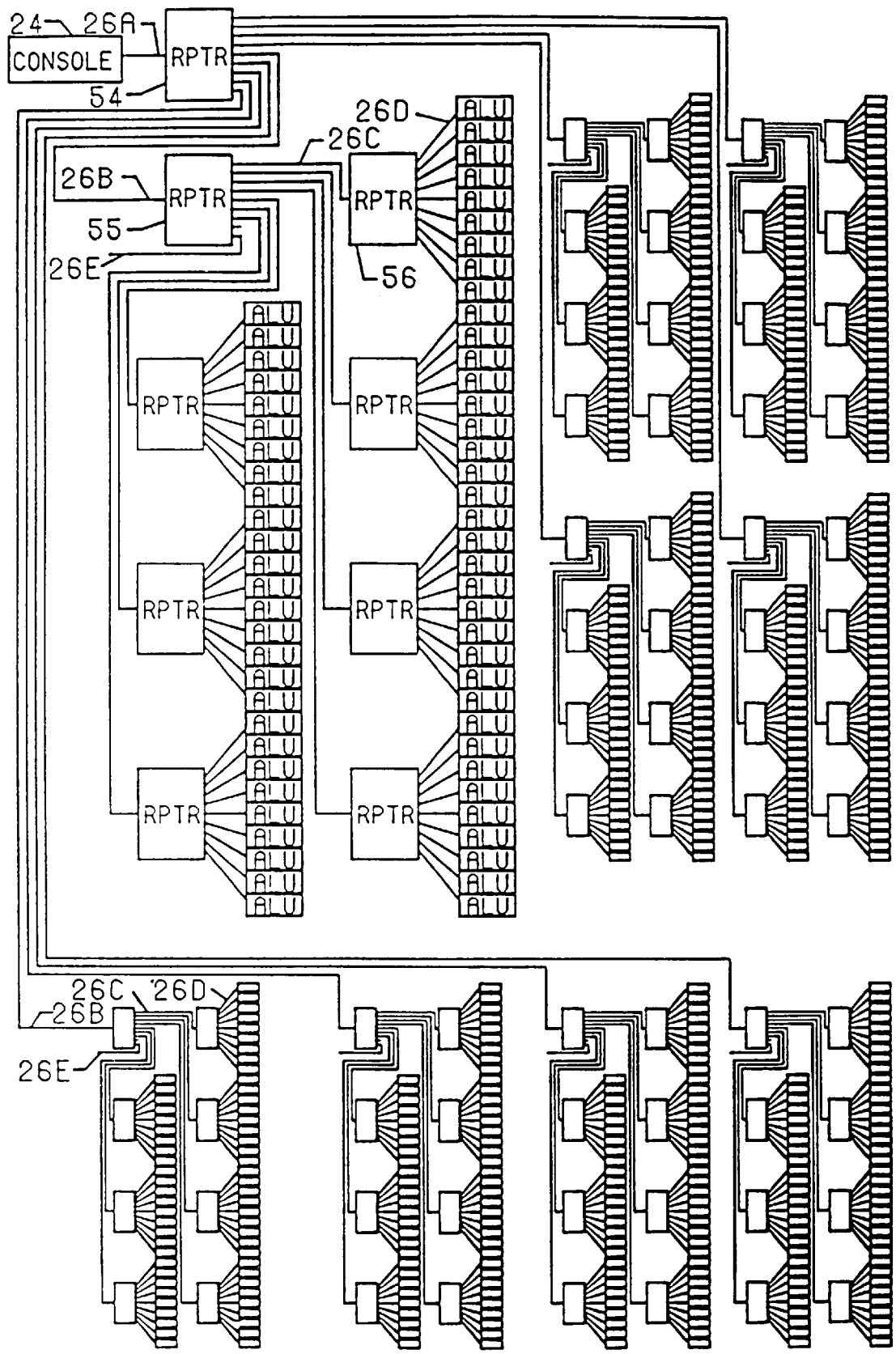
FIG. 17 is a block diagram of the lighting system of the type which may embody the present invention, showing the master (console) repeater, slave (trunk) repeaters, and the various truss repeaters connecting the console and the lamp units.

As shown in FIG. 16 and FIG. 17, the data communications network 26 implemented in this automated stage lighting system includes a control console 24 communicating with a plurality of automated lamp units (ALU) through several intervening repeater circuits. A "console repeater" 54 located in a power and signal distribution rack 400 receives transmissions from the control console and repeats these transmissions to one or more "trunk repeaters" 55. One such trunk repeater 55 is normally located in the distribution rack 400 with the console repeater 54.

The trunk repeater supports data communication links 26C to seven trunk cable connectors 402 which, when connected to appropriate multi-conductor trunk cables, provide power and data to repeater boxes normally hung in a lighting truss in proximity with the lamp units. The console repeater 54 also supports links 26B to eight auxiliary data connectors 404, which in turn are used to connect to 5 additional distribution racks 408 through appropriate data input connectors 406. Data signals are thereby provided to trunk repeaters 55 located in the additional distribution racks. The additional distribution racks then provide power and data to other repeater boxes normally hung in the lighting truss in proximity with other lamp units. Each repeater box then provides power and data for up to nine lamp units.

In one embodiment of the lighting control system, one control console 24 connects to one "master" distribution rack 400, and thereafter to eight "slave" distribution racks 408 via the auxiliary data output connectors 404. Each distribution rack connects to seven repeater boxes via the trunk cables. Each distribution rack can then provide power and data for up to 63 lamp units. One master rack and eight slave racks can then provide power and data for up to 567 lamp units. To expand the system capacity to the 1,000 lamp unit configuration supported by the system software, each slave rack 408 can connect to an additional slave rack via a data output connector 410 driven by a spare output of its trunk repeater. Eight additional slave racks so connected via link 26E provide power and data for up to 504 additional lamp units, well in excess of the 1,000 lamp units supported by the system software.

Figure 18:
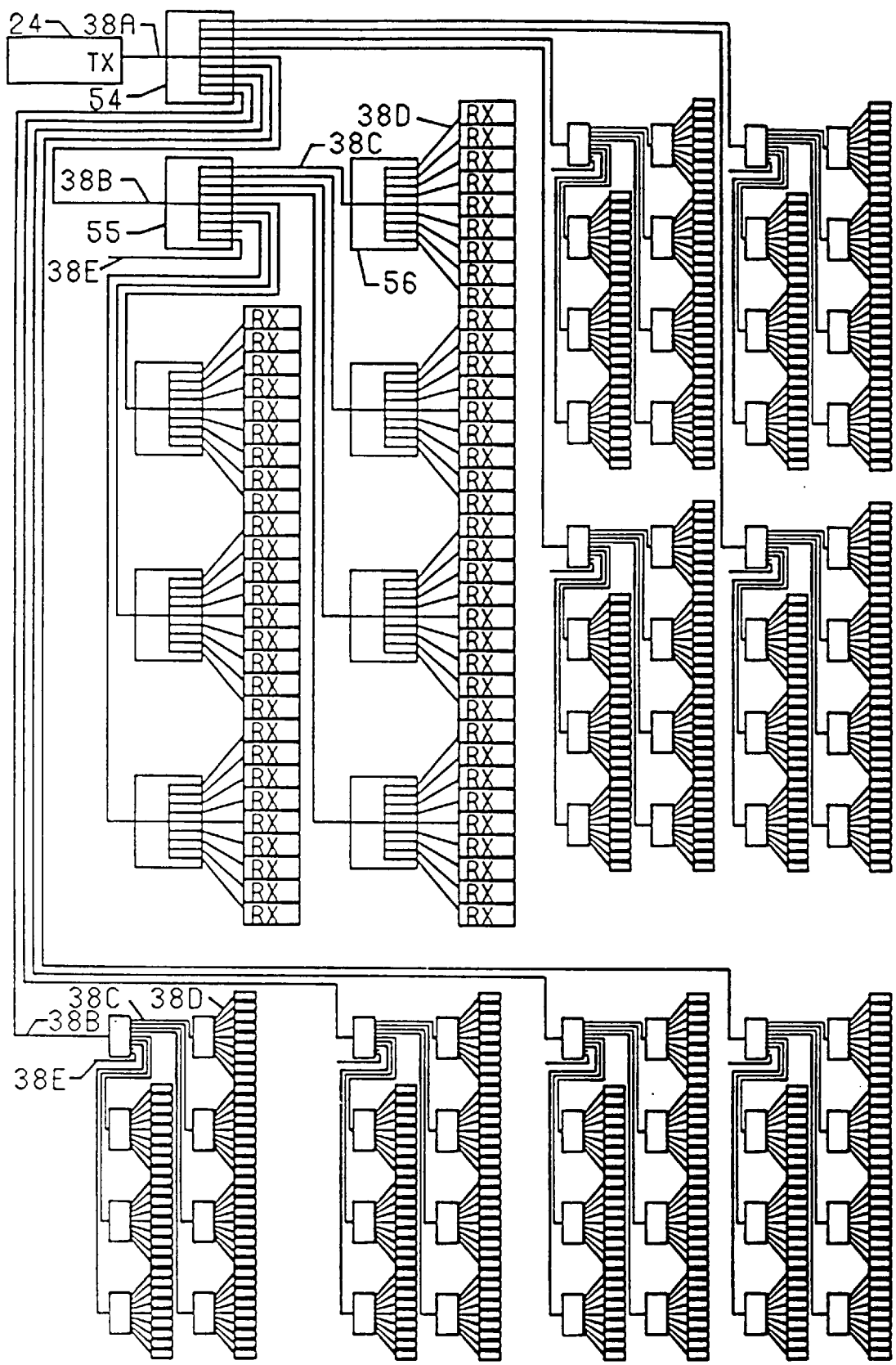
FIG. 18 is a block diagram of the lighting system showing the existing broadcast network.

As shown in FIG. 18, the broadcast network provides the same data signal to all lamp units practically simultaneously. Through the broadcast network 38 the console 24 sends each message to each receiver (RX) in each lamp unit simultaneously.

Figure 19:
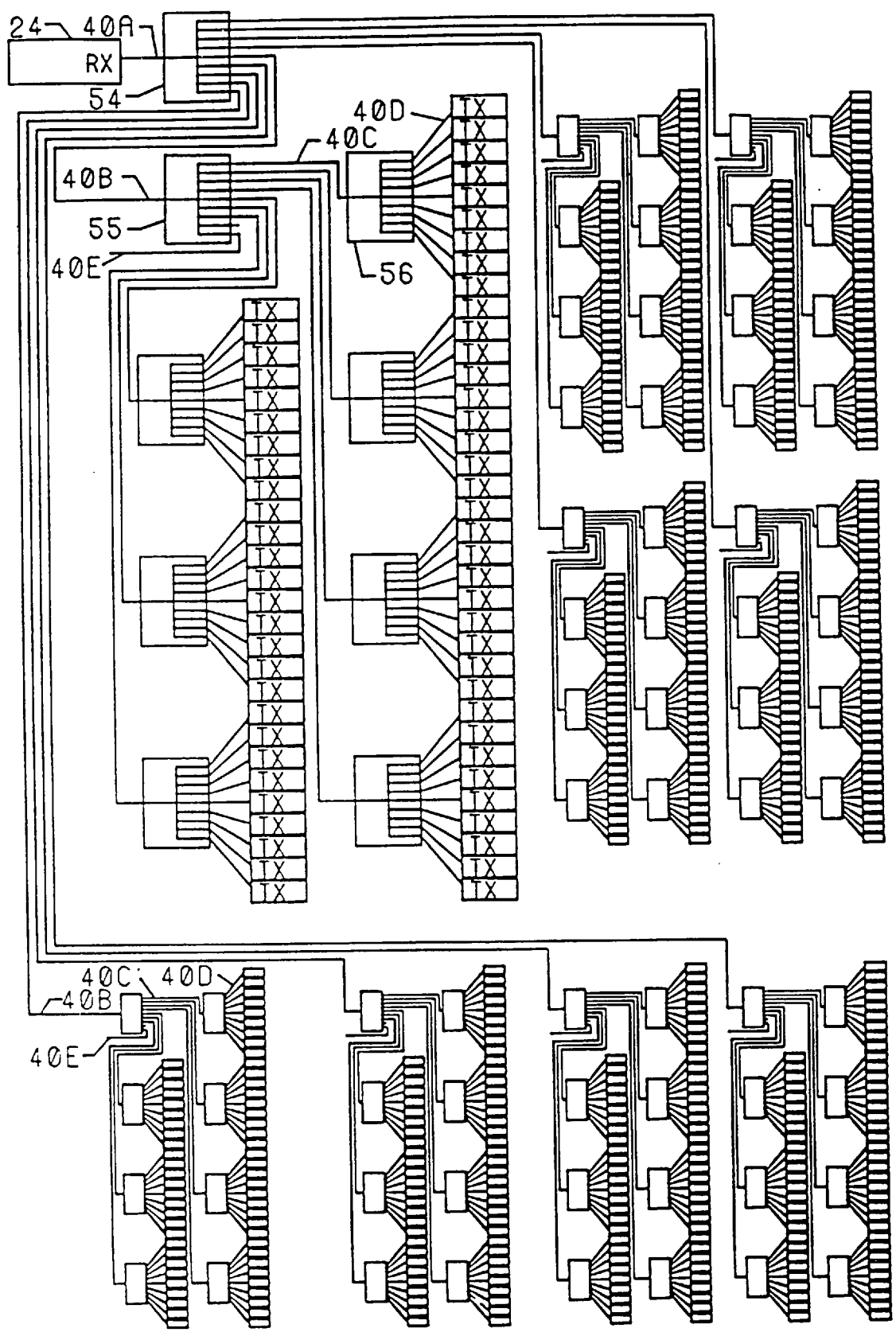
FIG. 19 is a block diagram of the lighting system showing the existing reply network.

FIG. 19 shows the interconnections of the reply network 40. The console 24 acquires status data from the lamp units by sending a message to the first lamp unit over the broadcast network 38 and then awaiting that lamp unit's response over the reply network 40. After the status report message has been received by the console from that lamp unit, the sequence can be continued for the other lamp units in the system. The reply network is connected in a fashion similar to the broadcast network, except that the lamp units include transmitters (TX) for sending messages while the console includes a receiver (RX) for receiving messages.

During each reply transmission, only one of the many links 40D between lamp units and repeater boxes is utilized. As shown in FIG. 19, a reply transmission reaches the console through only one link 40C between a repeater box and a distribution rack, onlly one link 40B between a trunk repeater and the console repeater, and the one link 40A between the console repeater 54 and the control console 24. Thus, if one unit of time is required to acquire status data from one lamp unit, it will take 1,000 units of time to acquire status data from all 1,000 lamp units.

It can be readily appreciated that if two or more lamp units were to respond to one request for status data, multiple transmissions would appear simultaneously on the link 40A between the console repeater and the control console. Similarly, any noise injected into the reply network would be superimposed over legitimate signals on the link 40A between the console repeater and the control console, resulting in a garbled reception by the console. Improved repeaters according to one or more aspects of the present invention provide the ability to identify and isolate erroneous lamp unit transmissions and noisy links in the reply network.

Figure 20:
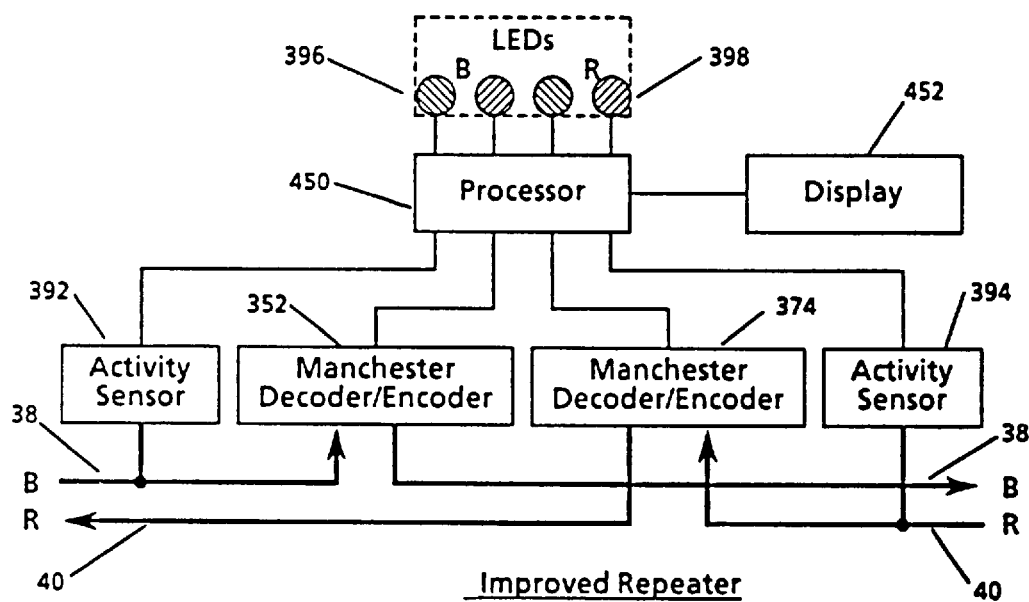
FIG. 20 is a block diagram of an improved repeater of the type which may embody the present invention.

An improved repeater shown in FIG. 20 includes a processor 450 and its associated read-only memory, random-access memory, and control circuit for receiving inputs from the activity sensors and Manchester decoder/encoders. The processor interprets these inputs and turns on the LED's 396 and 398 by its associated control circuit to indicate the condition of the data link networks. For example, a green LED is lit to indicate a properly working data link network while a red LED is lit to indicate a malfunctioning data link network. In the absence of any activity, both LED's can be turned off. Separate pairs of red and green LED's are provided for the broadcast and for the reply data link networks. Alternatively, an alpha-numeric display device 452 may be incorporated into the repeater circuit to display simple codes or messages.

Figure 21:
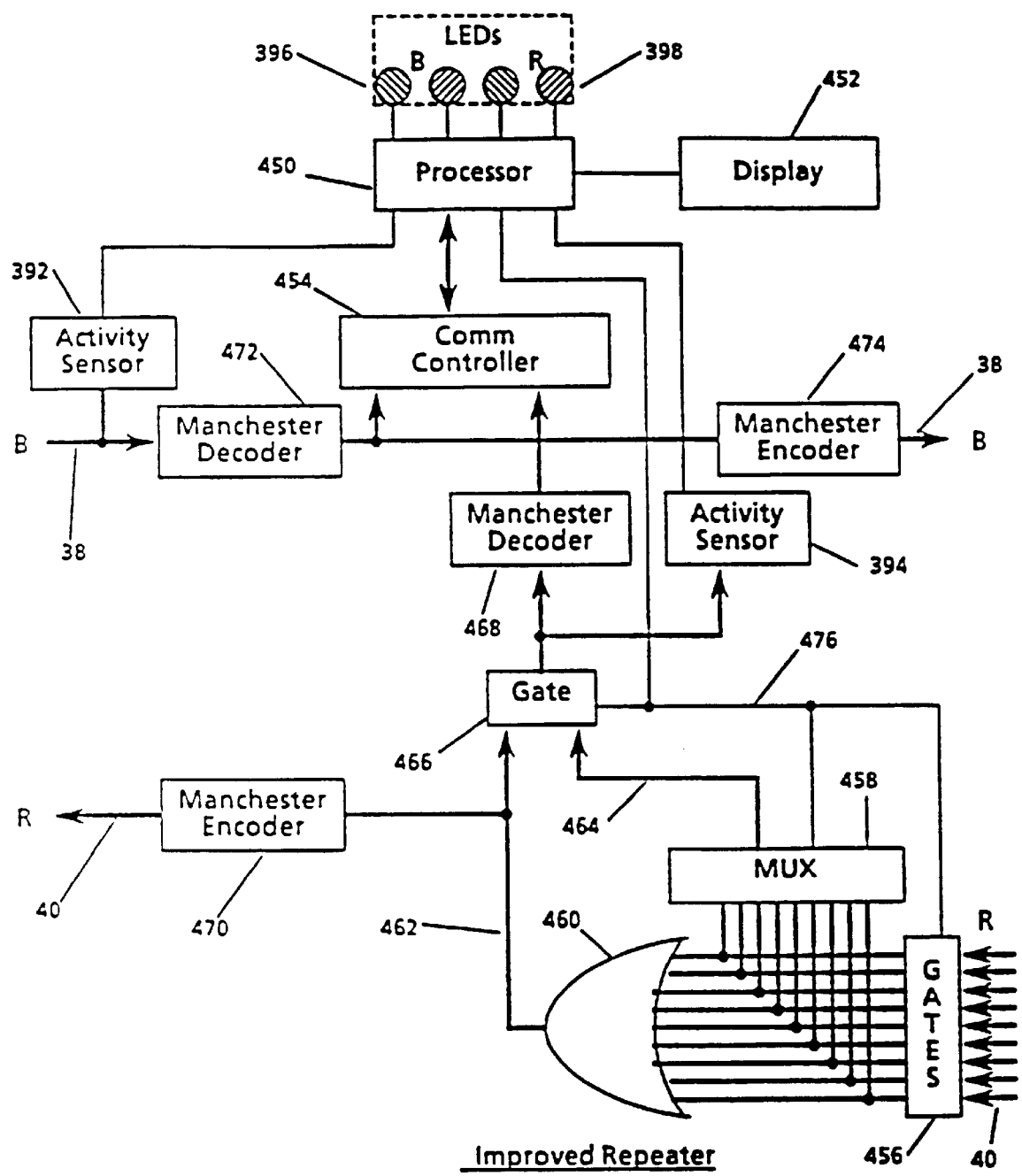
FIG. 21 is a block diagram of another improved repeater of the type which may embody the present invention.

Another improved repeater shown in FIG. 21 incorporates a multi-protocol communications controller chip 454 such as used in the console and lamp unit communications circuits. Using the communications controller chip coupled to the Manchester decoder/encoders, the processor can now detect line activity not resulting in a valid communications controller interrupt. The additional gates 456 and multiplexer 458 shown enable the processor to sample individual reply line inputs and to disable certain reply line inputs to stop noise or unauthorized transmissions from spreading into other parts of the system.

In one mode of operation, signals appearing at gates 456 are applied to a nine-input logical OR gate 460 and combined into one signal on line 462. Since only one of the nine inputs to gates 456 will be active at any one time in a properly working system, only one signal will appear on line 462 at one time. The signal on line 462 is connected via logic gate 466 to Manchester decoder 468 and thereafter applied to communications controller 454 where it can be examined for errors by processor 450. If no errors are detected, the processor and communications controller transmit the message via Manchester encoder 470 onto the next branch of reply network 40.

If errors are detected in the signal received over reply network 40, a diagnostic mode is entered by the repeater processor 450. Using a plurality of logic control signals shown as control bus 476, the processor 450 operates multiplexer 458 to sample the various discrete signals at the input to OR gate 460. The output of the multiplexer 458 on line 464 is applied to gate 466 which is operated via control bus 476 to connect the multiplexer 458 to Manchester decoder 468.

By coordinating the operation of the multiplexer 458 with the communications controller 454 in error detection mode, the processor 450 may determine that one of the lamp units connected thereto is transmitting unintelligible signals or noise or is transmitting at inappropriate times, thereby garbling other legitimate signals. The processor then utilizes control bus 476 to disable the offending input at gates 456, thereby restoring communication integrity for the properly functioning lamp units.

Broadcast messages are handled in a similar fashion. Signals appearing on broadcast network 38 are applied to Manchester decoder 472 and thereafter to communications controller 454 where they can be examined for errors by processor 450.

Figure 22:
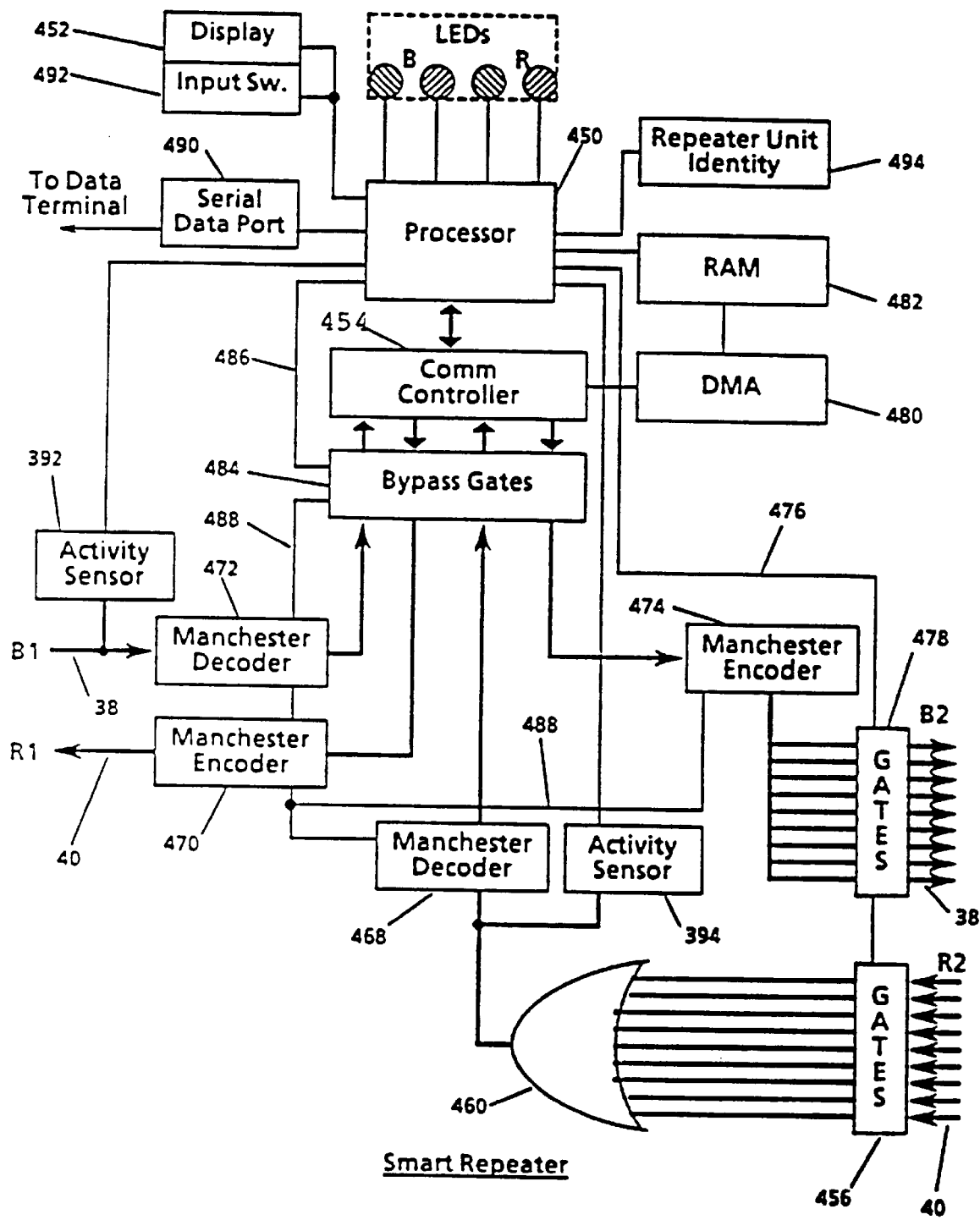
FIG. 22 is a block diagram of a "smart" repeater of the type which may embody the present invention.

According to another feature of the present invention, a "smart repeater" shown in FIG. 22 further includes a direct memory access (DMA) controller 480 connected between the communications controller 454 and random access memory (RAM) 482. This configuration is functionally equivalent to the processor/modem complex used in the control console and in the lamp units. One of the advantages derivable from this circuit arrangement is that each smart repeater can now communicate with the console just as any lamp unit can.

The console can send network control messages which are received by all repeater units practically simultaneously. A network control message may be addressed to a specific repeater unit or the message may be addressed to all repeater units using a common repeater address. Each repeater unit individually responds to the message depending on the address or the content of the message. For example, a message instructing the repeaters to begin status polling of the lamp units would be sent to a common repeater address. A message instructing a specific repeater to transmit a block of lamp unit status data to the console (or to the next repeater unit along the reply network) would be sent to a specific repeater address. The repeater also sends network state messages as required, which messages include for example: data representing the kinds of errors detected, which branches of the network exhibit errors, and which branches have been disabled.

In one mode of operation, signals appearing on broadcast network 38 are detected by activity sensor 392 and decoded by Manchester decoder 472. The signals are then routed through bypass gates 484 to communications controller 454. DMA controller 480 and communications controller 454 receive the signals into RAM 482 where the decoded message can be examined or interpreted by processor 450. If no errors are detected and the message contains information for lamp units, the processor may compose a new message or re-transmit the original message to the lamp units. DMA controller 480 and communications controller 454 then cooperate to transmit the message through bypass gates 484 via Manchester encoder 474, which is coupled to broadcast network 38 by gates 478. Using control bus 476, now reconfigured to operate the gates 456 and 478, processor 450 can transmit broadcast signals to all nine outputs coupled through gates 478, or to any one or more individual output coupled thereto. Control bus 476 also operates input gates 456 so that selected individual inputs can be disabled or enabled in the manner described above.

In the reply mode, if errors are detected in the signal received from the reply network 40, the repeater unit may request the lamp unit to transmit the message again. If after several tries, the repeater cannot get an error-free message from a particular lamp unit, or if the repeater processor detects errors on two or more channels connected thereto, a diagnostic mode is entered by the repeater processor. If no errors are detected, the processor and communications controller transmit the message via Manchester encoder 474 onto the next branch of the reply network 40.

Other improvements derivable from a smart repeater include: detecting line activity not resulting in a valid communications controller interrupt; reception of framing errors, cyclical redundancy check (CRC) errors, or overrun errors detected by the communications controller; detecting errors in the header data added to each message by communications software; detecting logical errors in some of the data messages; receiving not-acknowledge (NACK) or detecting lack of an acknowledge (ACK) signal in response to transmitted messages; disabling reply line inputs to stop noise or unauthorized transmissions from spreading into other parts of the system; collecting status data from a plurality of lamp units or status data from other repeaters; and downloading operating system programs to lamp units or repeaters.

Advantages derived from the above improvements include: 1) improved feedback to the system technician, making the data link indicators easier to read and understand; 2) reporting the location of sensed errors back to the console for display at a central location; 3) improved ability of the system to operate in a degraded mode (communications errors present); and 4) improved throughput of the communications subsystem in the normal mode, especially as relates to status polling.

A smart repeater according to the present invention, as shown in FIG. 22, enables dramatic improvements to both the utilization of communication links and the time required to collect data from all the lamp units. Once the console sends a message initiating the process, for example a message broadcast to a common repeater address, all of the truss repeaters 56 simultaneously collect data from the nine lamp units connected to each truss repeater. All of the trunk repeaters 55 then simultaneously collect blocks of data from the seven truss repeaters 56 connected to each trunk repeater 55. The console repeater 54 in master distribution rack 400 then collects blocks of data from the nine trunk repeaters 55 connected to the console repeater 54, and sends the entire block of all data collected to the console 24 in one message.

According to one embodiment, the utilization of communication links is increased because 63 truss repeaters 56 are using 63 links 26D at any one time. Only nine units of time are required to collect status data from 567 lamp units into the truss repeaters. Thereafter, nine trunk repeaters 55 are using nine links 26C at once. Seven units of time are required to collect status data from 63 truss repeaters into the trunk repeaters. The one console repeater 54 still uses only one link 26B at a time, and requires nine units of time to collect status data from the nine trunk repeaters.

More significantly, the console receives status data from 567 lamp units in one transmission from console repeater 54 over reply link 40A, thus saving the time required to transmit 566 message headers. The same volume of data is transmitted with much less overhead. Thus, the improved lamp-to-console reply process results in drastic reductions in both the time required to collect status reports and in the probability of error. Moreover, while the lamp units are transmitting data to the truss repeaters, trunk repeaters are transmitting data to the console repeater; and while the truss repeaters are transmitting data to the trunk repeaters, the console repeater is transmitting data to the console; thereby further increasing utilization of the data links. In this way the smart repeaters interleave their own status information into the collection of lamp unit status data.

A smart repeater according to the present invention maintains operating system programs for all lamp units connected thereto and performs any necessary down-loads without tying-up the whole system. The storage and download of the operating system programs may be made depending upon the configuration of the respective lamp units. In the case of a truss repeater performing such a down-load, only the other eight lamp units connected thereto are prevented from receiving any system cue commands during the down-load, the rest of the system being free to operate normally. Moreover, if all lamp units require operating system download, several smart repeaters hanging in the lighting truss can perform the operation in much less time than one control console can.

A smart repeater as shown in FIG. 22 includes a set of gates 478 for the various broadcast link outputs and a separate set of gates 456 for the various reply link inputs. This arrangement enables the smart repeater to communicate with selected lamp units individually. If, for example, two lamp units are accidentally set to the same address, both will transmit status reports upon receipt of a request for status. This results in garbled reception at the repeater. The smart repeater then transmits to each output individually, requesting from the lamp unit connected thereto the identity or address assigned to that lamp unit, and receives the response over the corresponding input. If two lamp units are set to the same address, the smart repeater determines this to be the case and reports the information to the console for display to an opera-or. The smart repeaters themselves can be identified by the setting of form and function switches (to identify the processor as a repeater and not a lamp unit) and by the setting of thumbwheel switches (to identify which repeater the processor is), both of which are included in a repeater unit identity circuit 494. Alternatively, the console repeater 54 can assign an identity to each trunk repeater 55 connected thereto, transmitting that identity via each of its nine outputs one-at-a-time. Thereafter each trunk repeater 55 can assign an identity to each truss repeater 56 connected thereto, transmitting that identity via each output one-at-a-time.

Any system utilizing processor-controlled devices must accommodate the possibility of a processor lock-up, a condition in which the processor may cease to perform its normal function due to corrupted data or the inadvertent execution of an endless loop of program instructions. The smart repeater of the present invention anticipates this possibility and provides a set of logic gates 484 associated with the communications controller, which route signals to and from the Manchester decoders and encoders and the communications controller. In a default state, the bypass gates route the output of the broadcast decoder 472 to the input of the broadcast encoder 474, while also routing the output of the reply decoder 468 to the input of the reply encoder 470. Each of the decoders and encoders themselves are connected in a default state as "repeaters", re-encoding the signal which appears on its input and providing the signal to its output. The default state of the signal repeater unit at initial power-up is that of a "dumb repeater", the operation of which is similar to repeater 52 as shown in FIG. 9.

When the processor in the smart repeater initializes and begins to execute its stored programs, one periodic function is to reset, via control line 486, a hardware timer incorporated in the bypass gates 484 and switch the gates so that all signals are routed through the communications controller. Control logic gates associated with the bypass gates produce logic signals 488 which are applied to the Manchester devices to reconfigure the devices from repeaters to encoders or decoders as required. As long as the processor continues to function normally, and periodically reset the hardware timer associated with the bypass gates 484, the unit functions as a smart repeater. If the processor fails and ceases to properly execute its programs, the timer times-out and the unit switches over to dumb repeater mode. The provision of a dumb repeater mode for default or emergency operation ensures continuity of the system data communications network in the event of a processor failure in one of the signal repeater units.

Any of the processor-controlled repeaters of the present invention can be provided with a standard serial data port 490 for connection to a portable or hand-held data terminal. A technician can connect such a terminal to a serial port connector provided on a repeater box or on a distribution rack and use the terminal to initiate diagnostic tests of the data link system, and receive test results and/or status data. For example, if the red reply link LED is lit on one repeater box, a technician can plug into the box with a hand-held data terminal to receive more detailed information about the indicated malfunction. A technician can also use the terminal to initiate further tests, which may be executed by the processor at the repeater, or which may be requested of the control console via a message sent from the repeater.

A portable data terminal can communicate with the repeater processor in the spare time between handling system commands and lamp unit responses transmitted over the data link network. A technician using the terminal can transmit a message to the console requesting a system command message be transmitted to one or more lamp units. The technician can for example start and douse bulbs this way while working in the lighting rig. Alternatively, a technician using the terminal can transmit a message to one or more lamp units connected to the signal repeater unit. A terminal connected at a distribution rack can transmit messages to one or more of a plurality of truss repeaters connected thereto.

As an alternative to the portable data terminal, a smart repeater may include an alphanumeric character display 452 for indicating the status of the data link network by displaying error codes or similar human-readable messages. A plurality of push-button switches 492 may be provided as input devices, and may be used in conjunction with a simple menu of input choices written to the display unit by the processor. This way, a technician may request error code reports, intitiate diagnostic routines or other functions by communicating with the repeater unit processor through a simple, built-in data terminal arrangement.

As shown in FIGS. 16 and 17, and discussed above, the data link traffic between the control console 24 and the various lamp units travels over link 26A between the control console 24 and the console repeater 54, located in distribution rack 400. A preferred embodiment provides a duplicate link 580, shown in FIG. 16, via a connection to a backup control console 582, in case of hardware failures. This duplicate link 580 remains dormant, however, until activated, providing no additional data communications capacity beyond what the main data link 26A already provides.

In a preferred embodiment, the lighting system disclosed herein is controlled by a modular control system to facilitate the upgrade or replacement of individual system components or modules for incorporation of software and/or hardware enhancements, as necessary, without affecting the operation of the entire control system. In addition, individual modules are preferably interchangeable, so that the modular control system 500 can be reconfigured, as necessary, to accommodate the varying requirements of different shows.

Figure 25:
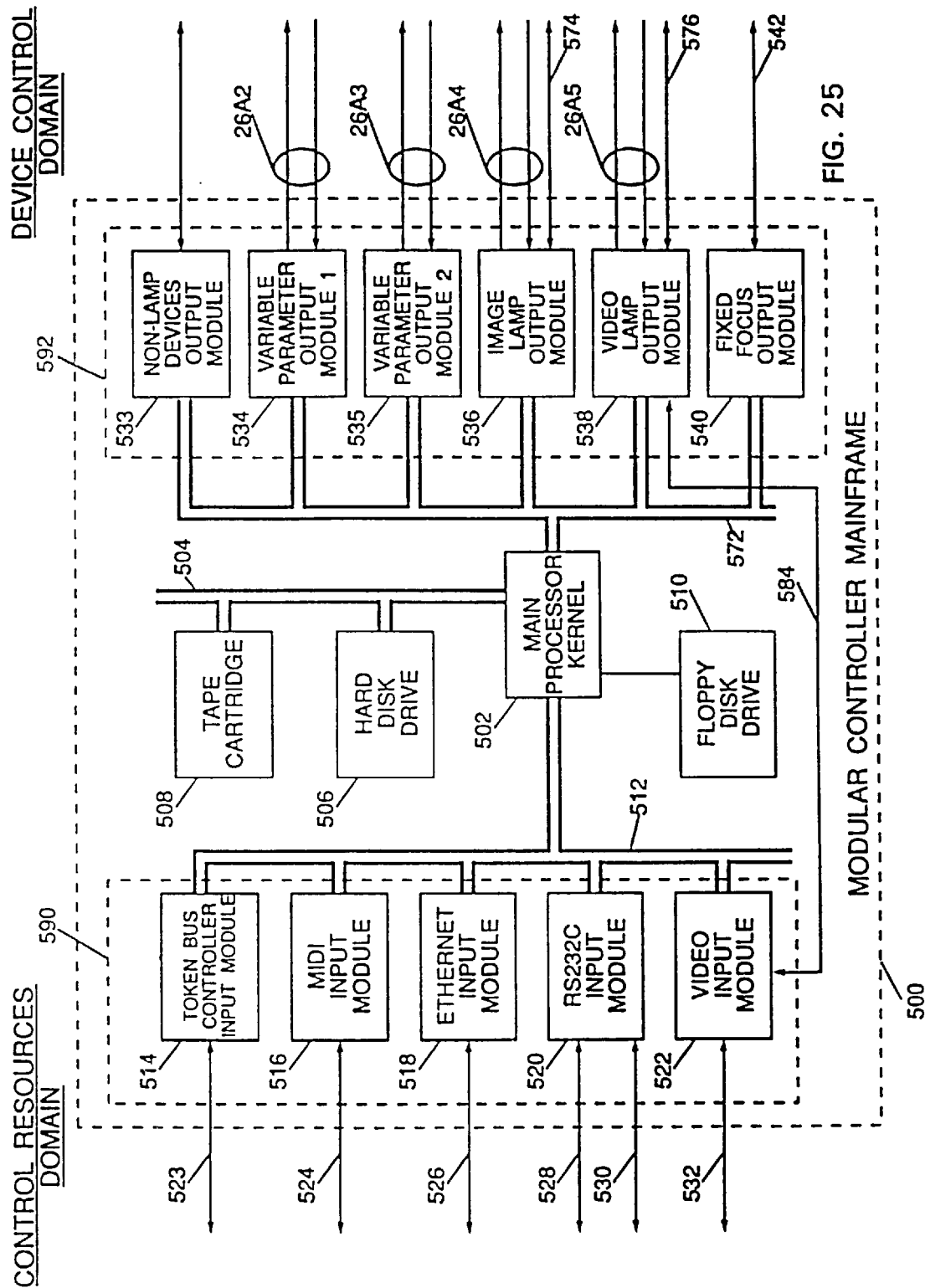
FIG. 25 is a block diagram of the electronic subsystems forming part of a modular controller mainframe.
Figure 26:
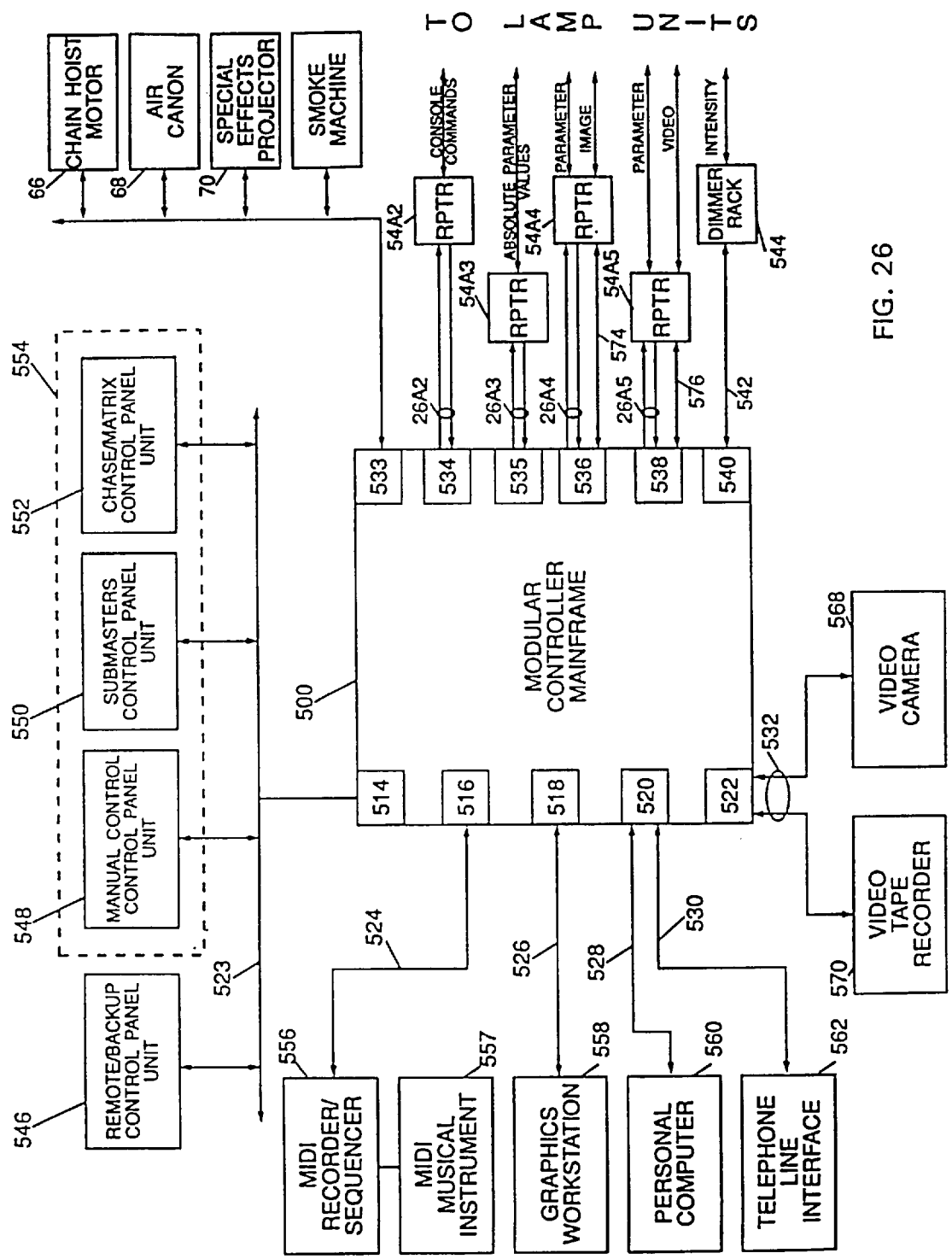
FIG. 26 is a block diagram of the modular control console system.

As shown in FIGS. 25 and 26, the modular control system comprises a modular controller mainframe 500, interconnected with control panel units 546–552 and other control devices in a Control Resources Network by a set of input modules 590, for controlling lamp units in a Device Control Domain interconnected with the modular controller mainframe 500 by a set of output modules 592.

Controllers for modern lighting systems often must be capable of simultaneously supporting diverse lamp units having different communication protocols, functions and data requirements. For example, lighting designers often desire to incorporate conventional (intensity-only) lamp units, in addition to automated variable-parameter lamp units, as well as utilizing lamp units provided by different manufacturers.

While conventional lamp units only require an intensity data value, automated variable-parameter lamp units, such as those associated with the Vari*Lite® Series 200™ lighting system, will require a number of variable parameters including, e.g., color, intensity, gobo, pan and tilt.

Additionally, more complex automated variable-parameter lamp units capable of projecting images, e.g., lamp units having a liquid crystal display, such as those disclosed in the above incorporated application Ser. No. 07/693,366, now U.S. Pat. No. 5,282,121 require image data files in addition to the parameter data associated with a typical automated lamp unit.

Accordingly, each module, in the sets of input and output modules 590, 592, discussed further below, is configured as an independent data network, capable of conforming to one or more different communication protocols for communicating with the specific devices attached thereto; thereby facilitating the connection of the modular controller mainframe 500 to a number of otherwise non-compatible devices. In this manner, the modular controller mainframe 500 serves as an interface system for communications between a plurality of control devices having diverse communications protocols and a plurality of lamp units and other output devices having diverse communications protocols, functions and data formats. Accordingly, improved control of various types of lamp units having diverse functions and protocols may be achieved.

Each module in the set of input modules 590, shown in FIGS. 25 and 26, and discussed further below, serves as an interface between the modular controller mainframe 500 and one or more control devices, e.g., 556–558, 560, 568, 570, attached thereto. Each module in the set of input modules 590 is configured to receive control commands from the control devices connected thereto and to translate, if necessary, the received commands into a command format that may be interpreted by the modular controller mainframe 500.

Each module in the set of output modules 592, discussed further below, serves as an interface between the modular controller mainframe 500 and one or more types of lamp units and other output devices having diverse communications protocols, functions and data formats. The individual modules in the set of output modules 592 receive generic console commands from the modular controller mainframe 500 suitable for communicating with all lamps and other output devices and translate, where necessary, those generic commands into the specific commands or parameters required for communicating with the specific type of output devices connected thereto.

Upon manipulation of the controls of the control panel units 546–552, e.g., the knobs, buttons and faders described further below, the modular controller mainframe 500 preferably generates "generic" console commands, consisting of an encoded representation of the manipulation performed on the console controls, for transmission to each lamp unit.

While some lamps units, e.g., those described above, having local processors and memory for storing cue data, are capable of directly accepting these console commands for translation by the lamp unit processor into the necessary values for conforming their parameters to achieve the desired lighting effect, other lamp units, not having such advanced processing capabilities, are only capable of accepting absolute parameter data, i.e., the actual calculated data values for pan, tilt, color, and other parameters.

Accordingly, for those lamp units only accepting actual parameter data, the "generic" console commands must be translated by a processor remote from the lamp units, prior to the final transmission to the lamp units, into the required specific absolute parameter data values. Preferably, the generic console commands are transmitted to each module in the set of output modules 592, wherein, if necessary, the output module performs the command translation before transmitting the commands to the lamp units.

For example, if a console operator adjusts a knob associated with intensity control for a number of lamp units selected for manual control, the modular controller mainframe 500 will transmit a command to each module in the set of output modules 592 consisting of an encoded representation of the "delta value" corresponding to the knob adjustment. Those modules in the set of output modules 592 that support lamp units capable of directly interpreting this generic console command, will transmit the console command to each connected lamp unit, without translation. However, those modules in the set of output modules 592 that support lamp units requiring absolute parameter commands must translate the generic console commands to the absolute parameter values necessary to set the selected lamp units to the desired intensity.

Those modules in the set of output modules 592 that are configured to perform command translations preferably include a processor and memory for storing cue data in order to duplicate the functions of a lighting controller, such as those described in U.S. Pat. No. 4,392,187, to Bornhorst, wherein the controller receives commands representing manipulation of console controls, and calculates the absolute parameter values necessary for transmission to each lamp unit.

In addition, each output module 592 may be configured to conform transmitted signals according to the appropriate communications protocol for the connected lamp units, i.e., each output module ensures that transmissions to the lamp units have the appropriate signal levels, timing, parameter order and other format factors that are expected by the lamp unit.

MODULAR CONTROLLER MAINFRAME/ MAIN PROCESSOR KERNEL

The modular controller mainframe 500, shown in FIG. 25, includes a main processor kernel 502 and sets of input and output modules 590, 592, all interconnected by high-speed parallel data buses, including input bus 512, output bus 572, and mass storage bus 504.

The main processor kernel 502 includes a microprocessor (CPU), such as a Motorola MC68040, random-access memory (RAM), read-only memory (ROM), and associated support circuits. The main processor kernel 502 could be constructed as a mother board having its CPU, memory (RAM and ROM) and support circuitry built thereon, with the mother board additionally providing built-in connectors for mating with plug-in connectors of the various buses 504, 512, 572.

The main processor kernel 502 communicates in one of several modes with the various modules in the sets of input and output modules 590, 592 for the transfer of cue data, status reports and other information. In a manner similar to the communications manager program, described above for communications between the console and the individual lamp units, there can be provided two types of message addresses for communications between the main processor kernel 502 and the various modules in the sets of input and output modules 590, 592; namely, individual module addresses and a module broadcast address.

Accordingly, each module may be individually accessed by the main processor kernel 502 by transmitting the unique module address associated with that particular module. In this manner, although all modules can receive the transmission with the individual module address, only the module associated with the transmitted address will respond.

In the module broadcast mode, the main processor kernel 502 can transmit messages to all modules in the sets of input and output modules 590, 592 at a common address, wherein each module in the sets of input and output modules 590, 592 responds depending upon the respective configuration of the module, and the devices connected thereto. In one embodiment, additional module broadcast addresses can be provided to allow the main processor kernel 502 to limit a broadcast to either the set of input modules 590 or the set of output modules 592.

In a lamp unit broadcast mode, control input signals received by the modular controller mainframe 500 from any of the control input devices are transmitted via the set of output modules 592 to each of the lamp units connected in the Device Control Domain at a common address.

MASS STORAGE DEVICES

The main processor kernel 502 communicates, via the mass storage bus 504, with processor-controlled mass data storage and retrieval devices, e.g., a large capacity hard disk drive 506 or a digital data tape cartridge drive 508. In addition, a floppy disk drive 510 may be connected directly to the main processor kernel 502.

Preferably, the mass storage bus 504 conforms to the Small Computer System Interface (SCSI) protocol, or a similar bus standard, so that additional mass storage devices (not shown) can be easily connected to the mass storage bus 504.

Cue data uploads, received from the lamp units by the output modules 592 and then transmitted to the main processor kernel 502, can be stored on the hard disk drive 506 in addition to being "backed-up" on the tape cartridge drive 508 and/or floppy disk drive 510. Status reports, described further below, can be logged on the hard disk drive 506 for analysis by a data base and report generator program which may operate on the main processor kernel 502 or on a personal computer 560 (FIG. 26).

OPERATING SYSTEMS

Operating system software for the various devices of the modular control system, e.g., main processor kernel 502, the sets of input and output modules 590, 592, control panel units 546–552, lamp units, and smart repeaters 52–58, can be stored on hard disk drive 506. In this manner, updated versions of the operating system software can be loaded onto the hard drive 506 via a tape cartridge inserted in the tape drive 508, or via floppy disks inserted in the floppy disk drive 510. Operating system software can thereafter be downloaded from the mass storage devices 506–510 to the appropriate devices, as required.

INPUT MODULES

The main processor kernel 502, as noted above, is connected to the set of input modules 590, each controlled by a microcontroller integrated circuit, such as the Motorola MC68302 Integrated Multiprotocol Processor. The set of input modules 590 are connected to the main processor kernel 502 by means of parallel input bus 512, e.g., a 16-bit or 32-bit data path, also having associated address and control lines, as required.

The configuration of the input modules 590, shown in FIG. 25 and discussed below, is merely illustrative. Other input modules may be connected to the input bus 512, as required, to accommodate new control devices and serial data link formats, which may be developed in the future.

Input module 514 connects control panel units 546–552 to the modular controller mainframe 500, as shown in FIG. 26, via a well known serial token bus 523, or similar serial data link. Preferably, input module 514 is embodied as a token bus controller, for communicating with microprocessor-controlled control panel units 546–552. A microprocessor station connected to the serial token bus may transmit on the bus when it has possession of the control packet, or "token", with control being surrendered upon transmission to the processor receiving the control packet. Alternatively, a token ring network may be implemented, with the various devices on the network connected in a daisy-chain fashion to form a closed ring.

Input module 514 is preferably configured to "listen to" all messages on the serial token bus. In this manner, input module 514 can transmit at any time input control signals to the main processor kernel 502, where appropriate, regardless of which processor station connected to the bus 512 possesses the control packet.

The control panel units 546–552 are each controlled by one or more microprocessors and may be configured to incorporate particular features and functions of a control console, described above, such as the Artisan® console marketed by Vari-Lite, Inc., of Dallas, Tex., in addition to supplementary features.

For example, a manual control panel unit 548 can provide, e.g., means for selecting lamp units to be placed under manual control, means for indicating selected or active lamp units, and means to manipulate the various parameters of selected lamp units. In a typical lighting arrangement, manual controls are utilized for arranging the various lamp units in a desired configuration prior to storing the resulting lighting effect as a "cue".

In addition, a submasters control panel unit 550 can provide, e.g., means for storing, recalling and initiating cues, as well as means for executing manual cross-fades between two cues. Once a cue has been assigned to a submaster, it may typically be activated by selecting the associated submaster and manipulating the fader on that submaster.

A chase/matrix control panel unit 552 may provide means for controlling chase sequences, in addition to matrix control means for controlling smaller groups of lamp units. A chase is a programmed sequence of cues that may be recalled into the chase/matrix control panel unit 552 and executed automatically in a known manner. A known matrix panel provides faders for manipulating the intensity of lights in a recalled cue, provided that the lights have previously been "patched" to the matrix panel.

An additional control panel unit 546, featuring a subset of the manual controls, cue storage and recall, and chase and matrix controls described above, may be used as an alternate control console in a remote location or as a backup control console. This remote or backup console may be configured to incorporate particular features and functions of a remote or backup control console, such as the mini-Artisan® console marketed by Vari-Lite, Inc., of Dallas, Tex., in addition to supplementary features. The control panel unit 546 is preferably constructed on a single control panel.

Input module 514 is preferably configured to receive and sample data at a sufficiently high data rate such that each of the control panel units 546–552 connected to the serial token bus 523 can be on-line simultaneously. This allows a remote operator to perform control operations on the remote control panel unit 546 while the main operator performs operations on one or more of the control panel units 548–552.

Each control panel unit 546–552 preferably includes one or more display modules, which may be liquid crystal displays (LCD), electro-luminescent (EL) graphic display panels, vacuum-fluorescent (VF) alphanumeric display modules, light-emitting diode (LED) character display elements, or other suitable display devices.

The control panel units 546–552 may also include "soft switches", for example, push button switches having character display means in the key cap of the push button, such as the Pixie Graphic LCD Switch made by Industrial Electronic Engineers, Inc., of Van Nuys, Calif. Alternatively, push button switches can be mounted adjacent to other display units which indicate the functions of the buttons.

In this manner, as the function of the push button changes in different operating modes or under control of different operating system software versions, the label displayed in the key cap or in the adjacent display can be rewritten to indicate changed or alternate functions.

Some of the push button switches may be fixed-function, for example a numeric keypad, while other buttons are reprogrammable in different modes of operation, for example a bank of buttons might be channel select buttons in one mode, and timing function controls in another mode.

The control panel units 546–552 may also contain one or more types of continuous manual control devices, for example rotary knob-type controllers, such as rotary optical encoders, or linear fader-type controllers such as linear slide-potentiometers. A manual control panel 548 may contain only rotary continuous controllers while a submasters control panel 550 may contain only linear continuous controllers. A special function control panel such as a chase/matrix controller 552 or a remote/backup console 546 may contain both rotary and linear controllers.

The primary control panel units 548–552 may be mounted together in a single console 554 to serve as a main control console or, alternatively, they may be mounted separately in spaced-apart locations. Further, each of the control panel units 546–552 can be customized for a particular application by installing the desired mix of knobs, faders and display units, and programming the soft switches, as desired.

The modular design of the control panel units 546–552 allows the controller to be designed in accordance with prevailing desires of lighting system operators, which can thereafter be easily supplanted by a different configuration if those desires change, without requiring a complete redesign of the hardware and operating system programs of the entire lighting control console. Since each control panel unit 546–552 runs its own operating system programs, the necessary program modules can be re-written to support a new control panel unit while the rest of the modular control console system remains unchanged.

Additional input modules can be provided as well, as shown in FIG. 25, including, e.g., a Musical Instrument Digital Interface (MIDI) module 516, an Ethernet port module 518, an RS232 serial data port module 520 or a video input module 522.

The MIDI input module 516 is configured to receive and interpret signals that conform to the MIDI convention. In one embodiment, the MIDI input module 516 may be connected to a MIDI recorder/sequencer 556, such as the Alesis MMT-8 Multi Track MIDI Recorder, by means of a serial data link 524, for recording and playback of control console commands generated by the modular controller mainframe 500, as shown in FIG. 26 and discussed further below.

In another embodiment, discussed further below, the MIDI input module 516 may be connected to an electronic musical instrument 557 or other device capable of generating MIDI "notes", with the MIDI notes generated thereby received and interpreted by the modular controller mainframe 500 to effectively control lighting parameters. The electronic instrument 557 may be connected to the input module through the MIDI recorded 556, as shown, or alternatively, the instrument 557 may be coupled directly to module 516.

Since the MIDI convention defines 128 MIDI notes, up to 128 buttons on the various control panel units 546–552 may be "mapped" to unique MIDI notes. Accordingly, upon depression of a mapped button on a control panel unit 546–552, a console command will be detected by the main processor kernel 502, whereupon the main processor kernel 502 can translate the console command into the "mapped" MIDI command. The MIDI NOTE ON command may be then transmitted to the MIDI input module 516 for recording by the MIDI recorder 556. Similarly, when the button is released, a MIDI NOTE OFF command may be transmitted to the recorder 556.

By configuring the recorder 556 to record events received at its MIDI IN port, the series of commands generated by button depressions on the control panel units 546–552 may be stored in the non-volatile memory of the recorder 556 for later retrieval.

In this manner, "Board Control Cues" may be established that place the control panel units 546–552 in a particular condition for execution of a series of cues for a particular song or dance. For example, to prepare the submasters control panel 550 for a particular song, the associated cue numbers for that song or dance must be loaded into specific submasters and the appropriate submasters must then be selected. Similarly, to prepare the chase/matrix control panel 552 for a particular song, certain chases and matrix patches must be loaded.

The console operator typically performs these tasks during a performance, prior to each song, by executing a series of button depressions on the control panels. Unfortunately, the order of songs to be performed is often not known in advance, and the operator will only have a minimal amount of time, following notification of the next song to be performed, to arrange the control panels 546–552 in the necessary configuration.

Accordingly, the MIDI recorder 556 can record for each song (in advance) the series of button depressions necessary to place the control panel units 546–552 in the particular condition for the series of cues associated with each song or dance. Thereafter, during a performance, when the operator is notified of the next song to be performed, the operator can initiate the playback of the previously recorded button depressions by the MIDI recorder 556. The MIDI recorder 556 effectively performs the quick burst of key depressions required to setup the control panel units 546–552 in a particular condition.

The MIDI signals received at the MIDI input module 516 from the MIDI recorder 556 during playback are preferably translated to the corresponding console control commands by the processor of the MIDI input module 516, prior to transmitting the commands to the main processor kernel 502 for subsequent transmission to the control panel units 546–552. Performing the translation in the MIDI input module 516 relieves the processor of the main processor kernel 502 of performing this task, and allows the main processor kernel 502 to remain free to perform other tasks.

Although, as stated above, the MIDI recorder 556 may be embodied as a multi-track MIDI recorder, capable of playing one or more tracks simultaneously, only a single track should be utilized for recording and playback so that NOTE ON and NOTE OFF commands are not directed to the same button simultaneously. In addition, it should be noted that depression of unmapped buttons on the control panel units 546–552 will not be recorded by the MIDI recorder 556.

In an alternate embodiment, the MIDI input module 516 may be configured to receive light parameter control commands generated by an electronic musical instrument 557 or other device capable of generating MIDI notes. By mapping MIDI notes to parameter control commands, as described above, lighting system parameters may be directly altered from a remote source by depressing the "keys" corresponding to the desired "notes" on the MIDI instrument.

The MIDI NOTE ON and NOTE OFF commands generated by the MIDI device 557 will be communicated to the lighting system via the MIDI input module 516, where the MIDI commands will preferably be translated to the corresponding console control commands by the processor of the MIDI input module 516, before transmission to the main processor kernel 502.

Commands received at the modular controller mainframe 500 for controlling the state of a console button can be interpreted in either of two ways, i.e., to toggle the state of the button to its alternate state or to place the button in a desired state, regardless of its prior state. Accordingly, two modes are preferably provided. In the first mode, parameter control commands received by the modular controller mainframe 500, i.e., a MIDI NOTE ON or NOTE OFF command, will be interpreted as a command to toggle the associated console button to its alternate state. Accordingly, if a MIDI NOTE ON command is received in this first mode, corresponding to a button already selected, the NOTE ON command will toggle the button to its alternate, or deselected state.

In the second mode, however, commands received at the modular controller mainframe 500 are interpreted to place the associated buttons into a known state regardless of the prior state of the button.

For example, a message received by a module in the set of input modules 590 may contain a command to select certain submasters and/or deselect others, regardless of whether or not the submasters are currently selected when the message is received by the input module.

Upon receipt of this command by the modular controller mainframe 500, the main processor kernel 502 will recognize the commands to select and/or deselect certain submasters. The main processor kernel 502 will recognize that this message should be directed to control panel units 546–552 and will subsequently send a message containing the commands to input module 514 for transmission to the control panel units 546–552.

The control panel units 546–552 will each receive the message and individually respond, depending upon whether or not the specified submasters reside on the individual control panel unit. The control panel units having the specified submasters will respond to the command by lighting the appropriate select button [SEL], if not already lit, as an indication that the associated submaster is selected. The control panel units not having the specified submasters will ignore the submaster select command.

In addition, messages containing the submaster select/ deselect commands should also be sent by the main processor kernel 502 to each of the various output modules in the set 592 for transmission, where appropriate, to each of the lamp units. As discussed above, for those lamp units not capable of interpreting "generic" console commands, the associated output modules 592 must translate the commands into the absolute parameter data, suitable for interpretation by the lamp unit.

Input module 518, shown in FIG. 25, implements an Ethernet port for high-speed data communications. In one implementation, the Ethernet port may be connected to a graphics workstation 558, such as a Sun Microsystems SPARC 2 computer workstation, via serial data link 526, as shown in FIG. 26. A graphics workstation 558 may be utilized to develop, modify and control images which are to be projected by automated lamp units having image generating capabilities, such as the lamp units having liquid crystal projection gates disclosed in the above incorporated application Ser. No. 07/693,366.

In addition, graphics workstation 558 may be utilized to operate software suitable for coordinating the off-line programming of lighting parameters by utilizing a three-dimensional model of the performance venue and the functions of a lighting system, such as the programming and modelling tool described in the above incorporated application Ser. No. 07/641,031, now U.S. Pat. No. 5,307,295.

Input module 520 preferably implements an RS232C-compatible serial data port. In one embodiment, shown in FIG. 26, the RS232 port can be connected to a personal computer 560 via serial data link 528, allowing cue data, status reports and other information to be transferred between the various lamp units, control panel units 546–552 and personal computer 560. In this manner, the personal computer 560 can be utilized for development, display and manipulation of cue data and status reports.

Preferably, a suitable modem circuit is included in input module 520, since the RS232 data format is commonly transmitted over telephone lines. As shown in FIG. 26, the modular controller mainframe 500 can thus communicate with remote devices and computer systems via serial data link 530 and telephone line interface 562, thereby allowing cue data, status reports and other information to be transmitted between the performance venue and a remote maintenance facility. In this manner, faults in the lighting system may be diagnosed by an operator at the remote facility.

Input module 522 is preferably configured to receive analog video inputs via serial data links 532 from, e.g., a video tape recorder 570 and/or video camera 568, as shown in FIG. 26. In this manner, video signals generated by the recorder 570 and/or camera 568 may be multiplexed and transmitted to those lamp units having image generating capabilities via separate data link 584 (discussed below).

OUTPUT MODULES

As noted above, a set of output modules 592 are preferably provided for interfacing the main processor kernel 502 with the lamp units. The set of output modules 592 are connected to the main processor kernel 502 by means of parallel output bus 572, e.g., having a 32-bit or 64-bit data path, in addition to the necessary address and control lines.

Each output module in the set 592 is preferably controlled by one or more microprocessors, such as the Motorola MC68302 Integrated Multiprotocol Processor and the Motorola MC68332 microcontroller.

As noted above, each module in the set of output modules 592, is preferably configured as an independent data network, allowing each module to serve as an interface between the modular controller mainframe 500 and one or more types of lamp units and other output devices having diverse communications protocols, functions and data formats. Each output module in the set 592 translates, if necessary, the generic console commands received from the modular controller mainframe 500 into the specific commands or parameters necessary for communicating with the specific types of lamp units or output devices connected thereto.

The configuration of the modules in the set of output modules 592 and the lamp units or other output devices connected thereto, e.g., the number and type of lamp unit connected to each output module, as shown in FIGS. 25 and 26 and discussed below, is merely illustrative, with other output module configurations being easily developed, as necessary, to accommodate varying preferences in the variety, number and arrangement of lamp units and other output devices comprising each lighting system. Furthermore, additional individual output modules can be constructed or upgraded, as necessary, to accommodate any new communication protocols, functions or data formats that may be developed for lamp units and output devices.

As noted above, each output module in the set 592 must be able to conform signals, prior to transmission to the connected lamp units, to the appropriate communications protocol, i.e., each output module must ensure that transmissions to the lamp units have the appropriate signal levels, timing, parameter order and other format factors that are expected by the lamp unit.

In the illustrated embodiment, the lighting system consists of automated variable-parameter lamp units capable of directly receiving generic console commands, e.g., those associated with the Vari*Lite® Series 200™ lighting system (VL200S), such as the VL2®, VL2B®, VL3™ or VL4™ luminaires; automated variable-parameter lamp units requiring absolute parameter commands, i.e., those requiring translation of the generic console commands; automated variable-parameter lamp units capable of projecting stored images; automated variable-parameter lamp units capable of projecting video images; standard conventional, fixed-focus lamp units and other output devices, e.g., air cannons, special effects projectors, smoke machines and chain hoist motors for controlling the elevation of the truss assembly.

Preferably, as noted above, each module in the set of output modules 592 that support lamp units capable of reacting to received commands is capable of transmitting commands on a broadcast basis to a common lamp unit address and to transmit lamp-specific commands to individual lamp unit addresses.

In addition, the set of output modules 592 is preferably configured to download operating system software from the mass storage devices 506–510 to individual lamp units and smart repeaters connected thereto, as required. Each module in the set of output module 592 may be programmed to accomplish other tasks, as well, according to the operating system software written for that output module.

In the illustrated embodiment, output module 534 is configured to support automated variable-parameter lamp units capable of directly receiving generic console commands, such as those lamp units associated with the Vari*Lite® Series 200™ system. When output module 534 is configured to support the communications protocol of the Vari*Lite® Series 200™ system or a similar protocol, it preferably implements bidirectional serial data link 26A2 using Manchester encoding, as described above, which features separate broadcast and reply data links in a dual network.

Output module 535 is configured to support automated variable-parameter lamp units requiring absolute parameter values. Accordingly, output module 535 must be capable of translating the generic console commands received from the main processor kernel 502 into the absolute parameter values required for the specific types of lamp units connected thereto. As noted above, output module 535 preferably includes a processor and memory for storing cue data in order to perform the necessary command translations.

In the illustrated embodiment, output module 536 is configured to support automated variable-parameter lamp units capable of projecting images, e.g., those having liquid crystal projection capabilities. Accordingly, output module 536, connected to the associated lamp units by means of data link 26A4, is preferably configured to interleave stored digital data files with the system commands and parameter data typically downloaded by the controller for storage in the local memory of the lamp units prior to a performance. The image data files may be received from graphics workstation 558 or from a mass storage device 506–510.

The image signals associated with output module 536 are typically digital image signals; accordingly, these signals may be carried between the output module 536 and repeater 54A4 for transmission to the connected lamp units by means of a dedicated twisted pair 574, which is typically utilized in lighting systems.

Output module 538 may be configured to support automated lamp units capable of projecting video images, e.g., those lamp units having liquid crystal projection capability. Accordingly, output module 538, implementing data link 26A5, may transmit analog video signals to the connected lamp units. The video signals may be received through input module 522 connecting a source of analog video, e.g., camera 568 or video tape recorder 570, as discussed above.

Since the video signals associated with output module 538 are typically analog signals they may be carried between the output module 538 and the connected lamp units by means of a dedicated coaxial cable 576. Output module 538 may be reconfigured at such time as necessary to accommodate digital video signals.

The lamp units having liquid crystal projection capabilities can be configured to generate animated pictures by sequencing stored digital image data files. Accordingly, output modules 536 and 538 are preferably configured to transmit image files to these lamp units in a real-time sequence. Alternatively, the image data files can be transmitted to the lamp units for storage in advance of a performance and recalled in a sequential manner similar to the retrieval of cue data. For those video lamp units requiring analog video signals, the digital image data files for sequential projection are preferably converted to analog signals by output module 538 prior to transmission to the lamp units.

Output modules 536 and 538, supporting image generating lamp units, preferably include the appropriate hardware for image handling, i.e., additional memory capacity for storage of image files, and conversion circuitry, if necessary, for converting image files from analog to digital signals, or vice-versa, as required by the type of lamp units connected thereto. In addition, these output modules may require enhanced transmission capacity for transmission of the image data files, i.e., a high-speed optical-fiber data link or, alternatively, compression circuitry for transmission of real-time animated sequences over a relatively slow data link.

In the embodiment shown in FIG. 25, a separate data link 584 is provided between video input module 522 and video output module 538 for transmitting video signals therebetween. In the case of analog video signals, the additional link 584 allows the video signal to be transmitted from the input module 522 to the output module 538 as an analog signal, without requiring analog-to-digital conversion in module 522 and then reconversion from digital-to-analog in module 538. Additional link 584 is preferably utilized even where digital video signals are utilized, to prevent overburdening the transmission capacity of main processor kernel 502 and internal buses 512 and 572.

As shown in FIG. 26, video input module 522 is preferably configured to accept several video inputs simultaneously. Additionally, each of the video signals generated by these video inputs are preferably multiplexed onto line 584 and provided to output module 538 for subsequent transmission to each of the connected video lamp units. In this manner, each of the video lamp units is provided with a number of video signals for projection. Each video output module 538 is preferably configured to translate each of these video signals into a format that is compatible with each of the video lamp units connected thereto.

The digital image files are preferably broadcast by the main processor kernel 502 to each of the output modules. However, only those modules in the set of output modules 592 supporting image generating lamp units should respond.

Control signals specifying certain changes to the image data at the lamp unit projection gates can be transmitted from the modular controller mainframe 500 to the lamp units to cause the lamp unit processor to execute such functions as a video "dissolve" or "wipe" from one image to another. Such "dissolve" or "wipe" commands may originate from a graphics workstation 558 or from a control panel 546–552, in the manner described with respect to bidirectional bus 80 in the Control Resources Network, as shown in FIG. 2.

In the illustrated embodiment, output module 540 implements a DMX-512 serial data link 542 for controlling ac power dimmers 544. Although the DMX-512 protocol supports up to 512 channels for conventional, fixed focus lamp units, less than 512 channels can be allocated to conventional lamp units.

In the illustrated embodiment, output module 533 is configured to support a plurality of output devices, other than lamp units, commonly utilized in performances. As described above, other stage action effects often need to be controlled by a lighting console. For example, output module 533 can be configured in a manner similar to the control signal converter 64, described above with respect to FIG. 2, for producing control signals for directing the operation of chain hoist motor 66, air cannon 68, special effects projector 70 and a smoke machine.

STATUS REPORTS

Each module in the set of output modules 592 that supports lamp units capable of transmitting status reports is preferably configured to receive such status reports from the lamp units for transmission to the main processor kernel 502. Thereafter, the status reports can be transmitted by the main processor kernel 502 over the input bus 512 to each module in the set of input modules 590 for transmission to the control devices.

For example, status reports received by the main processor kernel 502 can be relayed to control panel units 546–552 via input module 514 and/or to personal computer 560 via input module 520. Preferably, the operating system software of these control devices, e.g., 546–552, 560 allows the control devices to receive and display such reports.

In addition, an artificial intelligence program or "expert system" may be installed as part of the operating software of these control devices 546–552, 560 for monitoring and analysis of the status reports. In this manner, the control devices can scan the status reports, and identify faults in the system by comparing the status reports against a data base of known symptoms and possible faults.

It thus becomes possible, for example, for the control devices 546–552, 560 to conclude and report that the ambient temperature in the vicinity of the lamp units is probably higher than normal if a preponderance of lamp units report over-temperature conditions in their respective lamp head assemblies.

Upon receipt of a status report from the main processor kernel 502, the input module 514, preferably embodied as a token bus controller, transmits the status report, along with the control packet, to one of control panel units 546–552. The first control panel unit to receive the message, i.e., unit 548, displays the report to the operator. The processor of control unit 548 will compile a message consisting of the control packet, the status report, and any control input signals generated by operator control actions, for transmission to a second control panel unit, i.e., unit 550.

The second control panel unit 550 receives the status report and displays it. The processor of second control unit 550 compiles a message consisting of the control packet, the status report, control input signals added by the first control panel unit 548, and control input signals generated by operator control actions at the second control panel unit 550, for transmission to the next device on the serial token bus 523, i.e., control panel unit 552.

Eventually, the messages are returned to the token bus controller 514. Token bus controller 514 will thereafter discard the status report and compile the control input signals for transmission to the main processor kernel 502.

Experience has shown that certain situations require different controls for operating a computer controlled lighting system with distributed processing. In a rehearsal mode, for example, extensive controls for selecting lamp units and manipulating their multiple parameters are required for programming the system to achieve the desired lighting effects. In a performance mode, on the other hand, extensive controls for recalling cue data and controlling groups of lamp units are required for operating the system to reproduce and/or combine the desired lighting effects.

In a synchronized performance mode, no controls are required as the modular controller mainframe 500 receives timing signals via one of the modules in the set of input modules 590 and recalls cues according to a time code program so that the desired lighting effects are reproduced in coordination with other events in a show.

In yet another performance mode, it may be appropriate to provide simple display means and manual override or emergency controls on a control panel unit 546–552 connected to the modular controller mainframe 500 so the desired lighting effects can be reproduced even if the timing signals are lost.

The present invention therefore provides a control system for computer controlled lighting systems with distributed processing in which the control console can be reconfigured and/or replaced with a different console depending upon the specific application for which the lighting system is used. It is no longer necessary to provide one console having all possible controls available all of the time, rather the control system can be reconfigured to accommodate the differing requirements of rehearsal programming and performance playback, including various requirements to provide electrical control interfaces between the lighting control system of the present invention and other electrical control systems.

Although several embodiments of the invention have been illustrated in the accompanying Drawings and described in the foregoing Detailed Description, it will be understood that the invention is not limited to the embodiments disclosed, but is capable of numerous rearrangements, modifications and substitutions without departing from the scope of the invention.

In another embodiment, the lighting system disclosed herein is controlled by a distributed control system to facilitate more efficient utilization of diverse control system elements. Whereas the modular control resources network described above provides for multiple on-line control panels operating simultaneously to control a plurality of automated and conventional lamp units, the modular controller mainframe remains a single, complex node of data link communications between the controllers and the lamp units The complexity of the modular controller mainframe makes it susceptible to failure and its role as a central node of communications makes its failure a serious potential liability. To relieve the seriousness of a potential failure in a central component of a control system such as the control resources network described herein, a distributed control system characterized by distributed control system elements interconnected by a simplified high-speed data link network is utilized.

Figure 27:
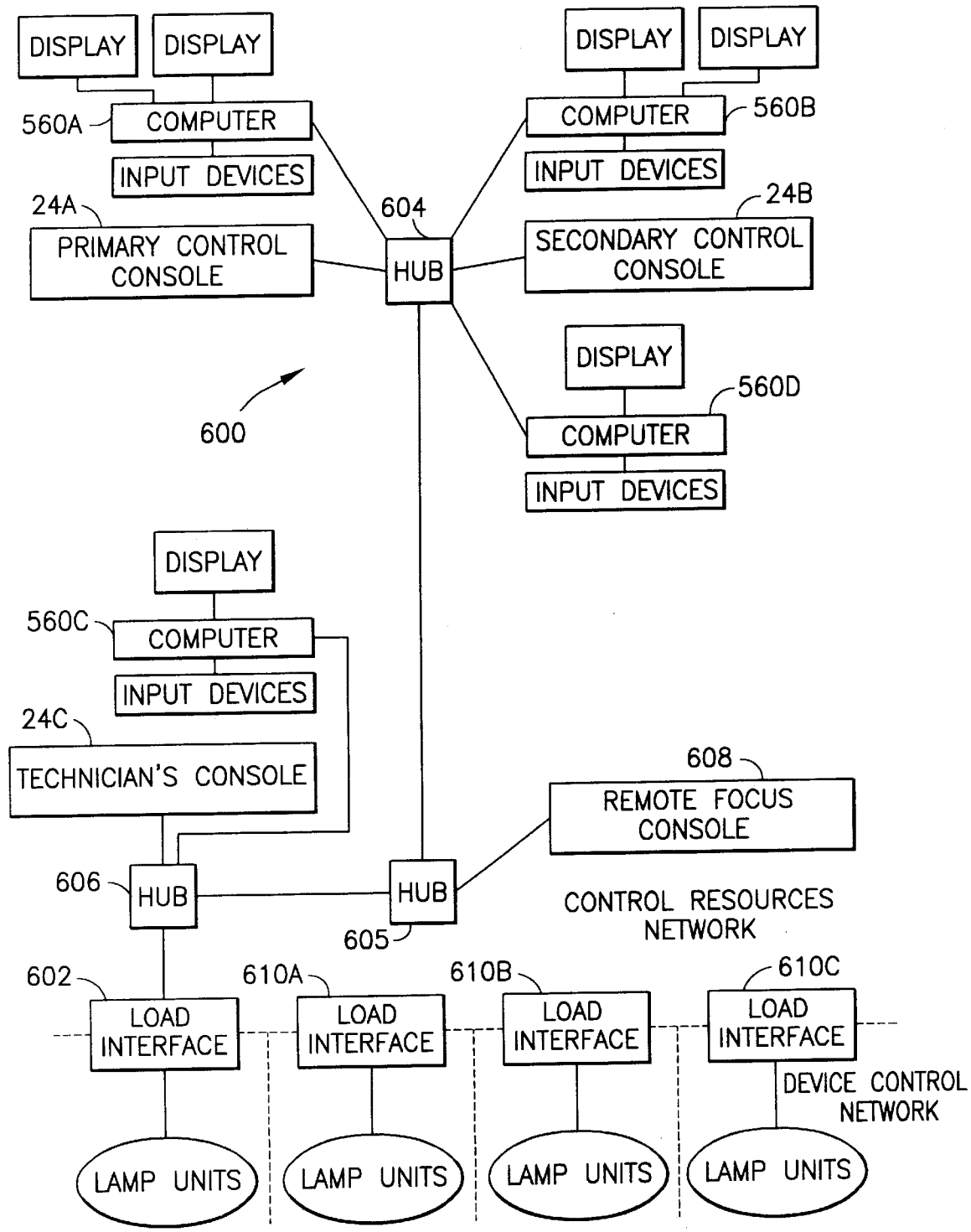
FIG. 27 is a block diagram of a distributed control system.

Referring now to FIG. 27, a distributed control system consists of one or more control consoles 24A, 24B, 24C of the type hereinbefore described, one or more general purpose computers 560A, 560B, 560C, 560D, and one or more load interface modules 602, 610A, 610B, 610C typically but not necessarily associated with a power and signal distribution rack 400 (FIG. 16); all of the above described control system elements communicating over a high-speed data distribution network 600, such as Ethernet.

The various control system elements may exist as peers on the network, which is to say that no one element is in control of data communications on the network but all elements have equal access to the network; some well-understood scheme being utilized to resolve or otherwise obviate conflicts arising from simultaneous attempts to transmit data by two or more control system elements Alternatively, a token bus such as described in connection with FIG. 26 may be utilized.

Other configurations may be utilized in which a control console and a personal computer are connected together locally, and one or the other is connected to the high-speed control resources network 600.

One system element has unique status as a system data repository, which may be a general purpose computer 560 that stores a three-dimensional model of the lighting system such as described in the above incorporated application Ser. No. 07/641,031 (now U.S. Pat. No. 5,307,295) entitled "Creating and Controlling Lighting Designs."

Figure 28:
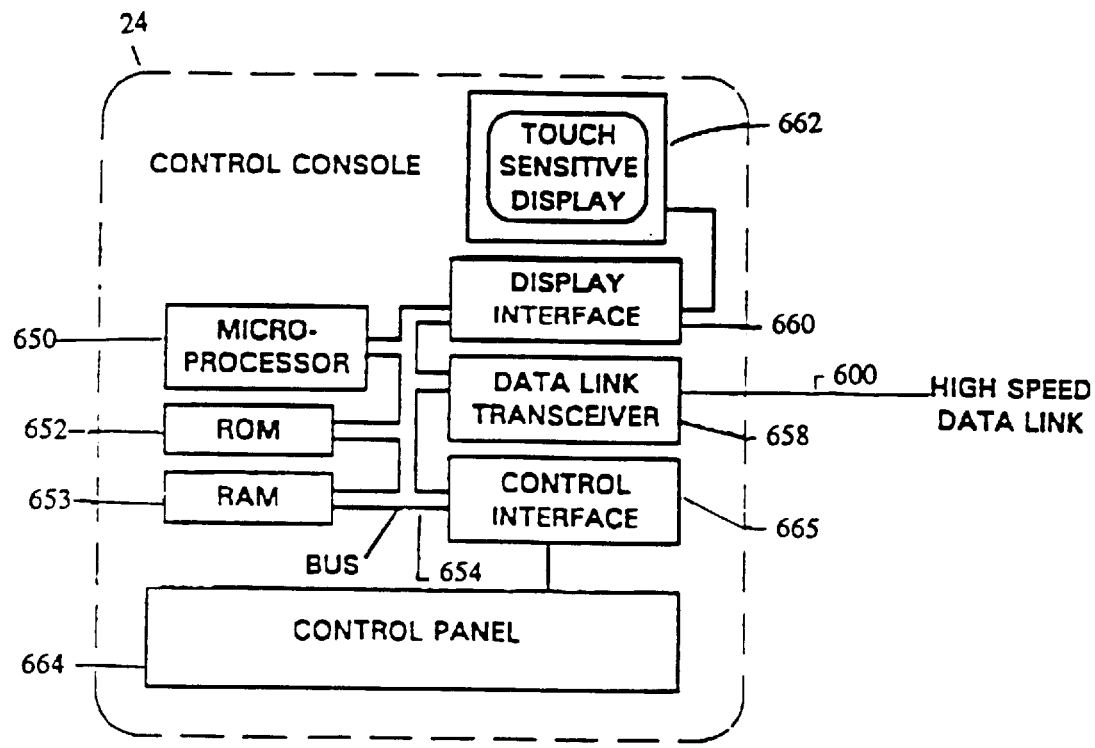
FIG. 28 is a block diagram of a control console architecture.

FIG. 28 illustrates typical architecture for a control console. Control consoles 24 are optimized for direct control of lamp units in the lighting system, including but not limited to manual control of variable lighting parameters, storing parameter data to be recalled later, and directing the lamp units to recall and conform to the stored parameters. Consoles exist primarily to send control commands to lamp units, and typically include limited display capabilities. A control panel 664 includes a variety of switches, knobs, faders, and displays used to direct operation of the system by a human operator. A microprocessor 650 connected to address, data, and control signal bus 654 executes programs stored in a Read-Only Memory (ROM) 652 and stores data related to the operation of the system in Random Access Memory (RAM) 652, the RAM and ROM also being connected to bus 654. Microprocessor 650 reads the control panel 664 via a control interface circuit 665, also connected to bus 654. A touch-sensitive display 662 is connected to a display interface circuit 660 connected to bus 654. The microprocesser reads touch inputs from touch-sensitive display 662 via interface 660, and writes display data to the display via the same interface. A high-speed data link transceiver 658 connects to bus 654 and serves as an interface between the console and the high-speed control resources network 600.

Figure 29:
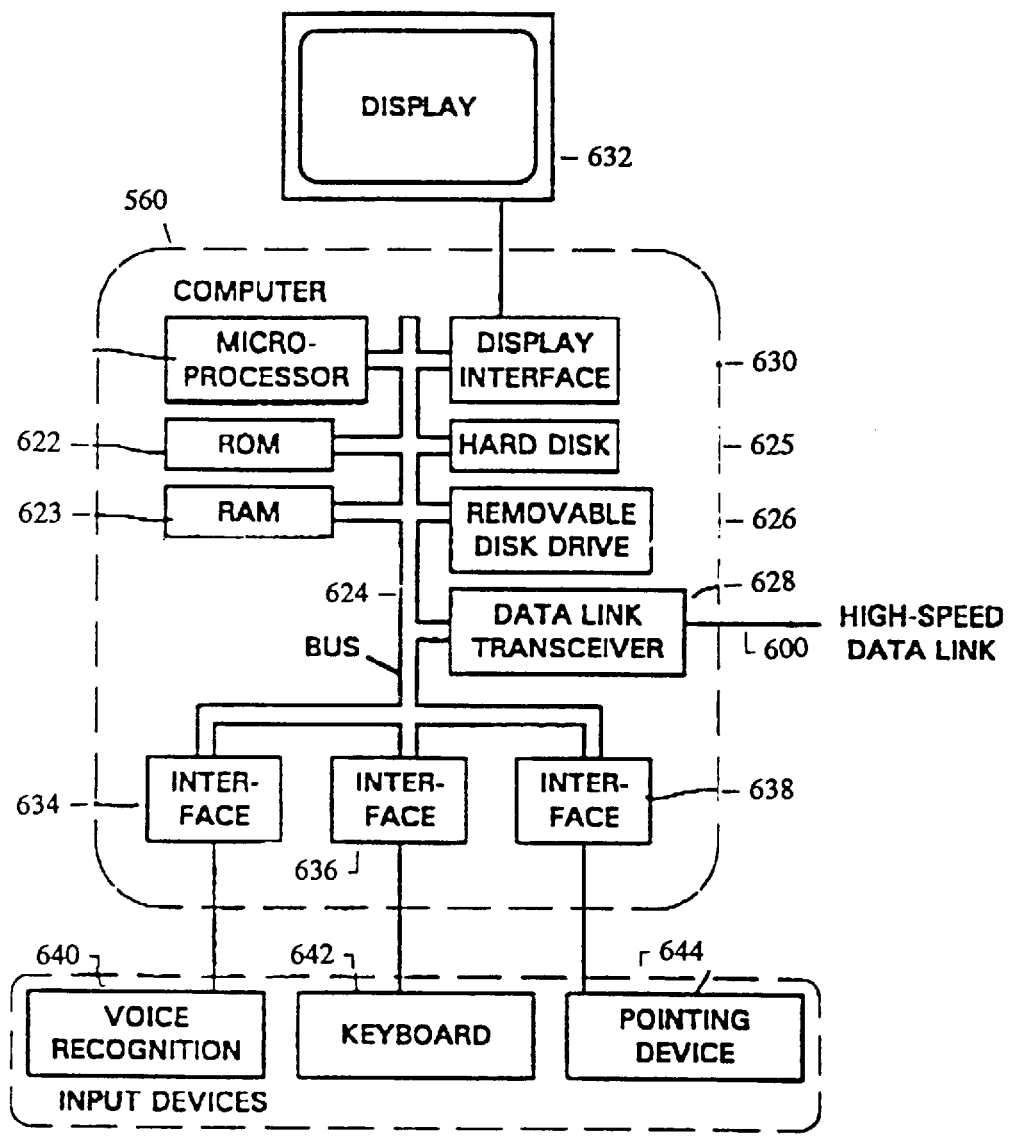
FIG. 29 is a block diagram of general purpose computer architecture.

FIG. 29 illustrates typical architecture for a general purpose computer. Microprocessor 620 executes programs stored in ROM 622, loads programs stored on hard disk drive 625 into RAM 623 and executes the programs from RAM. Address, data, and control signal bus 624 interconnects the microprocessor, RAM, ROM, hard disk drive and other components described below. A removable disk drive 626, such as a magneto-optical hard disk cartridge, stores backup copies of the show file in a transportable form. Display interface 630 connects to bus 624 and supports operation of a graphic display device 632. High-speed data link transceiver 628 connects to bus 624 and serves as an interface between the computer and the high-speed control resources network 600. Input devices may include a standard keyboard 642 connected through interface 636; a pointing device 644 such as a mouse, light pen, trackball or similar device connected through interface 638 and; a voice recognition module 640 with microphone, connected through interface 634.

General purpose computers 560 are utilized to store and display data, including tabular views of parameter data and graphical views of a performance environment or other lighting environment. One general purpose computer in a system is a system data repository storing a "show file" containing a three-dimensional model of the environment, including lamp units and objects to be illuminated, the show file also containing parameter data for the lamp units. The show file serves as backup data for parameter data sets (cue data) stored in the lamp units. The show file can also serve other purposes as will be described herein. An described below, copies of the show file may exist on other general purpose computers in the system and means may be employed to update the copies as the show file on the system data repository is changed. Any general purpose computer in the system can display lamp unit status information and view, create, or edit any show file on the repository. General purpose computers can also run programs that a create a virtual control console in a "window" on the computer's display, and allow operators to control lamp units from the computer utilizing the window in conjunction with a pointing device 644 and/or keyboard 642.

Figure 30:
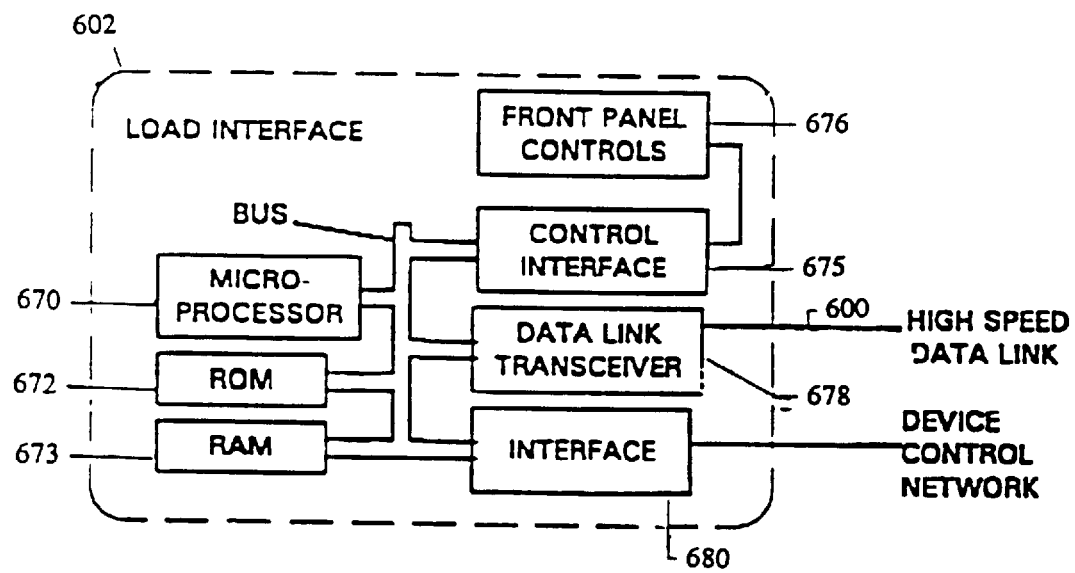
FIG. 30 is a block diagram of load interface module architecture.
Figure 31:
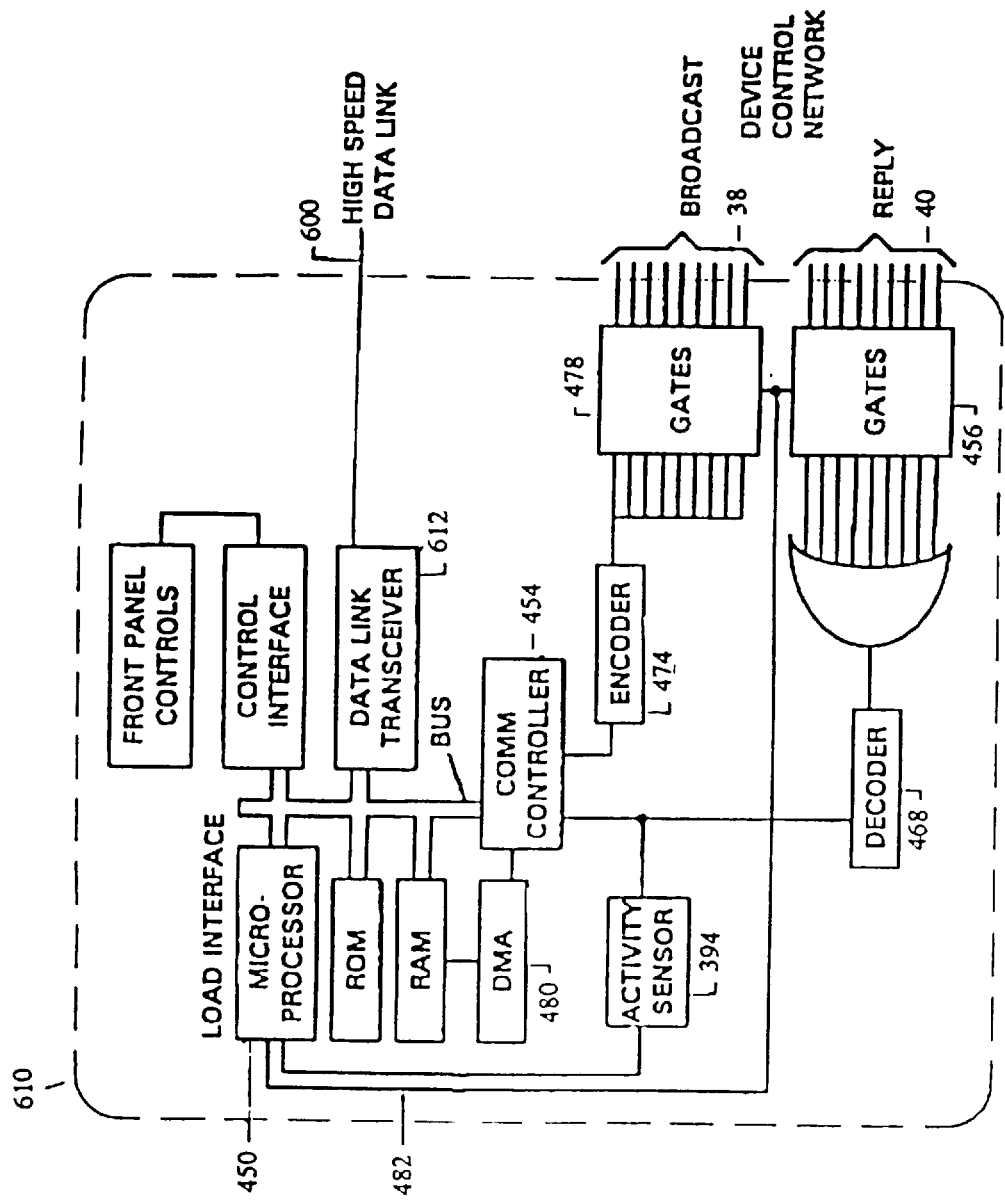
FIG. 31 is a block diagram of load interface module architecture.

FIGS. 30 and 31 and illustrate typical architecture for load interface modules. Load interface modules 602, 610 exist primarily to funnel commands to and report the status of all lamp units connected thereto. Load interface modules periodically transmit status data over the high-speed control resources network for display by control consoles and general purpose computers. Load interface modules are also network gateways to multiple device control networks, transmitting and receiving data in one format over the high-speed control resources network while transmitting and receiving data in another format over individual device control networks.

Each load interface module 602, 610 is configured as an independent data network, allowing each load interface module to serve as an interface between the high-speed distributed control resources network 600 and one or more types of lamp units having diverse communications protocols, functions and data formats. Each load interface module translates, if necessary, generic console commands received from control consoles or general purpose computers into specific commands or parameters necessary for communicating with specific types of lamp units or output devices connected thereto.

Load interface module 602 (FIG. 30) includes a microprocessor 670, ROM 672 containing executable programs for operating the microprocessor, RAM 673 for storing data related to operation of the interface, a data link transceiver 678 for connection to the high-speed control resources network 600, front panel controls and indicators 676 connected to an interface circuit 675, and lamp unit interface 680 that supports an independent device control network. Address, data, and control signal bus 674 interconnects the major functional blocks of the load interface module 602.

Figure 23:
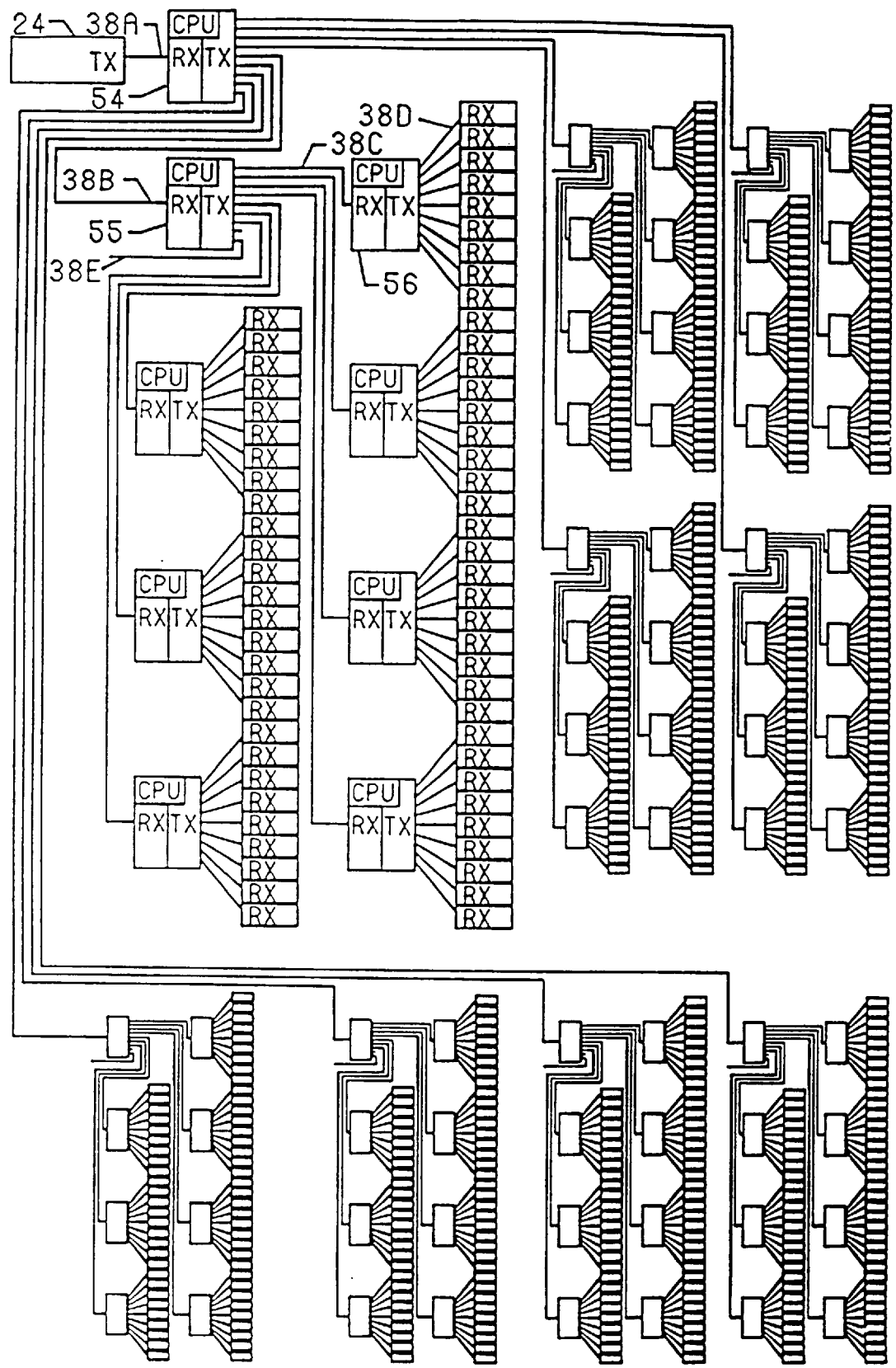
FIG. 23 is a block diagram of the lighting system showing an improved broadcast network of the type which may embody the present invention.
Figure 24:
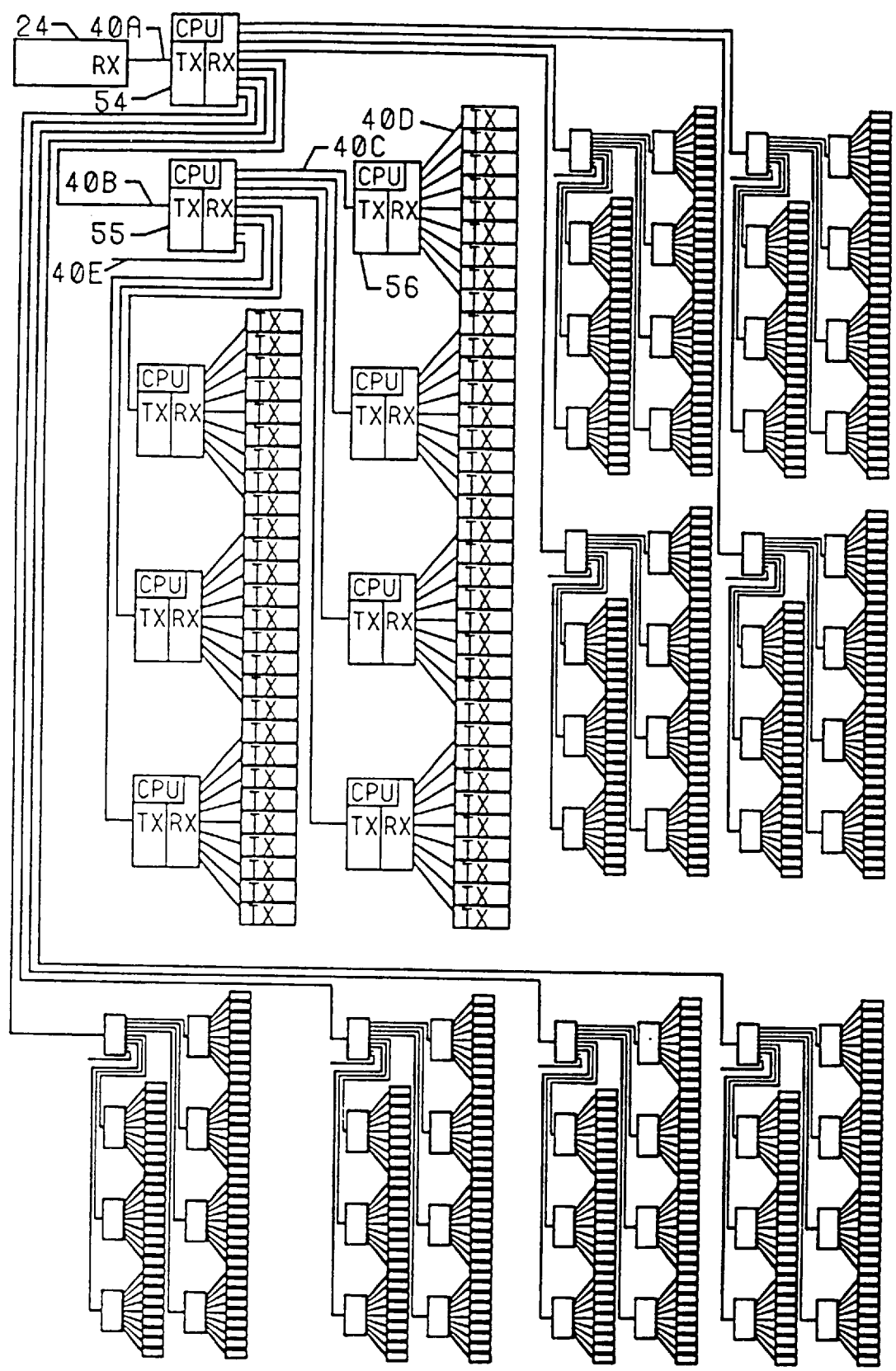
FIG. 24 is a block diagram of the lighting system showing an improved reply network of the type which may embody the present invention.

Load interface module 610 (FIG. 31) corresponds to the Smart Repeater unit shown in FIG. 22, but is modified to communicate with control consoles over the high-speed data link 600. The Manchester Encoder 470 and the Manchester Decoder 472 shown in FIG. 22 are replaced in the load interface module 610 by a high-speed data link transceiver 612 for connection to the high-speed data link 600. Alternatively, both uplink interfaces can be included on one circuit card assembly, the encoder 470 and decoder 472 as well as transceiver 612, so that one standard circuit card assembly can serve as Smart Repeater 56 (FIGS. 23 and 24) or as load interface module 610 (FIG. 27).

The high-speed control resources data network 600 is preferably an industry-standard, commercially-available, local-area-network format configured as a hub unit 604, 605, 606 having ports for connection to devices on the network. Transceiver circuits 628, 658, 678, 612 configured as plug-in circuit card assemblies are installed in each console, general purpose computer, and load interface module. Alternatively, transceiver circuits can be built into other circuit card assemblies designed to implement the functions of the control console or load interface module, but a plug-in card configuration allows the transceiver circuits to be easily removed and replaced by improved transceiver circuits if and when an improved network format becomes available.

One hub unit 604 is preferably co-located among control consoles and general purpose computers positioned, for example, in a seating area adjacent to a stage or other performing area, or in a lighting control booth. Control consoles 24A, 24B and general purpose computers 560A, 560B are connected to the hub unit 604 which is then connected to a second hub unit 605 co-located among power and signal distribution racks containing load interface according to the present invention. Load interface modules modules 610A, 610B, 610C connect to the second hub unit 605 and provide control signals generated by consoles and general purpose computers to lamp units connected thereto. A third hub unit 606 connected to the second hub unit 605 may be provided to support larger numbers of lamp units. Connections between hub units may be high-bandwidth links such as fiber-optic cable communications format while connections between hub units and consoles, computers, load interface modules may be wire links.

Additional control system elements, such as a limited-function technician's console 24C or a remote focusing device 608, can be connected to the second, third, or other hub unit co-located with the stage or performing area. Other hub units may be connected to additional consoles not co-located with other consoles.

Method of Operation

A method for operating multiple control consoles simultaneously on-line in a computer-controlled lighting system according to the present invention must resolve potential conflicts between two or more consoles issuing concurrent commands to the same lamp unit or group of lamp units. In a default mode of operation, each lamp unit in a system can be controlled by any console in the system.

Multiple control consoles can be on-line at the same time to permit simultaneous programming of different groups of lamp units. Lamp units in the system can be selected for manual control by multiple consoles simultaneously. Alternatively, lamp units can be selected for manual control exclusively by only one console at a time. A user-selectable option determines whether lamp units selected for manual control can be seized by another console so that the lamp unit is de-selected at the first console and selected for manual control by a second console, or whether the second console must wait until the lamp unit is de-selected by the operator of the first console before it can be selected for manual control by the second console.

Lamp units in the system can be directed to store and recall cues by any console or computer in the system. Alternatively, cue store and recall operations can be restricted so that certain lamp units are exclusively assigned to certain consoles for control.

In a second "lamp-unit-locked" mode of operation, any console can issue a command that renders a particular lamp unit or group of lamp units responsive only to that console. In this second mode of operation, other consoles are unable to affect the lamp unit or group of lamp units in any way. The lamp-unit-locked mode can be used to partition the lighting system into groups of lamp units which are controlled by certain consoles and not others. Within each group, lamp units respond to cue store and recall commands from only the one console to which they are "locked."

In a third "lamp-function-locked" mode of operation, any console can issue a command that renders certain functions of a lamp unit or group of lamp units, such as pan and tilt control, responsive only to that console while other functions of the lamp unit(s), such as beam color and intensity, can still be controlled by any other console.

In a fourth "lamp-unit-limited" mode of operation, a control console can be limited to control only certain groups of lamp units, but the lamp units can be controlled by other consoles as well. A user-selectable option determines whether lamp units currently selected by manual control by the limited console can be seized by another console, or whether the other console must wait until the lamp units are de-selected at the limited console. A user-selectable option determines whether lamp units that are active in a cue recalled by the limited console will respond to cues recalled by other consoles, or whether the lamp units ignore cue recall commands from other consoles if they are currently active in a cue recalled by the limited console.

In a fifth "lamp-function-limited" mode of operation, a control console can be limited to control only certain functions of lamp units, but those functions can be controlled by other consoles as well. A user-selectable option determines whether lamp functions which are selected for manual control or are controlled by an active cue recalled by the function-limited console can be seized by another console or whether the lamp units ignore commands from the other console if those functions are currently controlled by the function-limited console.

A board-level cue or similar macro-function can quickly set up a particular control arrangement. A board-level cue operable on a single control console, or virtual control console running on a general purpose computer, is a data set that represents a set of known or desired states of various front-panel controls and indicators on that console's front panel. An operator can recall a board-level cue to quickly set the console front-panel features to a desired known state, rather than individually manipulating a large number of front-panel controls to set them to the desired state. Board-level cue recall can take the form of a two or three character board cue identifier which the operator enters on a keypad followed by the press of a "recall" button, thereby reducing board-level set-up to three or four button presses as opposed to 16 to 20 or more button presses which might be required to load cue numbers or chase numbers into several submasters (three-digit cue number and a "go" button, or three-digit chase number and a "load" button for four or five submasters).

A board-level cue operating across multiple control consoles simultaneously on-line can include various modes of lamp-unit-locking and lamp-function-locking, lamp-unit-limiting and lamp-function-limiting for different lamp units or groups of lamp units.

Multiple Console Interaction with Show File

In a distributed control system according to the present invention, a method for operating multiple control consoles simultaneously on-line with one or more general purpose computers must resolve conflicts between two or more consoles issuing commands that affect the show file data base maintained on the system data repository. In systems that include a second or further general purpose computer(s), one or more show file data editing programs may be running simultaneously on the computer(s). There may also be occasions when multiple control consoles and multiple computers running show file data editor programs are on-line simultaneously.

In a default mode of operation, the currently open show file connected to the control resources network can be edited by any control console or show file data editor (show editor) program in the system.

In a second "show-file-locked" mode of operation, any console or show editor can issue a command that renders the show file editable by only that console or show editor. In this second mode of operation, only one console can store cues, or only one show editor can add, delete, or modify data in the show file.

In a third "record-locked" mode of operation, any console or show editor can issue a command that renders certain records or groups of records, such as all lamp unit records in a certain cue or all lamp unit records of a certain lamp unit or some other grouping, editable by only that console or show editor. In this third mode of operation, any console or show editor in the system can operate upon all data in the show file except those records which are locked to a particular console or show editor.

Updating the Show File

As cues are stored in the lamp units, a continuously operating background routine updates the show file in accordance with changes to the distributed data base stored in the lamp units.

A show file can be edited directly by a show editor program running on a general purpose computer. As records in the show file are edited, the background routine updates the distributed data base stored in the lamp units in accordance with changes to the show file.

Different Types of Control Consoles

A variety of control consoles optimized for different functions can be implemented by selecting the appropriate mode of operation and user-selectable options as described above for each of a plurality of control consoles having different control devices included on their respective control panels. A technician's console 24C may be function-limited to allow a technician-operator to start and douse lamps, and make small variations in intensity and pan control, but be excluded from controlling color, tilt or other functions, or from storing or recalling cues. A remote focusing device 608 can also be function-limited to allow a lighting director to sequence through active lamp units in reference cues or direct cues and adjust their focus (pan, tilt, beam-size, and edge/optical focus).

A master console operates in the default mode having control over all lamp units in the system not partitioned-off in lamp-unit-locked mode to a secondary console. A secondary console can operate in the lamp-unit-locked mode to control a subset of the entire lighting system, such as work lights, house lights, or other lamp units not used for illuminating the main stage or performance area, while a master console controls main stage illumination. By partioning-off peripheral lamp units to a secondary console, the operator of the main console can select all lamp units for manual control and obtain control of only those lamp units designated for main stage illumination, peripheral lamp units being exempted.

Additionally, a hub unit, such as hub unit 606, can isolate data link traffic between consoles, load interface modules, and computers attached to that hub from data link traffic between control devices attached to other hubs. In this way, a technicians console 24C and general purpose computer 560C can design, edit, and download to appropriate lamp units image files for projection by lamp units equipped with liquid crystal projection gates array such as disclosed in U.S. Pat. No. 5,282,121 without introducing excessive and irrelevant data link traffic into other segments of the high-speed control resources network 600.

A designer's remote console is a display-only device from which its user can direct its display of data. The designer's remote console communicates with the system data repository over the high-speed data link network and can display the current parameters of the lamp units in the system, can display cue data for any cue in the show file, and can display any of the display windows used at the master or primary control console.

Display Concepts

The distributed control system of the present invention possesses the capability to display graphical representations of the lighting system in a variety of formats. Based upon a three-dimensional model of the lighting system, which model is contained in the show file data base maintained on the system data repository, each graphic display format conveys information to an operator representing a current state of the system, or as cues are recalled in the model, a possible state of the system.

Photo-realistic Display

One graphic display format presents a photo-realistic view of a stage, set pieces and performers, and how they look under the current illumination from the lamp units. This view can be used to simulate show designs as a communication or sales tool for lighting designers. This view can also be used to provide realistic feedback for offline show programming and for control locations having an obstructed view of a stage. In the photo-realistic view, lamp units are represented as projecting full conical or columnar beams which are visible only to the extent at which smoke is considered to be present in the air. A pool of light projected by a lamp unit, or the pattern of its gobo, is mapped onto surfaces illuminated by the lamp unit. Various surface materials are employed in the model, taking into account the reaction to illumination and reflective properties of the surface materials. Video screens may be included in the model with an operator being able to play real video sequences on the modelled screens. As cues are recalled in the model, the photo-realistic view shows a smoothly animated transition of beams in the air and of projections as they move. The operator's point-of-view can be quickly and easily moved to allow viewing the model from any angle. The operator can move to preset points-of-view with a single button press.

Working-view Display

Another graphic display format presents a working view of the model comprising a mix of less realistic three-dimensional graphics, two-dimensional graphics, and numeric data. Three-dimensional graphics provide a visual context for other data. Two-dimensional graphics present lamp unit information in a visual and qualitative way. Numeric data presents lamp unit information in a quantitative way. The stage, set pieces and performers are presented less realistically, in a more block-like way. No embedded video screens are included, nor surface modelling, nor modelling of the lamp units' beams and projections. Light beams projected by active lamp units are represented by colored bars. Graphical effects on the colored bars represent pattern projections (gobos), hard or soft edge effects (optical focus) and "marked" lamp units (units which conform to all variable parameters but with no light beams actually projected in a given cue). A beam terminus can be represented by a colored dot or other graphical device to indicate the target at which the lamp unit is pointing. Clicking on a beam bar with a mouse or other pointing device selects the corresponding lamp unit for manual control. The beam terminus can be dragged by the pointing device to re-focus lamp units. The terminus snaps to the target surface or the head of a performer or to other default points to make aiming the beam easier. Once a geometric pattern of beams has been arranged, the beams can be grouped together and thereafter moved as a group by dragging any one of the beams. Clicking on a group of beams selects the corresponding group of lamp units for manual control.

When cues are recalled, the working view shows a rough animated transition of beam bars in the air as they move. The operator's point-of-view can be quickly and easily moved to allow viewing the model from any angle. The operator can move to preset points-of-view with a single button press.

The operator can have a fish-eye view from just off the front edge of the stage, halfway between the stage and the overhead lighting truss, giving a view of the truss from below and the stage from above. The motion of the operator's point-of-view is constrained to circle around the edge of the stage in the fish-eye working view.

The working view can superimpose numeric display of a single, selected parameter over the body of each lamp unit. The operator can switch on or off groups of lamp unit beam bars and numeric displays; lamp units can be displayed in "pages" groups of (typically 100) contiguous lamp unit addresses. A "magic wand" selection tool is provided so that when the operator clicks on a beam to select the corresponding lamp unit for manual control, all active lamp units having the same beam color as the selected lamp unit are also selected for manual control. When the operator clicks on a target using the magic wand tool, all active lamp units focused on that target are selected for manual control. Lamp units selected for manual control are also selected for numeric display, allowing the operator to view numeric data for only some of the lamp units on a page.

Channel-usage Display

Another graphic display format presents a channel usage display which, while maintaining the three-dimensional model of the lighting system, stage, set pieces and performers, presents a view that breaks the model. Intended as a data visualization tool rather than a realistic view of the stage, the channel usage display can be manipulated to show all of the important surfaces of the stage, set pieces and backdrop in one view rather than having to move the operator's point-of-view to see parts of the set that are hidden by other parts of the set. The operator's point-of-view is fixed in the channel usage display, but portions of the model can be moved and rotated in the view to bring their important surfaces into view from the fixed point-of-view. For example, set pieces can be viewed from in front of the stage, the stage can be tilted down so that its top surface is seen, and a backdrop can be raised from behind the set pieces so its lower portion can be seen. Lamp units themselves are not shown, nor are beams in the air. A line marking the outline of a beam projected on a set piece or other surface is drawn; some graying effect may be used to fill the outline of a pool of light formed by the beam projected on the surface. A lamp unit address or control channel number can be displayed in the center of the beam's projected area, or can be turned off if multiple beams converge on a single point. Lamp units can be selected for manual control by clicking on the corresponding beam's projected area, address or channel number, or target using a mouse or other pointing device.

Console Features

Control consoles utilized in the distributed control system of the present invention may contain control devices optimized for a variety of functions including but not limited to: 1) selecting and de-selecting lamp units or groups of lamp units for manual control, 2) adjusting variable parameters of lamp units selected for manual control, 3) storing variable-parameter data describing the present state of lamp units in the system for later recall, 4) recalling and conforming variable-parameter lamp units to stored variable-parameter data, 5) uploading stored variable parameter data from lamp units to a system data repository, 6) downloading stored variable parameter data from a system data repository to lamp units, and 7) requesting and displaying statue information related to the present state of lamp units in the system.

Whereas some control consoles, such the Artisan® and mini-Artisan® control consoles manufactured by Vari-Lite, Inc. of Dallas, Tex., have used separate front-panel features for recalling single stored sets of variable parameter data (direct cues) and automatically-executable sequences of stored sets of variable-parameter data (chases), control consoles according to the present invention utilize flexible front-panel features capable of recalling either a direct cue, a chase sequence, or other playback function.

A front-panel feature called a "submaster" is normally adapted either for recalling direct cues, for recalling and executing chases (sequences of direct cues), controlling cross-fade between two direct cues, or controlling intensity of groups of lamp units distributed over a group of matrix faders; a number of direct cue submasters and a number of chase sequence submasters being normally provided on a console front panel. A submaster is normally provided with a variable controller or "fader" used to control the overall intensity level of lamp units assigned to the submaster, a "go" button for loading a direct cue number to the submaster or a "load" button for loading a chase sequence identifier to the submaster, and a pair of buttons for incrementing or decrementing the direct cue number loaded to the submaster or a pair of buttons for running and stopping or single-stepping through cues in a chase sequence. A submaster "select" button is provided to activate or de-activate cues or chases recalled to the submaster, so that the cue or chase can be loaded prior to execution and then executed by a single button press at the appropriate moment.

Figure 32B:
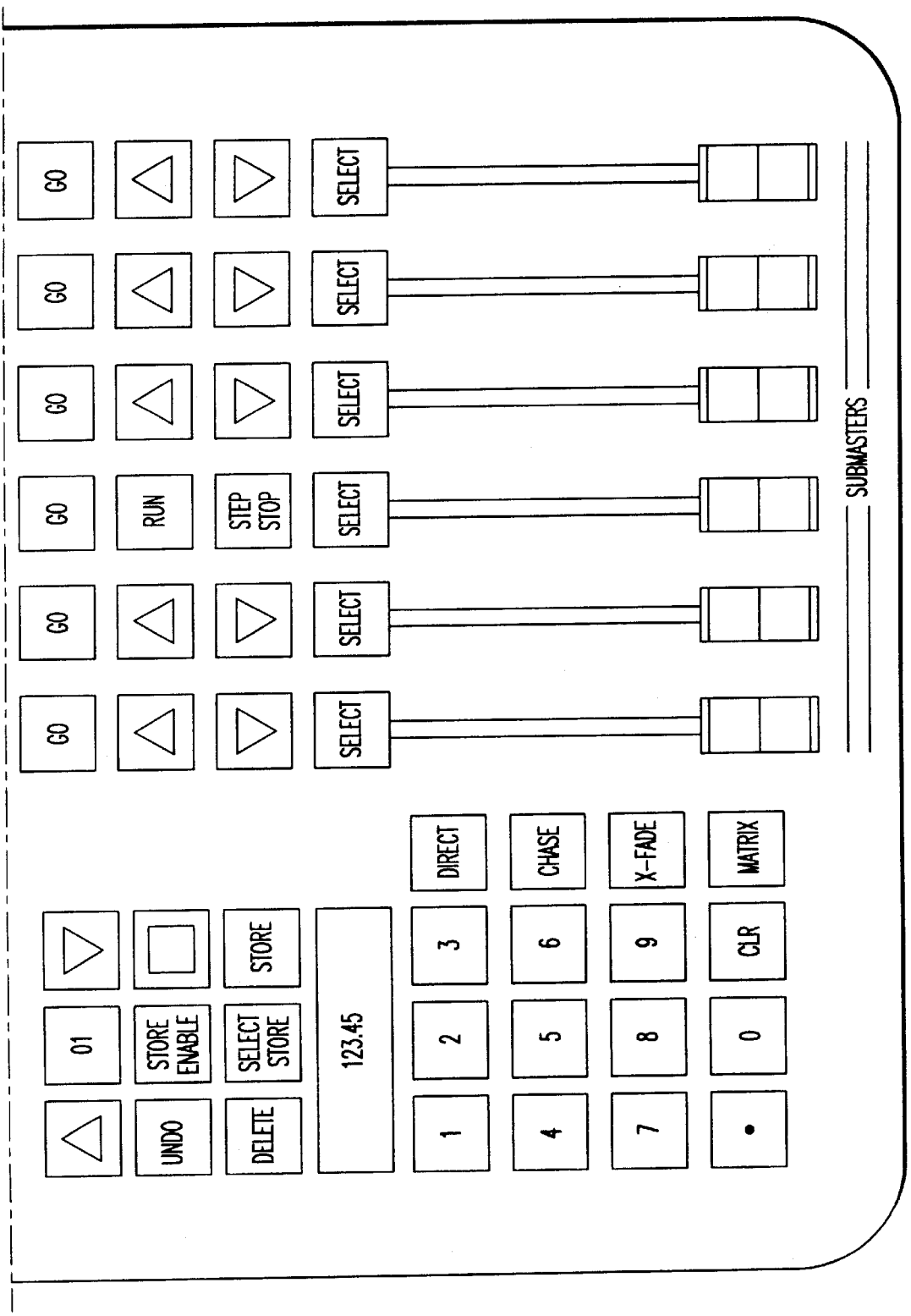
FIG. 32 is a block diagram of soft-submasters used in the present invention.

Consoles according to the present invention utilize soft-submasters, such as those shown by way of example in FIG. 32, which can respond either as direct-cue submasters, chase-sequence submasters, or other submasters depending upon how a direct cue number, chase sequence identifier or other identifier is loaded to the submaster. If the operator enters a cue number on a numeric keypad and presses a "direct" button associated with the keypad, then presses a "go" button associated with a soft-submaster, the submaster automatically becomes a direct-cue submaster and the other buttons associated with the submaster assume states in which they perform appropriate functions such as to increment or decrement the cue number that is recalled to the submaster. If the operator enters an chase-sequence identifier on an numeric keypad and press the "chase" button associated with the keypad, then presses the "go" button associated with a soft-submaster, the submaster automatically becomes a chase-sequence submaster and the other buttons associated with the submaster assume states in which they perform appropriate functions such as to run or stop the chase sequence or to single-step through the sequence of cues.

Groups of soft-submasters can be configured to perform other playback functions such as cross-fading between two direct cues and individual control of intensity of groups of lamp units in a single direct cue (matrix control) by entering a number on a numeric keypad and pressing button identifying the a particular playback function. For example, an operator can enter a cue number at the keypad, press an "X-fade" button associated with the keypad, and press "go" at a soft-submaster, then enter another cue number, press "X-fade" and press "go" at another soft-submaster to con-figures the pair of submasters as a cross-fade controller that fades between the two direct cues.

A similar technique may be employed to designate matrix faders and a matrix submaster A matrix submaster controls the overall intensity of groups of lamp units, the overall intensity of each group being controlled by one of a group of matrix faders associated with other soft-submasters.

Consoles according the present invention utilize programmable display elements to change the labels on the buttons associated with soft-submasters depending upon the required functions. These may take the form of buttons mounted adjacent to separate display elements, or the display elements may be incorporated in the button or keycap itself.

Whereas a typical submaster has incorporated features for enabling or disabling timing effects stored with the cues and for filtering-out certain of the variable parameter functions of lamp units that are active in cues recalled to the submaster, consoles according to the present invention may also include features for filtering-out certain lamp units, on a channel-by-channel basis, that would otherwise be active in the cue.

Cue Structure

Control consoles according to the present invention are provided with front-panel features and operating system programs that enable the use of a multi-level cue structure that includes board-level cues, direct cues, and reference cues. A direct cue is a data set that may contain variable-parameter data in the form of absolute parameter data for each function of a lamp unit, but a direct cue may also contain a reference identifier in the place of any one or more absolute values for any function, the reference identifier serving as an index that points to another data set that contains the absolute parameter data.

A reference cue is another data set that contains absolute parameter data that may be referred to by a direct cue so that all direct cues built from a given reference cue can be updated to new absolute parameter data simply by modifying the data in the reference cue.

A board-level cue is a data set that describes the state of various front-panel features of a control console at a given moment, and includes, for example, which direct-cue numbers, chase-sequence identifiers, cross-fade cues, and matrix patch configurations are loaded into which soft-submasters at that moment. Front-panel features for storing and recalling board-level cues are provided separately from features for storing and recalling direct cues, chase sequences and the like for the soft-submasters. Front-panel features for storing and recalling reference cues may be provided separately from features for storing and recalling-direct cues, or some features such a numeric keypad can be shared by direct cue and reference cue controls; there being provided a button for "store reference cue" separately from a button for "store direct cue."

A board-level cue can be stored with "clear" or "thru" status for individual submasters. "Clear" status removes any previous submaster entry from a submaster when the board-level cue is recalled. "Thru" status leaves any previous submaster entry in a submaster when the board-level cue is recalled. Board-level cues can trigger and be triggered by external events by transmitting board-level cue operations over the control resources network, listening at each console for board-level cue activity on the network, and interpreting board-level cue activity depending upon the prior state of the console. A console can then be programmed to respond to board-level cue activity on another console so that multiple control consoles on a network can be configured by one board-level cue recall at one of the consoles on the network.

Tracking

A tracking function can be applied to a numerical sequence of direct cues having identical parameter values for one or more lamp unit. For example, cues 10.01 through 10.09 may all specify the same color for one or more lamp units while specifying different pan and tilt values in each cue. In this example and according to the tracking feature of the present invention, the first cue of the sequence (10.01) is a "source cue" containing the parameter data to be tracked, and the color function is made to track through the numerical sequence of cues so that if at any time the color is changed for any of the cues, the color is thereby changed in all cues of the sequence subject to the tracking feature. A user-selectable option determines whether changes made to the tracked function apply only from the current cue forward to the end of the sequence (thereby establishing a new source cue), or whether a change made in one cue of the sequence is applied throughout the sequence from the original source cue (10.01) to the end (10.09). As source cue can also contain the identifier of a reference cue instead of actual parameter data.

Tracking can be applied in one of two modes. In a standard mode, tracking functions through all consecutive sequential cues in which a particular lamp unit parameter remains unchanged throughout the sequence, but stops tracking when that parameter changes, even if it changes back to the original parameter value in subsequent cues of the sequence. In an optional mode, tracking resumes for subsequent cues of the sequence in which the parameter value returns to the original value. A user-selectable option may be utilized to determine whether the standard or the optional mode applies.

Tracking can also be applied to a chase, with the first cue of the chase sequence being a "source cue" for tracking data, and all subsequent cues of the chase tracking the source cue; this establishes an arbitrary or random sequence of cues since chases can be programmed as arbitrary or numerically-sequential lists of cue numbers.

Previously, chase sequences executed with a single chase rate value controlling the time between sequential cue recall operations. Control consoles according to the present invention are provided with front-panel features and operating system programs that enable the use of variable timing between each cue of a chase sequence. This can take the form of a first chase rate that applies to sequential execution of cue recall operations from a first cue of a sequence to a subsequent cue for which a new chase rate is specified. A user-selectable option determines whether the new chase rate is established for all subsequent cues (a "standard" mode) or whether the new chase rate applies only to the one cue which the new chase rate precedes (an "exception" mode) after which the first chase rate is re-applied. Multiple new chase rates can be inserted into a single chase sequence. Each new chase rate can be flagged to operate as a standard-mode change or and exception-mode change.

Timing Control

Direct cues can include timing control, speed control, and/or wait times for individual functions of lamp units that are active in the cue. Timing control causes one or more variable functions to transition from a prior state to a currently commanded state over a specified time; separate times being possible for different functions such as pan, tilt, color, beam-size, edge, gobo- or image-rotation, intensity and the like. Speed control causes one or more variable functions to transistion from a prior to state to a currently commanded state at a specified rate of change; separate speeds being possible for different functions. Wait times cause one or more variable functions to delay the start of transition from a prior state to a currently commanded state; separate wait time being possible for different functions. A direct cue can have multiple wait times for various functions coupled with timing control or speed control for those functions such that, following the programmed wait time, the transition from a prior state to a currently commanded state is then modulated by the programmed timing or speed control.

Figure 33:
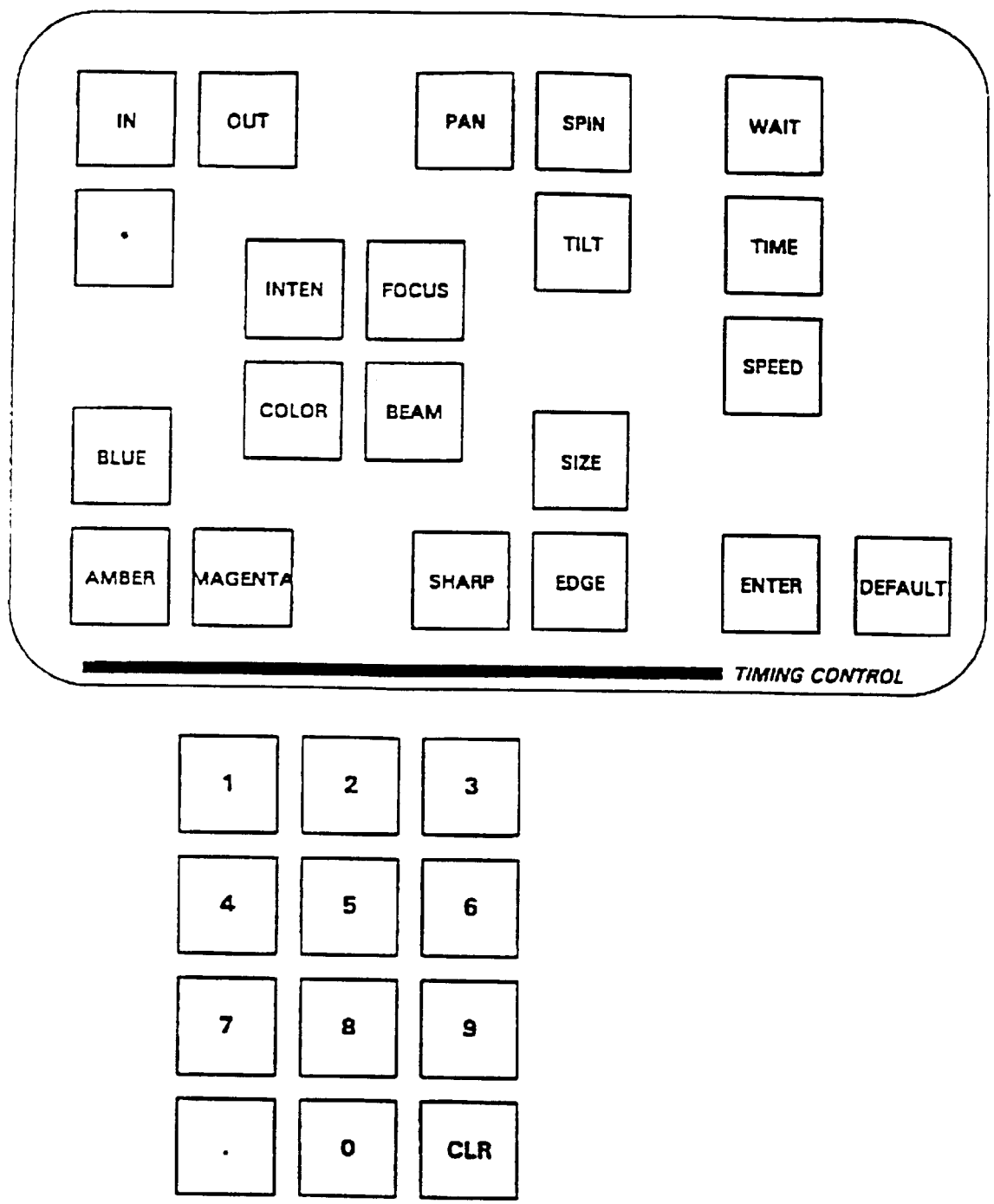
FIG. 33 is a block diagram of front panel features of control consoles according to the present invention.

Timing control data that can be stored with each cue may include a simple "one time for all parameters," or may include separate times for each of a few broad classes of parameters such as intensity, focus, color, and beam parameters. Control consoles according to the present invention further include front-panel features, such those shown by way of example in FIG. 33, and operating system programs that enable the programming of separate timing control values for each variable parameter function of a lamp unit. For example, where the color-control function is controlled in a particular lamp unit by three motorized color filter drives, the timing control data stored with a particular cue for that lamp unit may include separate execution times or speed control values for each of the three color filter drives. Alternatively, a single timing control value can apply to all three color filter drives equally. A hierarchal structure can be imposed on the timing control values no that a single time for all functions, whose default value is zero-time or full-speed, is initially entered for each lamp unit function. Thereafter, entering a timing value for a broad class function such as color or focus overwrites the single timing value for all specific functions included in the broad class. For example, a color time imposed over a single time for all functions causes new timing values to be entered for each color filter drive of the affected lamp unit. Subsequently, color timing can be modified by entering a third timing value for only one of the color filter drives of the lamp unit, the other color filter drive(s) being controlled by the timing value entered for the broad class function "color." A user-selectable option determines whether a new timing value entered for a broad class function overwrites all timing values for specific parameter drives (a "reset" mode) or whether the new timing value is only propagated to parameter drives that have not been programmed with specific timing values (a "fill-in" mode).

Wait times can be entered for each of the broad class functions of a lamp unit in a cue, or can be entered for each of the specific parameter drives for each broad class function. Wait times can be programmed according to the same hierarchal structure described above with respect to timing values, and can be implemented with "reset" or "fill-in" modes as described above.

An auto-follow mode can be applied to board-level cues so that the board-level cue intiates automatically following the completion of a previous event. In this way, one board-level cue can automatically follow another to simplify the execution of a complex sequence of events. The auto-follow mode can also be applied to direct cues so that numerically sequential direct cues are recalled automatically, observing any wait times and timing control values stored with the cues, so that the autofollow will always occur regardless of how the initial cue was loaded.

Intelligent Lighting Assistant

The distributed control system of the present invention includes control system elements and operating system programs that enable the system to respond to a human operator as an "intelligent lighting assistant." A reasoning engine implemented on a general purpose computer connected to the control resources network accepts command inputs from a voice-recognition module or other input device. Voice recognition devices and techniques are well-known to those with skill in the art; for example the ProAudio 16 sound card and ExecuVoice software available from Media Vision of Freemont, Calif.

Figure 34:
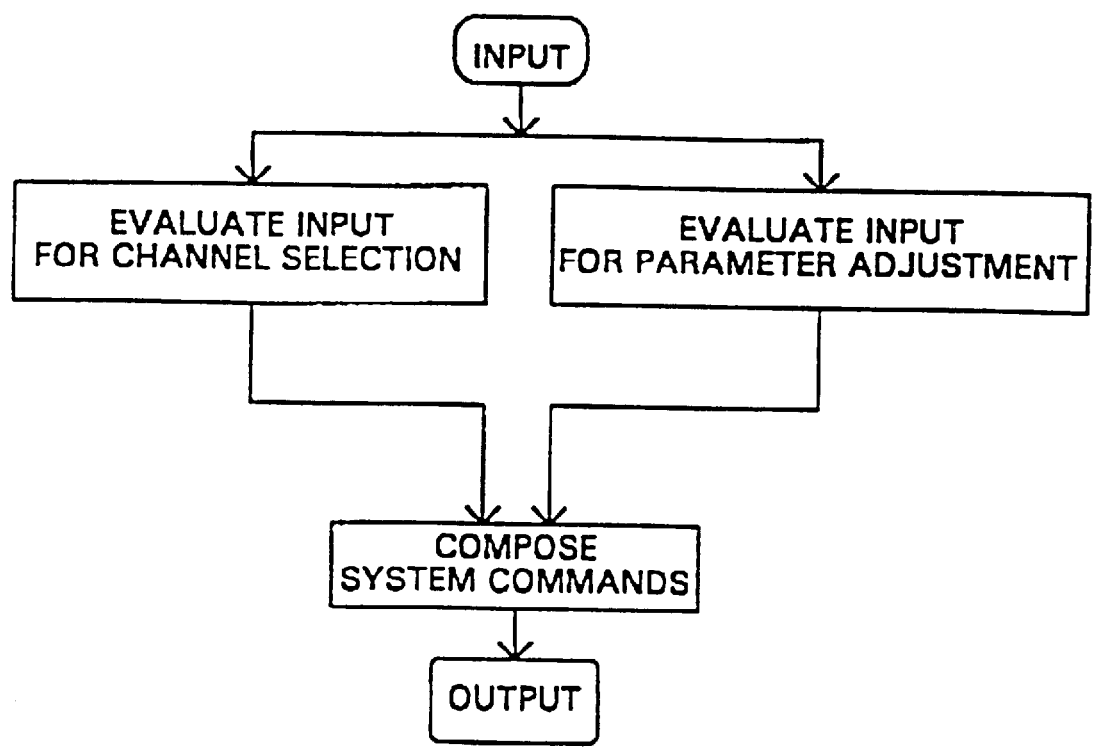
FIG. 34 is a block diagram illustrating a method for translating generalized instruction inputs into parameter adjustment data outputs.
Figure 27:
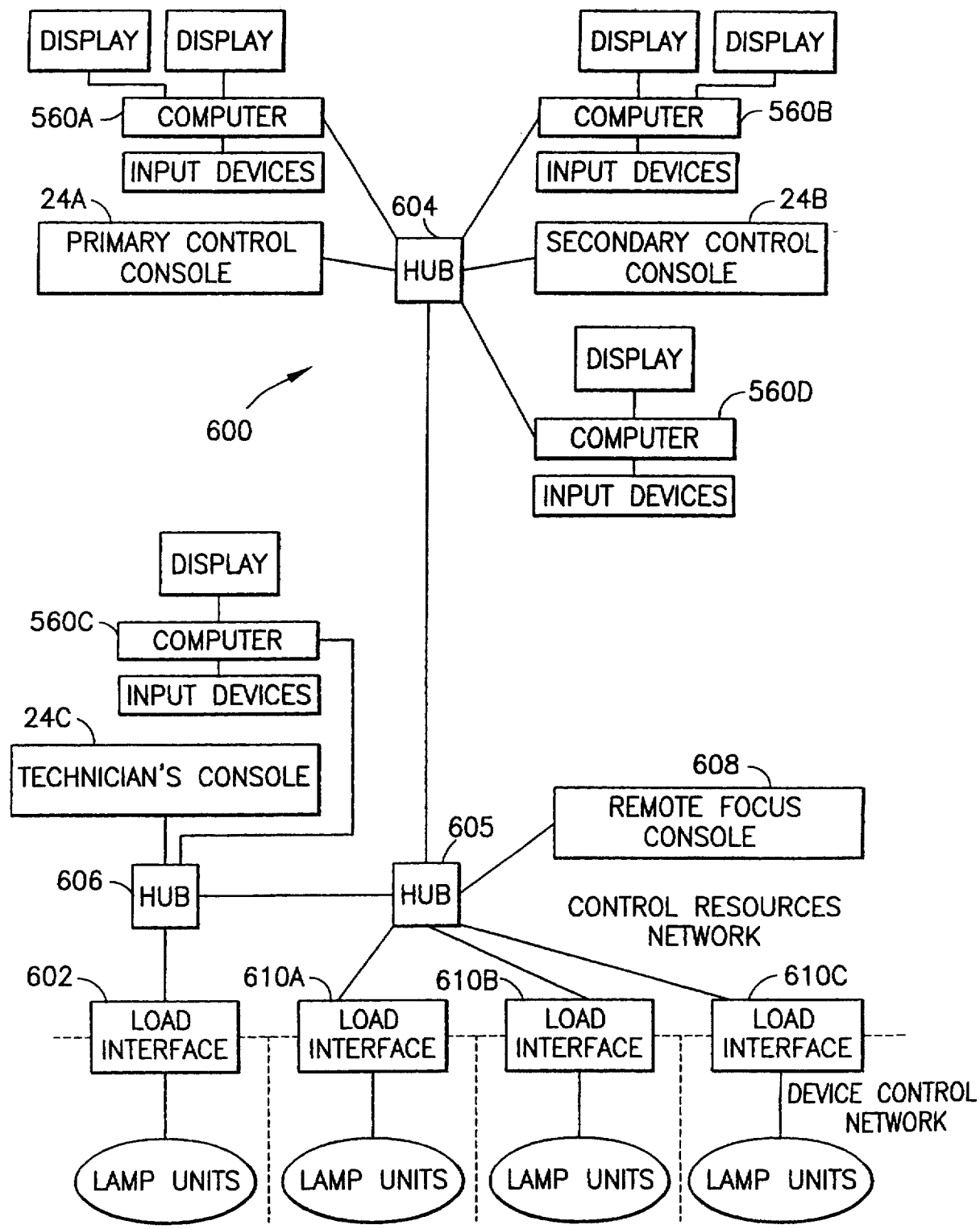

The reasoning engine evaluates the command by refering to the show file, which contains a three-dimensional model of the lighting system and a data base of parameter data sets (cue data) for lamp units modelled therein. The show file is maintained on a system data repository also connected to the control resources network. The reasoning engine operates utilizing a method illustrated in FIG. 34 for translating generalized instruction inputs into parameter adjustment data outputs. The method includes applying a set of rules for interpreting generalized and subjective command inputs, such as the phrase "the upstage lamp units in red change to blue," into lamp unit address to select for manual control and parameter adjustment values to drive the lamp units to produce light beams having the required attributes or parameters. The reasoning engine, according to the method of the present invention, analyzes the command input to determine which lamp units will be affected by the command, and also determines what the effect of the command will be upon those lamp units. Finally, the console composes appropriate system commands and transmits the commands over the high-speed control resources network 600.

A user-selectable option determines whether a separate "go" command input is required before the affected lamp units respond to the command input, or whether the resultant adjustments are performed immediately upon interpretation of the command by the control system.

The reasoning engine according to the present invention can distinguish common-language expressions describing relative locations of objects contained in the three-dimensional model maintained on the system data repository, their support structure hierarchy (which objects are supported by other objects), attributes of the various objects (size, shape, color, type, names, control channel numbers or other designations), and the various possible states of parameter drives in variable parameter lamp units. Words, phrases, and other expressions having specialized meanings in the lighting industry are interpreted by the reasoning engine so that the resultant parameter adjustment values at least tend to approximate the general understanding in the industry of specialized meaning. Other words, phrases or expressions are given specialized meanings as required to avoid unpredictable results in cases where an expression may have two or more meanings. The reasoning engine of the present invention, therefore, correctly interprets industry "jargon" and may expand the jargon to include more expressions having specialized meanings.

Knowledge used for evaluating the input to determine channel selection requirements includes common knowledge terms such as "first," "last," "odd," "even" and the like; technical jargon such as "first electric," "torm" and the like; knowledge derived from the three-dimensional model such as "upstage," "stage right," "back truss" and the like; and current lamp unit attributes such as "green lights," "lights on the singer" and the like. Knowledge used for evaluating the input to determine parameter adjustment requirements includes console structures such as "preset color," "preset focus" and the like; numeric parameter entry such as "at intensity 75," "in gobo 3" and the like; knowledge derived from the three-dimensional model such as "at the singer," "two feet upstage" and the like; and current lamp unit attributes such as "the same green as those other lamp units" and the like.

The reasoning engine of the present invention interacts with the system data repository and graphic displays associated with the control resources network to display the results of command input expressions in both on-line and off-line situations. An operator can program a lighting system using only the intelligent lighting assistant, comprising a command input interface such as a voice-recognition module, a reasoning engine implemented on a general purpose computer, and a three-dimensional model of the lighting system. The model simulates the activity of; lamp units in the absence of the rest of the lighting system, while the command input interface and reasoning engine substitute for control consoles to provide for off-line programming. Results of command input expressions are displayed on a graphic display showing a photo-realistic view, a working view, or a channel usage display as described above. Alternatively, multiple graphic displays can be utilized showing different views on different displays. A voice-synthesizer module can be included in the system to allow the "intelligent lighting assistant" to speak to the operator.

In case of ambiguities which the reasoning engine cannot resolve, a question can be posed to the operator, either as text on a graphic display or as an electronically synthesized voice. For example, to evaluate an input containing the expression "lights on the singer," the system may pose the question "Which singer do you mean?" This question may be communicated audibly, utilizing a voice synthesizer module, or the question may be displayed as text in a window on the graphic display. As another example, if the input contains the expression "the same green as those other lamp units," the system may pose the question "which other lamp units do you mean?"

We claim:

1. A distributed control system for a lighting system, comprising:

A. at least two control devices for entering parameter-controlling inputs according to a specified format, said parameter-controlling inputs directing operation of said lighting system, each said control devices including a data processor coupled to said parameter-controlling inputs, a memory coupled to said processor, and a data link transceiver coupled to said processor;

B. one or more computing devices for storing, editing, and displaying data related to said parameter-controlling inputs, said computing devices comprising at least a data processor, a memory coupled to said processor, a data display device coupled to said processor, and a data link transceiver coupled to said processor;

C. one or more load interface modules each including a data processor for controlling said respective interface module, and at least one data link transceiver couple to said processor, said processor configured to monitor said data link signals, each of said load interface modules supporting at least one device-control data link network;

D. a control-resources data link network connecting said control devices, said computing devices, and said load interface modules;

E. at least one said device-control data link network having a common path for connecting said load interface module to a plurality of multiple-parameter lamp units each having means for producing a light beam having a plurality of adjustable parameters relating to beam characteristics and drive means for controlling a plurality of said parameters in response to said parameter-controlling inputs.

2. A method for operating a distributed control lighting system equipped with an intelligent lighting assistant, said lighting system comprising an input device, a reasoning engine, a data repository, a load interface module, a multiple parameter lamp unit and a network, the method comprising the steps of:

injecting an operator parameter command into the reasoning engine via the input device;

evaluating said operator command in the reasoning engine;

comparing said operator command to a three dimensional model resident in the data repository, the model comprising a representation of the system and a system operating environment;

calculating a system parameter adjustment based on said operator command and said three dimensional model;

composing a system command to achieve the parameter adjustment ordered by the operator command; and transmitting said system command to the multiple parameter lamp via the load interface module and the network 3. The method of claim 2, further comprising the step of:

displaying a representation of the three dimensional model as altered by the system parameter adjustment on a graphic display device.

4. The method of claim 2, further comprising the step of:

implementing the system command upon receipt of an additional operator command.

5. A method for programming operations of a distributed control lighting system equipped with an intelligent lighting assistant, said assistant comprising an operator command input device, a reasoning engine, a data repository, and a graphic display device, the method comprising the steps of:

injecting an operator command into the reasoning engine via the input device;

evaluating said operator command in the reasoning engine;

comparing said operator command to a three dimensional model resident in the data repository, the model comprising a representation of the system and a system operating environment;

calculating a system parameter adjustment based on said operator command and said three dimensional model;

composing a system command to achieve the parameter adjustment ordered by the operator command; and displaying a representation of the three dimensional model as altered by the system parameter adjustment on the graphic display device.

6. In a distributed control lighting system connected by a network and comprising an operator command input device, a general purpose computer having a system data repository, a load interface module, and a multiple parameter lamp unit; an intelligent lighting assistant, said assistant comprising:

a reasoning engine interactively connected to said operator command input device and said system data repository, said reasoning engine configured to calculate system parameter adjustments and system commands responsive to said operator commands, and further connected to said interface module for transmitting said system commands via the network to the multiple parameter lamp unit;

said data repository maintaining a three dimensional model comprising a representation of the system and a system operating environment; and a graphic display device, whereon said reasoning engine displays the results of implementing its calculations of system parameter adjustments and system commands responsive to said operator commands on said three dimensional model.

7. A distributed control system for a lighting system, comprising:

A. at least two control devices configured to receive parameter-controlling inputs according to a specified format, said parameter-controlling inputs directing operation of said lighting system, each of said control devices including a data processor coupled to said parameter-controlling inputs, a memory coupled to said processor, and a data link transceiver coupled to said processor;

B. one or more computing devices configured to store, edit, and display data related to said parameter-controlling inputs, said computing devices comprising at least a data processor, a memory coupled to said processor, a data display device coupled to said processor and a data link transceiver coupled to said processor;

C. one or more load interface modules each including a data processor configured to control said respective interface module, and at least one data link transceiver coupled to said processor, said processor configured to monitor said data link signals, each load interface module supporting at least one device-control data link network;

D. a control-resources data link network connecting said control devices, said computing devices, and said load interface modules;

E. at least one said device-control data link network having a common path connecting said load interface module to a plurality of multiple-parameter lamp units each having a light beam producer having a plurality of adjustable parameters relating to beam characteristics and a driving mechanism configured to control a plurality of said parameters in response to said parameter-controlling inputs.

* * * * *

UNITED STATES PATENT AND TRADEMARK OFFICE
CERTIFICATE OF CORRECTION

Page 1 of 2

PATENT NO. : 5,769,527
DATED : June 23, 1998
INVENTOR(S) : Taylor, et. al.

It is certified that error appears in the above-identified patent and that said Letters Patent is hereby corrected as shown below:

In Figure 27, please substitute the enclosed corrected formal drawing of Figure 27.

Signed and Sealed this

Fifteenth Day of December, 1998

Attest:

BRUCE LEHMAN

Attesting Officer

Commissioner of Patents and Trademarks